(12) United States Patent
Marder et al.

(10) Patent No.: US 8,197,722 B2
(45) Date of Patent: *Jun. 12, 2012

(54) TWO-PHOTON OR HIGHER-ORDER ABSORBING OPTICAL MATERIALS AND METHODS OF USE

(75) Inventors: Seth Marder, Pasadena, CA (US); Joseph Perry, Pasadena, CA (US)

(73) Assignee: The California Institute of Technology, Pasadena, CA (US)

( * ) Notice: Subject to any disclaimer, the term of this patent is extended or adjusted under 35 U.S.C. 154(b) by 534 days.

This patent is subject to a terminal disclaimer.

(21) Appl. No.: 09/918,874

(22) Filed: Jul. 30, 2001

(65) Prior Publication Data

US 2002/0185634 A1    Dec. 12, 2002

Related U.S. Application Data

(63) Continuation of application No. 08/965,945, filed on Nov. 7, 1997, now Pat. No. 6,267,913.

(60) Provisional application No. 60/029,443, filed on Nov. 12, 1996, provisional application No. 60/029,437, filed on Nov. 12, 1996, provisional application No. 60/030,141, filed on Nov. 12, 1996.

(51) Int. Cl.
| | |
|---|---|
| G03C 1/00 | (2006.01) |
| G03C 1/73 | (2006.01) |
| G03G 7/00 | (2006.01) |
| G03G 5/00 | (2006.01) |
| G02F 1/361 | (2006.01) |
| G02B 5/22 | (2006.01) |
| C07C 39/12 | (2006.01) |
| C07C 39/205 | (2006.01) |
| G03H 1/00 | (2006.01) |
| H01S 3/09 | (2006.01) |
| H01S 3/094 | (2006.01) |

(52) U.S. Cl. ............ 252/586; 252/582; 252/301.17; 252/301.21; 252/301.22; 372/30; 372/53; 372/80; 544/93; 544/296; 544/78; 544/302; 430/73; 430/74; 430/945; 359/27; 359/264; 564/305; 564/307; 564/426; 564/427; 564/429; 564/441; 564/442; 564/443; 549/6; 549/33; 549/59; 549/68; 549/216; 549/475; 549/474; 549/49; 568/425; 568/631; 568/729

(58) Field of Classification Search ............. 252/586, 252/301.17, 301.21, 301.22, 600, 582, 583, 252/301.221; 372/30, 53, 80; 544/93, 296, 544/78, 302; 430/945, 73, 74; 359/27, 264; 564/443, 305, 307, 426, 427, 429, 441, 442; 548/303.7; 549/49, 33, 6, 59, 68, 216, 475, 549/474, 303.7; 568/425, 631, 729

See application file for complete search history.

(56) References Cited

U.S. PATENT DOCUMENTS

| | | | | |
|---|---|---|---|---|
| 4,014,871 | A |  | 3/1977 | Kormány et al. ......... 260/240 C |
| 4,041,476 | A |  | 8/1977 | Swainson et al. ............ 340/173 |
| 4,078,229 | A |  | 3/1978 | Swainson et al. ............ 340/173 |
| 4,079,082 | A | * | 3/1978 | Hammond et al. ........... 564/307 |
| 4,165,434 | A |  | 8/1979 | Schäfer et al. ................ 544/197 |
| 4,238,840 | A |  | 12/1980 | Swainson et al. ............. 365/119 |
| 4,271,395 | A |  | 6/1981 | Brinkman et al. ........ 331/94.5 L |
| 4,288,861 | A |  | 9/1981 | Swainson et al. ............. 365/127 |
| 4,333,165 | A |  | 6/1982 | Swainson et al. ............. 365/120 |
| 4,466,080 | A |  | 8/1984 | Swainson et al. ............. 365/106 |
| 4,471,470 | A |  | 9/1984 | Swainson et al. ............. 365/127 |
| 5,009,815 | A |  | 4/1991 | Wakita et al. ................. 252/582 |
| 5,034,613 | A |  | 7/1991 | Denk et al. ................. 250/458.1 |
| 5,086,239 | A |  | 2/1992 | Wang ........................... 359/328 |
| 5,196,250 | A | * | 3/1993 | Abe et al. ..................... 428/64.5 |
| 5,268,862 | A |  | 12/1993 | Rentzepis ..................... 365/151 |
| 5,451,494 | A |  | 9/1995 | Diehl et al. ................... 430/522 |
| 5,523,573 | A |  | 6/1996 | Hanninen et al. ............ 250/459 |
| 5,670,090 | A |  | 9/1997 | Marder et al. ................ 252/582 |
| 5,795,729 | A |  | 8/1998 | Lee ................................ 435/24 |
| 5,912,257 | A | * | 6/1999 | Prasad et al. ................. 546/329 |
| 6,267,913 | B1 | * | 7/2001 | Marder et al. ................ 252/582 |
| 6,379,590 | B1 | * | 4/2002 | Wu et al. ...................... 252/582 |
| 6,406,647 | B1 | * | 6/2002 | Thakur ......................... 252/582 |
| 6,432,610 | B1 | * | 8/2002 | Rentzepis et al. ........ 430/945 X |
| 2003/0052311 | A1 |  | 3/2003 | Inagaki et al. ................ 252/600 |

FOREIGN PATENT DOCUMENTS

| EP | 98101637.1 | | 9/1998 | |
|---|---|---|---|---|
| JP | 62-10652 A | * | 1/1987 | |
| JP | 62-047646 A | * | 3/1987 | |
| JP | 2187734 | | 7/1990 | ............... 252/582 |
| WO | PCT-WO 91/07651 | | 5/1991 | |
| WO | PCT-WO 98/21521 | | 5/1998 | |

OTHER PUBLICATIONS

Parttial translation of JP 02-187734 at col. 12, first two paragrapghs, Chisato Morohashi, USPTO, Alexandria, VA, (Jan. 2006), 1 page of 1.*

Derwent Abstract on EAST, week 198708, London: Derwent Publications Ltd., AN 1987-054023, JP 62-10652 A, (Minolta Camera Co Ltd), abstract.*

Derwent Abstract on EAST, week 198714, London: Derwent Publications Ltd., AN 1987-098574, JP 62-047646 A, (Konishiroku Photo Ind Co), abstract.*

Chen et al, "Measurements of Two-Photon Absorption Cross Sections of Common Blue Dyes", Optics Communications, vol. 63, No. 5, (Sep. 1, 1987), pp. 335-338.*

Joel M Kauffman, "Laser Dye Structures and Synonyms", Applied Optics, vol. 19, No. 20 (Oct. 15, 1980), pp. 3431-3435.*

Ershov et al, "Kinetics of photochemical transformations of 1,2-diaryl derivatives of ethylene and functional derivatives of stilbene in poly(vinyl chloride)", Khimiya Vysokikh Energii (1973), 7(4), 368-369, Abstract.*

Miyazawa et al., "Selective Isomerization of cis-Stilbene by Non-Resonant Two-Photon Excitation", Chemistry Letters, vol. 24, No. 3, (Mar. 1995), pp. 217-218.*

CAS online @ www.cas.org/, STN file CAPLUS, AN 1974:15388, Columbus, OH (1974—month unavailable) Abstract to Ershov et al, "Kinetics of photochemical transformations of 1,2-diaryl derivatives of ethylene and functional derivatives of stilbene in poly(vinyl chloride)", Khimiya Vysokikh Energii (1973), 7(4), 368-369 (downloaded May 13, 2010).*

CA indexed Structures corresponding to registry numbers CA online @ www.cas.org/, STN file REG, RN # 588-56-7, 588-59-0, 621-96-5, 659-22-3, 1588-49-4, 1931-49-3, 2039-68-1, 2042-99-1, 2765-14-2, 3960-21-2, 3960-21-2, 4705-32-2, 4705-34-4, 4752-74-3, 5121-74-4, 6292-62-2, 10374-80-8, Columbus, OH (downloaded May 24, 2010).*

Denk, Winfried; Strickler, James H; Webb, Watt W, "Two-Photon Laser Scanning Fluorescence Microscopy", Science; Apr. 6, 1990; 248, 4951; Research Library p. 73-76.*

Translation of Ershov et al, "Kinetics of photochemical transformations of 1,2-diaryl derivatives of ethylene and functional derivatives of stilbene in poly(vinyl chloride)", Khimiya Vysokikh Energii (1973), 7(4), 368-369, Abstract (Translation date May 20, 2010) pp. 1-2.*

Miyazawa et al., "Selective Isomerization of cis-Stilbene by Non-Resonant Two-Photon Excitation", Chemistry Letters, vol. 25, No. 12, (Dec. 1996), pp. 1023-1024.*

Anderson, et al., "Two-photon absorptivities of the all *trans* α, ω-diphenylpolyenes from stilene to diphenyloctatetraene via three wave mixing," *J. Chem. Phys.* 70 (9), pp. 4310-4315 (1979).

Beljonne, et al., "Two-photon absorption and third-harmonic generation of di-alkyl-amino-nitro-stilbene (DANS): A joint experimental and theoretical study," *J. Chem. Phys.* 103 (18), pp. 7834-7843 (1995).

Bhawalkar, et al., "Efficient, two-photon pumped green upconverted cavity lasing in a new dye," *Opt. Comm.* 124, pp. 33-37 (1996).

Birge, "An Introduction to Two-Photon Spectroscopy," *Spectroscopy of Biological Molecules: Theory and Applications—Chemistry, Physics, Biology, and Medicine*, No. 39, pp. 457-471 (1983).

Birnbaum, et al., "Location of a $^1A_g$ state in bithiophene," *J. Chem. Phys.*, 96 (4), pp. 2492-2495 (1992).

Birnbaum, et al., "Low lying singlet states of α, ω-dithienylpolyenes: α, ω-dithienylbutadiene, α, ω-dithienylhexatriene, and α, ω-dithienyloctatetraene," *J. Chem. Phys.*, 94 (3), pp. 1684-1691 (1991).

Brede, et al., "Photo- and Radiation-induced Chemical Generation and Reactions of Styrene Radical Cations in Polar and Non-polar Solvents," *J. Chem. Soc. Perkin Trans.* 2, pp. 23-32 (1995).

Carre, et al., "Biphotonic process for recording holograms with continuous-wave lasers in the near infrared," *Optics Letters*, 12 (9), pp. 646-647 (1987).

Casstevens, Martin K., et al., "A New Class of Materials for Optical Power Limiting", in Nonlinear Optical liquids and power limiters; Proceedings of the Meeting, San Diego, CA, Jul. 30-31, 1997 (A98-22080 05-74), Bellingham. Society of Photo-Optical Instrumentation Engineers (SPIE Proceedings, vol. 3146), 1997, p. 152-159.

Cha, et al., Two photon absorption of di-alkyl-amino-nitro-stilbene side chain polymer, *Appl. Phys. Lett.* 65 (21), pp. 2648-2650 (1994).

Couris, et al., "Concentration and wavelength dependence of the effective third-order susceptibility and optical limiting of $C_{60}$ in toluene solution," *J. Phys. B: At. Mol. Opt. Phys.* 28, pp. 4537-4554 (1995).

Denk, et al., "Anatomical and functional imaging of neurons using 2-photon laser scanning microscopy," *J. Neuroscience Methods* 54, pp. 151-162 (1994).

Denk, et al., "Two-Photon Laser Scanning Fluorescence Microscopy," *Science* 248. pp. 73-76 (1990).

Desai, et al., "Laser-Induced Polymerization within Carbon Disulfide Clusters," *J. Phys. Chem.*, 99 (6), pp. 1786-1791 (1995).

El-Shall, et al., "Comparative Polymerization in the Gas Phase and in Clusters. 2. Electron Impact and Multiphoton-Induced Reactions in Isobutene and Benzene/Isobutene Clusters," *J. Am. Chem. Soc.*, 117 (29), pp. 7744-7752 (1995).

Fuke, et al., "Two-Photon Absorption spectrum of Trans-Stilbene, Trans-Cis Photoisomerization via Upper $^1A_g$ State," *Chem. Phys. Ltrs.* 74 (3), pp. 546-548 (1980).

Goodman, et al., "Two-Photon Spectra of Aromatic Molecules," *Acc. Chem. Res.* 17, pp. 250-257 (1984).

He, et al., "Nonlinear optical properties of a new chromophore," *J. Opt. Soc. Am B* 14 (5), pp. 1079-1087 (1997).

He, et al., "Studies of two-photon pumped frequency-unconverted lasing properties of a new dye material," *J. Appl. Phys.* 81 (6), pp. 2529-2537 (1997).

He, et al., "Two-photon absorption and optical-limiting properties of novel organic compounds," *Opt. Lett.* 20 (18), pp. 435-437 (1995).

He, et al., "Two-photon absorption based optical limiting and stabilization in organic molecule-doped solid materials," *Opt. Comm.*, 117, pp. 133-136 (1995).

He, et al., "Upconversion dye-doped polymer fiber laser," *Appl. Phys. Lett.* 68 (25), pp. 3549-3551 (1996).

Hunter, et al., "Potentials of two-photon based 3-D optical memories for high performance computing," *Applied Optics* 29 (14), pp. 2058-2066 (1990).

Itoh, et al., "Dual Fluorescence of Diphenylpolyenes," *J. Phys. Chem.*, 91 (7), pp. 1760-1764 (1987).

Itoh, et al., "Fluorescence quantum yields of α, ω-diphenylpolyenes," *Spectrochimica Acta* 50A (13), pp. 2261-2263 (1994).

Jones, et al., "Direct observation of the $2.^1A_g^-$ electronic state of carotenoid molecules by consecutive two-photon absorption spectroscopy," *J. Photochem. Photobiol. A: Chem.* 68, pp. 59-75 (1992).

Kennedy, et al., "p-Bis(*o*-methylstyryl)benzene as a Power-Squared Sensor for Two-Photon Absorption Measurements between 537 and 694 nm," *Anal. Chem.* 58 (13), pp. 2643-2647 (1986).

Kim, et al., "Synthesis of Electroluminescent Polymer containing charge Transport and Emissive Chromophores on Polymer Skeleton," *Chemistry Letters*, pp. 587-588 (1995).

Kohler, et al., "Fluorescence from the $1^1B_u$ State of Diphenylhexatriene: Inversion of the $1^1B_u$ and $2^1A_g$ Levels in $CS_2$," *J. Phys. Chem.*, 92 (18), pp. 5120-5122 (1988).

Kohler, et al., "Saturation kinetics of the $S_0$ to $S_2$ optical transition in isolated diphenylhexatriene," *J. Chem. Phys.*, 82 (7), pp. 2939-2941 (1985).

Kumar, et al., "Optical nonlinearity in a mode-locking dye: optical limiting and four wave mixing," *Chemical Physics Letters* 245, pp. 287-291 (1995).

Lakowicz, et al., "Two Photon-Induced Fluorescence Intensity and Anisotropy Decays of Diphenylhexatriene in Solvents and Lipid Bilayers," *Journal of Fluorescence* 2 (4), pp. 247-258 (1992).
Lin, et al., "Dual Fluorescence of ρ,ρ'-Disubstituted 1,6-Diphenyl-1,3,5-hexatrienes: Evidence of a Twisted Intramolecular Charge Transfer State," *J. Phys. Chem.* 93 (1), pp. 39-43 (1989).
Luo, et al., "One- and Two-Photon Absorption Spectra of Short Conjugated Polyenes," *J. Phys. Chem.* 98 (32), pp. 7782-7789 (1994).
Maiti, et al., "Measuring Serotonin Distribution in Live Cells with Three-Photon Excitation," *Science* 275, pp. 530-532.
Maruo, et al., "Three-dimensional microfabrication with two-photon-absorbed photopolymerization," *Opt. Lett.* 22 (2), pp. 132-134 (1997).
McEwan, et al., "Picosecond-induced Nonlinear Absorption in Liquid Crystal Media," *J. Nonlinear Opt. Phys. and Mater.* 4 (1), pp. 245-260 (1995).
Mertz, et al., "Single-molecule detection by two-photon-excited fluorescence," *Optics Letters* 20 (24), pp. 2532-2534 (1995).
Narang, et al., "Characterization of a New Solvent-Sensitive Two-Photon-Induced Fluorescent (Aminostyryl)pyridinium Salt Dye," *J. Phys. Chem.* 100 (11), pp. 4521-4525 (1996).
Parma, et al., "Two-Photon Absorption of 7-Hydroxycoumarine," *Chem. Phys. Lett.* 54 (3), pp. 541-543 (1978).
Parthenopoulos, et al., "Three-Dimensional Optical Storage Memory," *Science* 245, pp. 843-845 (1989).
Plakhotnik, et al., "Nonlinear Spearoscopy on a Single Quantum System: Two-Photon Absorption of a Single Molecule," *Science* 271, pp. 1703-1705 (1996).
Prasad, et al., "Multiphoton Resonant Nonlinear Optical Processes in Organic Molecules," ACS Symposium, Chapter 13, pp. 225-236 (1996).
Puccetti et al., "Chain-Length Dependence of the Third-Order Polarizability of Disubstituted Polyenes. Effects of End Groups and Conjugation Length," *J. Phys. Chem.*, 97 (37), pp. 9385-9391 (1993).
Rava, et al., "Regularities in the two-photon spectra of polysubstituted benzenes," *J. Chem. Phys.*, 77 (10), pp. 4912-4919 (1982).
Rice, et al., "Two-Photon, Thermal Lensing Spectroscopy of Monosubstituted Benzenes in the $^1B_{2u}(^1L_b) \leftarrow ^1A_{1g}(^1A)$ and $^1B_{1u}(^1L_a) \leftarrow ^1A_{1g}(^1A)$ Transition Regions", *J. Phys. Chem.* 90, pp. 6793-6800 (1986).
Roux, et al., "Two-photon-absorption-induced luminescence in organic waveguide couplers," *J. Opt. Soc. Am. B*, 12 (3), pp. 428-433 (1995).
Said, et al., "Third- and fifth-order optical nonlinearities in organic materials," *Chem. Phys. Lett.* 228, pp. 646-650 (1994).
Stachelek, et al., "Detection and assignment of the 'phantom' photochemical singlet of *trans*-stilbene by two-photon excitation," *J. Chem. Phys.* 66 (10), pp. 4540-4543 (1977).
Strickler, et al., "3-D Optical Data Storage by Two-Photon Excitation," *Adv. Mater.* 5 (6), pp. 479-481 (1993).
Strickler, et al., "Three-dimensional optical data storage in refractive media by two-photon point excitation," *Optics Letters* 16 (22), pp. 1780-1782 (1991).
Strickler, et al., "Two-photon excitation in laser scanning fluorescence microscopy," *SPIE* 1398, pp. 107-118 (1990).
Sutherland, et al., "Two-photon absorption and second hyperpolarizability measurements in diphenylbutadiene by degenerate four-wave mixing," *J. Chem. Phys.* 98 (4), pp. 2593-2603 (1993).
Tackx, et al., "Distinction of two-photon absorption from other nonlinear loss mechanisms by phase-conjugate interferometry," *Appl. Phys. Lett.* 65 (3), pp. 280-282 (1994).
Williams, et al., "Two-photon molecular excitation provides intrinsic 3-dimensional resolution for laser-based microscopy and microphotocheminry," *The FASEB Journal* 8, pp. 804-813 (1994).
Wong, et al., "Measurements of $\chi^{(3)}(\omega; \omega, -\omega, \omega)$ in conducting polymers at λ=620 nm," *Synthetic Metals* 49-50, pp. 13-20 (1992).
Xu, et al., "Determination of absolute two-photon excitation cross sections by in situ second-order autocorrelation," *Optics Letters* 20 (23), pp. 2372-2374 (1995).
Xu, et al., "Measurement of two-photon excitation cross sections of molecular fluorophores with data from 690 to 1050 nm," *J. Opt. Soc. Am. B* 13 (3), pp. 481-491 (1996).
Zhao, et al., "Influence of two-photon absorption on third-order nonlinear optical processes as studied by degenerate four-wave mixing: The study of soluble didecyloxy substituted polyphenyls," *J. Chem. Phys.* 95 (6), pp. 3991-4001 (1991).
Zhao, et al., "Newly Synthesized Dyes and Their Polymer/Glass Composites for One- and Two-Photon Pumped Solid-State Cavity Lasing," *Chem. Mater.* 7 (10), pp. 1979-1983 (1995).
Cumpston B H et al: "New Photopolymers Based on Two-Photon Absorbing Chromophores and Application to Three-Dimensional Microfabrication and Optical Storage" Materials Research Society, Pittsburgh, PA, US. vol. 488, May 6, 1998, pp. 217-225, XP008000191, ISSN: 0272-9172.
Barlow S et al; "Design, Synthesis and Applications of Two-Photon Absorbing Organic Molecules"; Polymer Preprints, American Chemical Society, US, vol. 39, No. 2, Aug. 19, 1998, p. 1116, XP000878658; ISSN: 0032-3934.
European International Searching Authority, "European Search Report", cited in corresponding European Patent Application No. EP 99918616.6, dated Jan. 19, 2005, 6 pages.
Zelichenok et al., Quinolinium-Derived Acentric Crystals for Second-Order NLO Applications with Transparency in the Blue, J. Phys. Chem. B 1999, 103, 8702-8705.
Burland et al., The Design, synthesis, and evaluation of chromophores for second-harmonic generation in a polymer waveguide, J. Appl. Phys. 71 (1), Jan. 1, 1992, 410-417.
Kang et al., X-shaped Electro-optic Chromophore with Remarkably Blue-Shifted Optical Absorption, J. Am Chem. Soc. 2006, 128, 6194-6205.
Nemoto et al., Polyamides for Nonlinear Optics Containing Second-Order NLO-phores with High Density, Chem. Mater. 1996, 8, 1527-1534.

\* cited by examiner

*Primary Examiner* — Daniel S Metzmaier
(74) *Attorney, Agent, or Firm* — David W. Maher

(57) ABSTRACT

Compositions capable of simultaneous two-photon absorption and higher order absorptivities are provided. Compounds having a donor-pi-donor or acceptor-pi-acceptor structure are of particular interest, where the donor is an electron donating group, acceptor is an electron accepting group, and pi is a pi bridge linking the donor and/or acceptor groups. The pi bridge may additionally be substituted with electron donating or withdrawing groups to alter the absorptive wavelength of the structure. Also disclosed are methods of generating an excited state of such compounds through optical stimulation with light using simultaneous absorption of photons of energies individually insufficient to achieve an excited state of the compound, but capable of doing so upon simultaneous absorption of two or more such photons. Applications employing such methods are also provided, including controlled polymerization achieved through focusing of the light source(s) used.

19 Claims, 15 Drawing Sheets

Scheme: Synthesis of piperidine stilbenes.

Scheme: Synthesis of 4-[N-(t-Butoxycarbonyl)]-piperazine-benzaldehyde.

Scheme showing the synthesis of dimethacrylate substituted bisdonor-stilbenes.

X= p-NO2, p-CN, p-OMe, 3,5-Dinitro

Optical limiting by two-photon induced excited state absorption in 4-dimethylamino-4' dibutylaminostilbene (MBDAS) (points). Straight line corresponds to the linear transmission of %96.

Two-photon optical limiting responses of 0.01 and 0.134 M solutions of 4,4'-bis(dibutylamino)stilbene for ~5-ns, 600 nm pulses. The straight line corresponds to the linear transmision (96%) of the 0.134 M solution.

Linear transmission spectrum (solid line) of a mixture of 4,4'-bis(dibutylamino)stilbene and 4,4'-bis(diphenylamino)stilbene for a total molecular concentration of 0.1M. Spectra of effective two-photon absorption cross sections for 4,4'-bis(di-n-butylamino)stilbene (triangles) and 4,4'-bis(diphenylamino)stilbene (squares).

Nonlinear transmission data showing enhanced effective two-photon absorption in a 1-(4-dimethylaminophenyl)-10-(4-dibutylaminophenyl)-deca-1,3,5,7,9-pentane (squares) as compared to the 4,4'-bis(di-n-butylamino)stilbene (circles). Measurements were performed at 598 nm using 0.01M solutions.

TWO-PHOTON OR HIGHER-ORDER ABSORBING OPTICAL MATERIALS AND METHODS OF USE

CROSS REFERENCE TO RELATED APPLICATIONS

This application is a continuation of U.S. application Ser. No. 08/965,945 filed Nov. 7, 1997, now U.S. Pat. No. 6,267,913 and claims the benefit of U.S. Provisional Application No. 60/029,443 entitled "Two-Photon Optical Limiting Materials," U.S. Provisional Application No. 60/029,437, entitled "Two-Photon Absorbing Polymerization Initiators" and U.S. Provisional Application No. 60/030,141, entitled "Two-Photon Absorbing Optical Materials", all filed Nov. 12, 1996, the disclosure of each of which is incorporated herein by reference.

ORIGIN OF INVENTION

The invention described herein was made in the performance of work under a NASA contract and is subject to the provisions of Public Law 96-517 (35 U.S.C. 202) in which the Contractor has elected to retain title. The invention was also partially supported by the United States Government through the Office of Naval Research (ONR Grant No. N00014-95-1-1319 and NAV00149611097), Air Force Office of Scientific Research (AFSOR Grant No. AFS5F49620-97-1-0200) and the National Science Foundation (NSF Grant No. CHE 94-08701, Amendment 001).

BACKGROUND OF THE INVENTION

1. Field of the Invention

The invention relates generally to materials which exhibit nonlinear absorptive properties. More particularly, the invention relates to materials which have high two-photon or higher-order absorptivities and methods for their use.

2. Description of the Related Art

Molecular two-photon absorption was predicted in Göppert-Mayer, M., *Ann. Phys.* 1931, 9, 273. Upon the invention of pulsed ruby lasers in 1960, experimental observation of two-photon absorption became reality. In years since, multi-photon excitation has found application in biology and optical data storage, as well as in other fields.

Although interest in multi-photon excitation has exploded, there is a paucity of two-photon absorbing dyes with adequately strong two-photon absorption in the correct spectral region for many applications.

There are two key advantages of two-photon (or higher-order) induced processes relative to single-photon induced processes. Whereas single-photon absorption scales linearly with the intensity of the incident radiation, two-photon absorption scales quadratically. Higher-order absorptions will scale with yet a higher power of incident intensity. As a result, it is possible to perform multi-photon processes with three dimensional spatial resolution. Further, because these processes involve the simultaneous absorption of two or more photons, the chromophore is excited with a number of photons whose total energy equals the energy of a multi-photon absorption peak, although each photon individually has insufficient energy to excite the chromophore. Because the exciting light is not attenuated by single-photon absorption in this case, it is possible to excite selectively molecules at a greater depth within a material than would be possible via single-photon excitation by use of a beam that is focused to that depth in the material. These two advantages also apply to, for example, excitation within tissue or other biological materials. In multi-photon lithography or stereolithography, the nonlinear scaling of absorption with intensity can lead to the ability to write features below the diffraction limit of light and the ability to write features in three dimensions, which is also of interest for holography.

The ability to realize many of the possible applications of two-photon or higher-order absorption by molecules rests on the availability of chromophores with large two-photon or higher-order absorption cross sections.

SUMMARY OF THE INVENTION

Many of the compounds useful according to the invention can be described by one of four structural motifs. These compounds exhibit enhanced two-photon or multi-photon absorptivities and allow one to control the position of two-photon or multi-photon absorption bands. The motifs may be generally categorized as follows:
a) molecules in which two donors are connected to a conjugated π (pi)-electron bridge (abbreviated "D-π-D" motif);
b) molecules in which two donors are connected to a conjugated π (pi)-electron bridge which is substituted with one or more electron accepting groups (abbreviated "D-A-D" motif);
c) molecules in which two acceptors are connected to a conjugated π (pi)-electron bridge (abbreviated "A-π-A" motif); and
d) molecules in which two acceptors are connected to a conjugated π (pi)-electron bridge which is substituted with one or more electron donating groups (abbreviated "A-D-A" motif).

We have found that molecules which take these forms can be designed to operate in methods wherein the compounds undergo simultaneous two-photon (or higher-order) absorption, forming compositions which include molecules in an electronically excited state. These excited state species can be used in a great variety of subsequent method steps.

BRIEF DESCRIPTION OF THE DRAWINGS

The invention will be better understood by reference to the following drawings, in which.

DETAILED DESCRIPTION OF THE PREFERRED EMBODIMENTS

Figure 1:
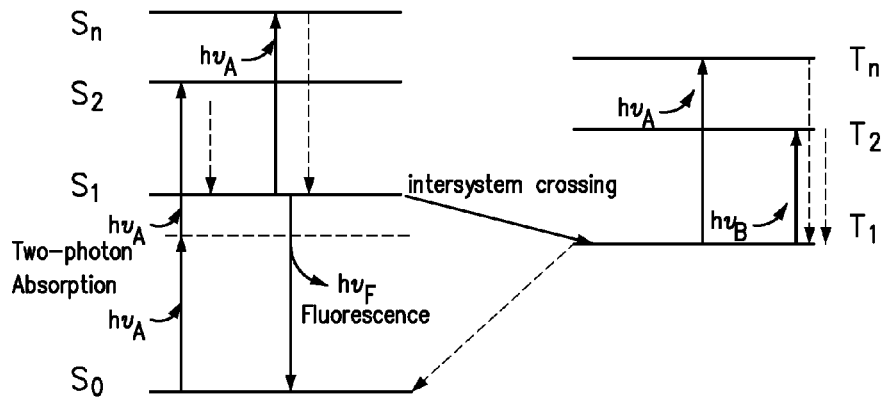
FIG. 1 schematically illustrates an intersystem crossing from the singlet manifold of states to the triplet manifold of states according to the invention.

To ensure a complete understanding of the invention, the following definitions are provided:

By the term "bridge", it is meant a molecular fragment that connects two or more chemical groups.

By the term "donor", it is meant an atom or group of atoms with a low ionization potential that can be bonded to a π (pi)-conjugated bridge.

Exemplary donors, in order of increasing strength, are:

I<Br<Cl<F<OC(O)R<SH<OH<SR<OR<NHC(O) R<NH$_2$<NHR<NR$_2$<S$^-$<O$^-$

Other donors that have donating strength greater than SR include:

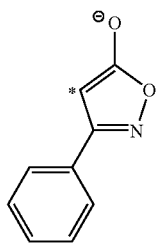

*indicates the point of attachment to the π-conjugated bridge.

By the term "acceptor", it is meant an atom or group of atoms with a high electron affinity that can be bonded to a π (pi)-conjugated bridge.

Exemplary acceptors, in order of increasing strength, are:

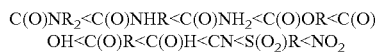

Other acceptors that have accepting strength greater than C(O)R include:

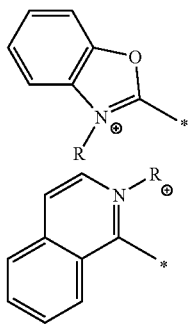
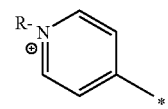
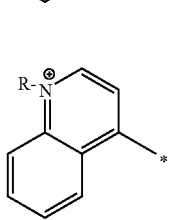
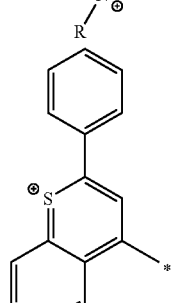
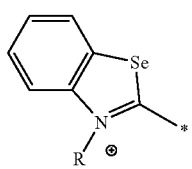
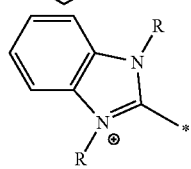
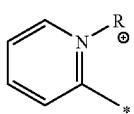
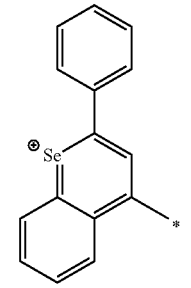
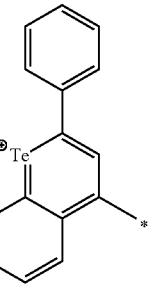
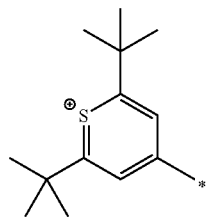
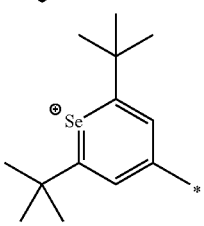
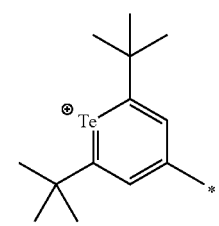

Where R is as defined below in Note 3B, and X(O) indicates that the element oxygen is double bonded to the element X and * indicates the point of attachment to the π-conjugated bridge.

A more complete description of what is meant by electron donors or donating groups and electron acceptors or electron accepting groups can be found in J. March, *Advanced Organic Chemistry: Reactions, Mechanisms and Structure*, Fourth edition, Wiley-Interscience, New York, 1992, Chapter 9, which is incorporated herein by reference.

By the phrase "aromatic group", it is meant a carbocyclic group that contains $4n+2\pi$ electrons where n is an integer.

By the phrase "heteroaromatic group", it is meant a cyclic group of atoms, with at least one atom within the ring being an element other than carbon, that contains $4n+2\pi$ electrons where n is an integer. A more complete description of aromaticity and heteroaromaticity can be found in J. March, *Advanced Organic Chemistry: Reactions, Mechanisms and Structure*, Fourth edition, Wiley-Interscience, New York, 1992, Chapter 2, which is incorporated herein by reference.

By the term "chromophore", it is meant a molecule, a molecular fragment, or aggregate of molecules that can absorb electromagnetic radiation.

By the term "simultaneous", it is meant that two events that occur within the period of $10^{-14}$ sec or less.

By the phrase "excited state", it is meant an electronic state of a molecule wherein electrons populate an energy state that is higher than another energy state for the molecule.

By the phrase "two-photon absorption", it is meant the process wherein a molecule absorbs two quanta of electromagnetic radiation to reach an excited state.

By the phrase "multi-photon absorption", it is meant a process wherein a molecule absorbs two or more quanta of electromagnetic radiation to reach an excited state.

By the phrase "optical limiting", it is meant a process wherein the optical transmission of a body decreases with increasing incident optical intensity or fluence such that the intensity or fluence transmitted by the body does not exceed a prescribed level for a prescribed range of incident optical intensity or fluence.

A "π-conjugated bridge" contains covalent bonds between atoms that both have σ bonds and π bonds formed between two atoms by overlap of their atomic orbitals (s+p hybrid atomic orbitals for σ bonds; p atomic orbitals for π bonds) with two orbitals ($sp^3$, $sp^2$, sp) overlapping end-to-end to form a σ bond lying directly between the nuclei. In particular, when two p orbitals are standing perpendicular to the σ-bonded skeleton and overlapping sideways, a π bond is formed. When there are adjacent p orbitals on each side of an atom, and they overlap with the p orbital on that atom, a situation is created such that a more extended π orbital is formed in which the electrons in the orbital are no longer confined between two atoms, but rather are delocalized, over a greater number of nuclei. For this to occur, each successive atom bearing a p orbital for overlap must be adjacent to the last. (Sideways overlap of p orbitals is not significant for atoms more than a bond length apart, that is, ~1.5 Å.)

This delocalization of π electrons is of central importance to the chemical and physical properties of unsaturated molecules. In particular, a π-conjugated bridge is one having a formal structure consisting of double or triple bonds alternating with single bonds where the double and triple bonds are capable of further π overlap with each other. Such bridges are said to be π-conjugated and include conjugated double or triple bonds.

Introduction

The invention generally provides compositions of matter that have large two-photon or higher-order absorptivities and in some cases large fluorescence quantum yields, leading to efficient two-photon or higher-order excited fluorescence. By two-photon or higher-order absorption, we refer to the initial simultaneous absorption of two or more photons (also referred to as multi-photon absorption), without the actual population of an excited state by the absorption of a single photon. Subsequent to the initial absorption of two or more photons by the molecule, it is possible for the molecule to absorb additional photons from the state populated by the initial absorption event or from a state to which the molecule relaxes.

If sufficient total energy is absorbed by the molecule, it is possible to photoionize the molecule, thereby creating a radical cation of the molecule and an unbound electron. Conversion of a molecule to an excited state by two-photon or higher-order absorption according to the invention enables many applications which can be induced from such an excited state, as described below.

For example, we have found that stilbene, diphenylpolyene, phenylene vinylene oligomers, and related molecules having two or more electron donor groups, such as amino groups or alkoxy groups, connected to aromatic or heteroaromatic end groups as part of a π (pi)-electron bridge (the combination referred to herein as "D-π-D" molecules) exhibit unexpectedly and unusually high two-photon or higher-order absorptivities in comparison to unsubstituted dyes such as stilbene, diphenylpolyenes, phenylene vinylene oligomers and related molecules, respectively. In addition, the strength and position of the two-photon or higher-order absorption of these molecules can be tuned and further enhanced by appropriate substitution of the it-electron bridge with at least one electron accepting group, such as cyano, (referred to herein as "D-A-D" molecules). We have further discovered that molecules having two or more electron acceptor groups such as formyl or dicyanomethylidene groups, connected to aromatic or heteroaromatic end groups as part of a π (pi)-electron bridge (referred to herein as "A-π-A" molecules) exhibit unexpectedly and unusually high two-photon or higher-order absorptivities in comparison to dyes such as stilbene, diphenylpolyenes, phenylene vinylene oligomers and related molecules. The strength and position of the two-photon or higher-order absorption of these molecules can be tuned and further enhanced by appropriate substitution of the π-electron bridge with electron donating groups, such as methoxy, to form "A-D-A" molecules.

General Description of Structural Motifs

As a feature of the invention, we have discovered that the aromaticity of the π-bridge in the electronic ground state is important in determining the energetic position of the electronic state which is responsible for multi-photon absorption relative to the state responsible for one-photon absorption. In particular, having donors attached to aromatic groups or heteroaromatic groups, i.e., D-π-D and D-A-D structures, is conducive to the occurrence of the highly absorbing two-photon state energetically above that of the strongly fluorescent one-photon state, which is essential for the molecule to exhibit a high multi-photon fluorescence excitation efficiency. In D-A-D molecules, upon absorption of photons, charge is redistributed from the electron donor groups toward the π-electron bridge, thereby enhancing the molecules' photon absorption characteristics.

In addition, having acceptors attached to aromatic groups or heteroaromatic groups, i.e., A-π-A and A-D-A structures, is conducive to the occurrence of the highly absorbing two-photon state energetically above that of the strongly fluorescent one-photon state. In A-D-A molecules, upon absorption of photons, charge is transferred from the π-electron bridge toward the electron accepting groups, thereby enhancing the molecules' photon absorption characteristics.

Accordingly, the combination of the intrinsically high fluorescence quantum efficiency for these molecules and the rapid relaxation of the two-photon excited molecule from the two-photon state to the lower lying fluorescent one-photon state makes the molecules according to the invention highly efficient multi-photon excitable fluorescent emitters.

As a result of their large multi-photon absorptivities, molecules according to the invention can be used for two-photon or higher-order sensitization by exploiting various photophysical or photochemical mechanisms such as energy transfer or charge transfer. The two-photon or higher-order absorber may directly sensitize various reactions or may transfer energy or charge to another sensitizer which itself sensitizes a further chemical reaction. Applications which would exploit these novel two-photon or higher-order sensitization properties would include photo-deprotection, photocaging or uncaging of biological molecules, photoinitiated polymerization, photochromism, photodissociation, photodimerization, photoisomerizadon, photoinduced electrocyclic rearrangement and photodeposition of various materials including metals, ceramics, ceramic-polymer composites, metal oxides, and metal chalcogenides.

In particular, any photochemical reaction which could be carried out by energy transfer or electron transfer could be performed by taking advantage of the associated benefits of two-photon or multi-photon absorption provided that either the $S_1, S_2, \ldots S_n, T_1, T_2, \ldots T_n$ (where S refers to a singlet state and T refers to a triplet state and have the usual meaning as described in N. J. Turro, *Modern Molecular Photochemistry*, Benjamin/Cumming Publishing Company, Menlo Park, 1978, which is incorporated herein by reference) excited states of the molecule were populated by said two-photon or multi-photon absorption or subsequent relaxation and had sufficient energy and/or reducing potential and/or oxidizing potential to foster the desired reaction.

If the reaction or sensitization process occurs from the triplet state, it is necessary to employ any of a number of well-known mechanisms to foster intersystem crossing from the singlet manifold of states to the triplet manifold of states as shown in FIG. 1. Mechanisms to foster such intersystem crossing processes include, but are not limited to, the inclusion of heavy atoms with large spin-orbit coupling coefficients, the attachment of aromatic ketones to the π-bridge electronic system of the multi-photon absorbing chromophores and attachment of paramagnetic groups.

The advantageous combination of strong multi-photon absorption and the ability to sensitize, catalyze, initiate or otherwise render possible chemical reactions, changes of state of materials and emission of light, allow the compounds described here to have a great variety of novel and useful applications including, but not limited to, those described below.

These new two-photon or multi-photon absorbing molecules may be used as fluorophores in microscopy, biological imaging, photodynamic therapy, pathology assays and medical diagnostics.

These new two-photon or multi-photon absorbing molecules may be used as fluorophores in thin films and materials for imaging and analysis, especially in paint compositions, laminants, dental fillings or other coatings.

These new two-photon or multi-photon absorbers may be used for two-photon generation of charge carriers, especially in photorefractive polymers.

These new two-photon or multi-photon fluorophores may be used in three dimensional light emitting displays.

These new two-photon or multi-photon absorbers may be used in holographic recording materials involving the use of a single or two different optical wavelengths for the recording process.

These new two-photon or multi-photon fluorophores may be used as two-photon or multi-photon laser dyes with upconverted emission.

These new two-photon or multi-photon fluorophores may be used for sensing applications including, but not limited to, sensing of metal ions and other species in solution, to electric fields or changes thereof (as in measurements of membrane potentials), viscosity of the surrounding environment and changes thereof, dielectric constants of the environment and changes thereof, biologically relevant organic molecules including, but not limited to, drugs, DNA sequences, antibodies, metabolites, hormones, explosives and neurotoxins. Such sensing relies on the fact that the fluorescence properties of these molecules, including their emission wavelength, efficiency and lifetimes, are all parameters known to be sensitive in a quantifiable manner to external perturbations.

These new two-photon or multi-photon absorbers may be used as fluorophores for imaging of flow fields and diffusional fronts in gels or other porous media, especially in electrophoretic gels.

These new two-photon or multi-photon absorbers may be used for two-photon or multi-photon two-dimensional or three-dimensional optical lithography and three dimensional optical memory.

These new two-photon or multi-photon absorbers may be used for optical limiting and optical switching.

These new two-photon or multi-photon absorbers may be used to access photochemistry that would ordinarily be enabled by single-photon absorption. Thus, any photochemical reaction that can be carried out either by charge or electron transfer can be performed by taking advantage of the associated benefits of two-photon or higher-order absorption provided that the $S_1$, $S_2$ or $S_N$ excited state, $T_1$, $T_2$ or $T_N$ excited state (where S refers to singlet and T refers to triplet) of the molecule has sufficient energy and/or redox potential to foster the desired reaction.

A more extensive listing of applications that would be rendered substantially more useful by virtue of the large two-photon or multi-photon absorptivities of the compounds described herein can be found, for example, in U.S. Pat. Nos. 4,228,861, 4,238,840, 4,471,470, 4,333,165, 4,466,080 and 5,034,613, which are incorporated herein by reference. Additional examples of photochemical reactions that could be induced by the excited states that can be populated by multi-photon absorption by the compounds described herein can be found in N. J. Turro, *Modern Molecular Photochemistry*, Benjamin/Cumming Publishing Company, Menlo Park, 1978, incorporated herein by reference.

Correlation of Structure and Function

Figure 2:
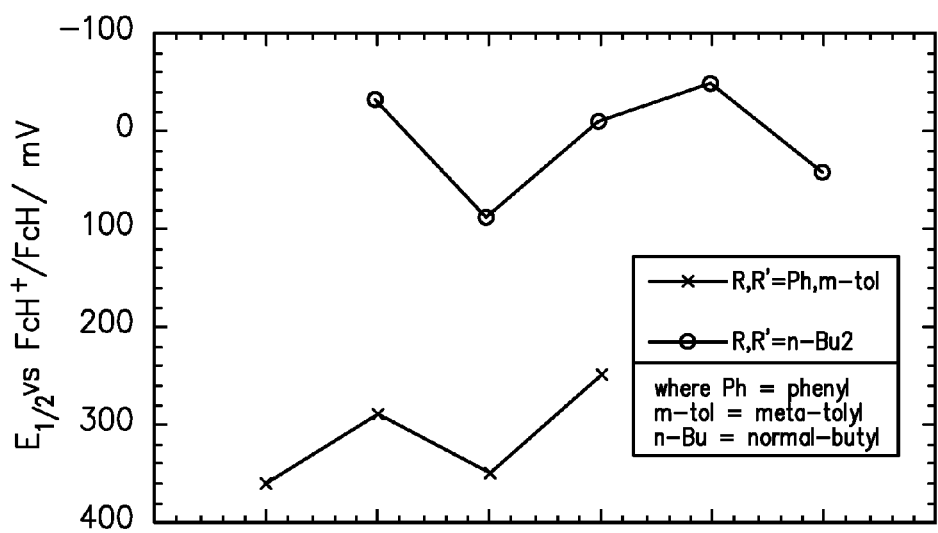
FIG. 2 is a graph of oxidation potentials for two series of diamines according to the invention.
Figure 2:
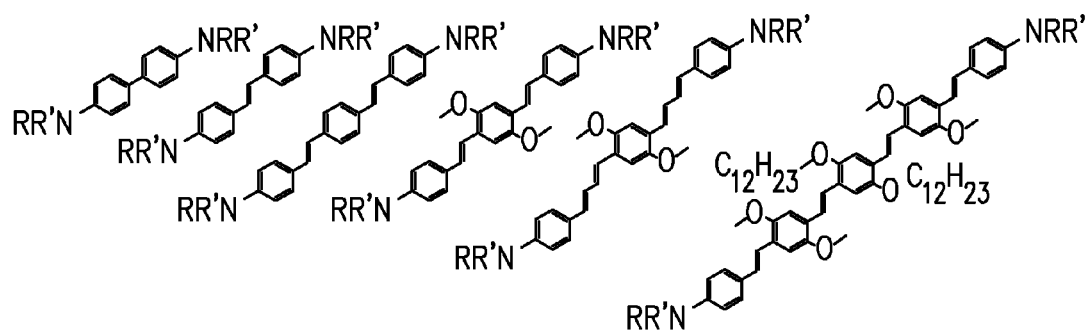

Another feature of molecules in one embodiment of the invention is that molecules "end capped" with electron donor substituents, i.e., D-π-D and D-A-D structures, have relatively low oxidation potentials, $E_{1/2}$ (in tetrahydrofuran) for the ground-state as exemplified for the series of diamines having increasing length of π-conjugated bridge in FIG. 2.

Upon multi-photon excitation, these molecules become very strong excited state reducing agents and can therefore be used as multi-photon excited electron donors. Such materials can transfer electrons to electron acceptors (which may be covalently attached to the multi-photon absorbing chromophore or could be in a region of space near the multi-photon absorbing chromophore, as would be the case in a concentrated fluid solution or solid solution) to create a radical cation, in the case of the multi-photon absorbing dye and a radical anion, in the case of the acceptor.

Another feature of some molecules in one embodiment of the invention is that molecules "end capped" with electron accepting substituents, i.e., A-π-A and A-D-A structures, have relatively high electron affinities in the ground-state form. Furthermore, upon multi-photon excitation, these molecules become very strong excited state oxidizing agents and can therefore be used as multi-photon excited electron acceptors. Such materials can accept electrons from electron donors (which may be covalently attached to the multi-photon absorbing chromophore or could be in a region of space near the multi-photon absorbing chromophore as would be the case in a concentrated solution or solid solution) to create a radical anion, in the case of the multi-photon absorbing dye, and a radical cation, in the case of the donor.

Such radical cations and anions may have different spectroscopic properties from their neutral counterparts and therefore may be used as transient photochromic materials for optical limiting and optical signal processing.

In addition, these radical ion species generated upon multi-photon absorption can be chemical reactants. For example, these multi-photon absorbing materials can be used to initiate polymerization of monomers which can be polymerized either by radical or ionic mechanisms in the presence or absence of polymerization promoters, including chain transfer agents. Examples of monomers which can be polymerized in these ways include, but are not limited to, vinyl monomers including acrylonitriles, acrylates, diacrylates, triacrylates, polyacrylates, styrenes, trifunctional isocyanurates substituted with acrylates, vinyl- and allyl-containing monomers, divinylbenzene and polymers which are end-capped with or have these groups attached to the carbon backbone such as polyurethanes, polyesters and polyolefins. Additional examples of polymerizable monomers may be found in G. Odian, *Principles of Polymerization*, Second Edition, John Wiley and Son, New York, 1981, page 181, which is incorporated herein by reference.

Another feature of the invention is that the oxidation potential, reduction potential and the energy difference between the ground state and the fluorescent excited state can be precisely tuned such that the excited state reduction or oxidation potential can also be tuned. In this manner, using the theory for electron transfer developed by Marcus, it is possible to tune both the forward electron transfer rate and charge recombination rate (G. J. Karvaros and N. J. Turro, Chem. Rev. 86, 401-449, 1986). This tunability allows control of, for example, the initiation rate of polymerization or the time constants for generation of absorption changes and recovery in transient photochromic materials.

Another feature of the invention is that it is possible to selectively control the position of the multi-photon absorption peak in these molecules by controlling the substituents on the electron donor groups. For example, replacement of the alkyl groups with phenyl groups on the amine of 4,4'-multi-photon absorbing chromophores over a very wide range by the appropriate substitution of the donor groups. For example, 4,4'-bis-dimethylaminostilbene and 4,4'-bis-(diphenyl)aminostilbene are sparingly soluble in nonpolar organic solvents whereas 4,4'-bis(-di-n-butylamino)stilbene and 4,4'-bis(di-(4-n-butylpheny)aminostilbene are very soluble, i.e., are lipophilic. In contrast, the hydrochloric acid adduct of the bis-lysyl ester of 4-diethylamino 4'-diethanolaminostilbene and the bis-lysyl ester of 1-(4-dimethylaminophenyl)-4-(4'-diethanolaminophenyl) buta-1,3-diene shown below are hydrophilic. In each case, the molecules maintain their fluorescence in organic and aqueous solution.

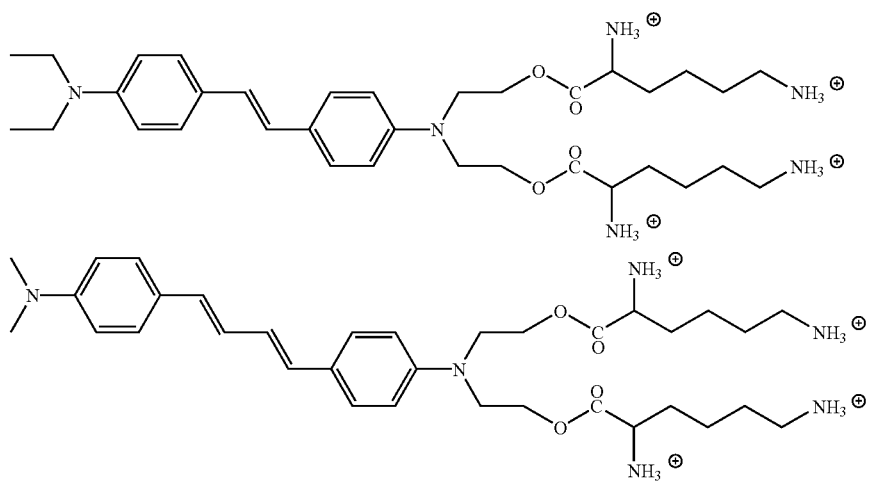

diaminostilbene results in a minimal shift of the linear absorption edge to a longer wavelength, but a shift of the multi-photon absorption maximum 90 nm to longer wavelength.

Another feature of this invention is that it is possible to control the position of the multi-photon absorption peak in these molecules by controlling the number of conjugated double bonds between the two donor-substituted aromatic or heteroaromatic end groups for Class 1 compounds (described below), or between the two electron acceptor-substituted aromatic or heteroaromatic end groups for Class 2 compounds (described below). Increasing the number of double bonds leads to a considerable shift of the multi-photon absorption band to longer wavelength. Incorporation of phenylene-vinylene groups between the end groups has a similar effect.

In most cases, these shifts also result in considerable shifts of the emission maxima to lower energy, which is useful for tuning the multi-photon induced energy transfer properties. This is the case because in the Forster energy transfer mechanism, the energy transfer rate depends upon the degree of overlap of the fluorescence band of the multi-photon absorbing energy donor with the absorption band of the energy-accepting molecule. Control of the location of the multi-photon absorption band and the two-photon excited fluorescence band is also of use in regard to excitation and detection of emission from molecules in an absorbing or scattering medium. For example, absorption and scattering in tissue gives rise to a transmission band at ~700-950 nm, thus molecules can be tailored for optimal two-photon excitation and fluorescence detection efficiency at depth in biological tissue.

Another feature of this invention is that it is possible to tune the lipophilicity, hydrophilicity and overall solubility of the Another feature of the invention is that it is possible to substitute the donor groups, and in many cases the acceptor groups, with surface specific functionalities such that the molecules may self assemble on a surface to define a pattern of multi-photon absorbing chromophore. One can then use the various multi-photon induced processes described above to perform chemistry or other optical processes on a patterned substrate.

Another feature of the invention is that it is possible to substitute the molecule with agents, such as biotin, which allow the molecules to form complexes with reagents (such as antibodies), tissues or surfaces labeled with the protein avidin.

Another feature of the invention is that it is possible to substitute molecules with functional groups such as hydroxyl, cyano and amino, to bind these compounds to metal atoms or to react, for example, with the amine or hydroxyl groups with carboxylic acids, acid chlorides, sugars or aldehydes (in the case of amine functionality). In such a manner, it is possible to greatly increase the diversity of functionality which may be advantageously combined with the multi-photon absorbing properties and the emissive properties of the molecules. For example, attachment of the multi-photon absorbing molecules to amino acids will allow for efficient labeling of proteins.

Since the molecules can be further functionalized as is amply demonstrated herein, molecules according to the invention will have use as labels for a variety of media including tissue, cells, organelles, DNA sequences, proteins, sugar, tumorous tissue, blood components, and as markers for the analysis of combinatorial libraries of chemicals, ligands, and drugs. In particular, since many components in the complex media described above may have strong single-photon absorption, labeling of these media with multi-photon absorbing chromophores or derivatives thereof provides a mechanism to selectively excite the multi-photon absorbing chromophores without interfering absorption by the other (i.e., single-photon absorbing) chromophores which do not have the multi-photon absorption features of chromophores according to the invention. This selective excitation is particularly important for the use of these molecules in biological tissue, for example, where there are many aromatic groups such as heme-containing molecules and indole-containing molecules.

An advantage which is gained by the efficient multi-photon absorption processes enabled by molecules according to the invention is that it is possible for the absorption to occur in a region of space whose cross sectional area is smaller than that of the diffraction-limited spot size of the exciting beam of light. This is because, for example, a two-photon process is dependent on $I^2$, where I is the intensity of the exciting beam. The diffraction-limited spot size for a Gaussian beam is given by:

$$d_{1/e^2} = \frac{0.635\lambda}{NA}$$

where $\lambda$ is the wavelength of the exciting beam of light and NA is the numerical aperture of the focusing lens, and $d_{1/e^2}$ is the full width of the beam where the intensity is $1/e^2$ times the peak intensity. Therefore the theoretical spot size for a two-photon excitation is given by:

$$d_{\text{"2-photon"}} = \frac{d_{1/e^2}}{\sqrt{2}}$$

For three-photon or higher-order excitation, further analogous reductions in spot size can be realized.

Examples of some compositions which can be used in accordance with the invention have the general formulas as shown below. In many cases, as will be made clear in the detailed description of the invention below, the molecules we teach have large multi-photon absorptivities and are themselves novel. However, the general formulas below are not inclusive of all the compositions that we teach are of use as two-photon or higher-order absorbers. Other compositions which have the characteristic electronic properties, as well as other advantageous properties for a variety of applications, and methods of making and using them, will also become apparent to those with ordinary skill in the art, when one considers the examples described in the preferred embodiments.

General Formulae: (an asterisk (*) in the structures shown below identifies the atom of attachment to a functional group and implies that that atom is missing one hydrogen that would normally be implied by the structure in the absence of the asterisk.)

"—" indicates a single bond between 2 atoms

"=" indicates a double bond between 2 atoms

"≡" indicates a triple bond between 2 atoms

Class 1 Structures: Compounds where the end groups are electron donating groups

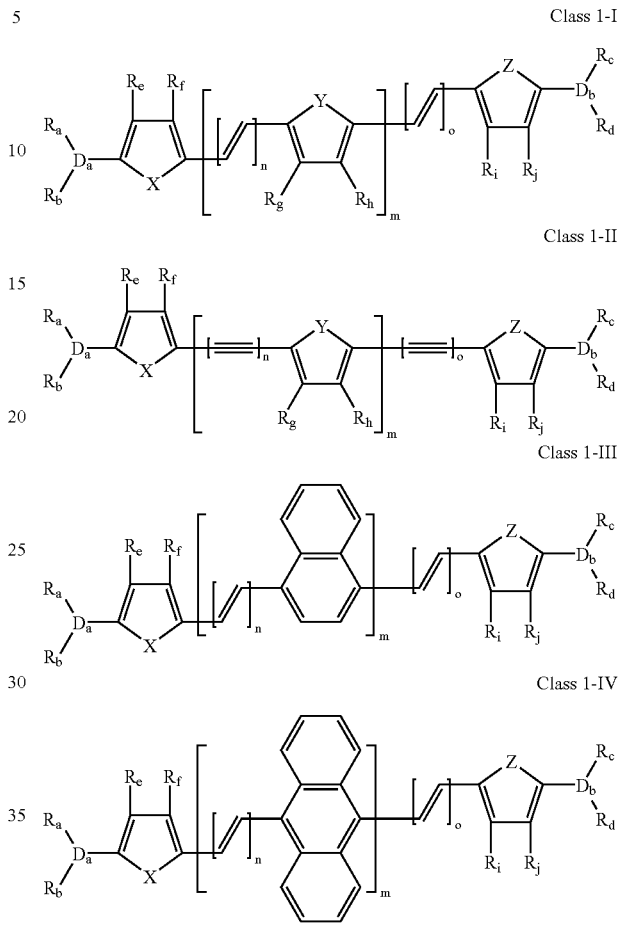

where $D_a$ is any electron donating group that is any one of N, O, S and P;

where $D_b$ is any electron donating group that is any one of N, O, S and P;

m, n, o are integers such that $0 \leq m \leq 10$, $0 \leq n \leq 10$, $0 \leq o \leq 10$; and where X, Y, Z are independently selected from: $CR_k=CR_l$; O; S; N—$R_m$ where $R_e$, $R_f$, $R_g$, $R_h$, $R_i$, $R_j$, $R_k$, $R_l$, $R_m$ are defined in NOTE 3.

$R_a$, $R_b$, $R_c$, $R_d$ $R_a$, $R_b$, $R_c$, $R_d$ are independently selected from: H; a linear or branched alkyl group with up to 25 carbons; —$(CH_2CH_2O)_\alpha$—$(CH_2)_\beta CO_2R_{a1}$; —$(CH_2CH_2O)_\alpha$—$(CH_2)_\beta OR_{a1}$; —$(CH_2CH_2O)_\alpha$—$(CH_2)_\beta NR_{a2}R_{a3}$; —$(CH_2CH_2O)_\alpha$—$(CH_2)_\beta CONR_{a2}R_{a3}$; —$(CH_2CH_2O)_\alpha$—$(CH_2)_\beta CN$; —$(CH_2CH_2O)_\alpha$—$(CH_2)_\beta Cl$; —$(CH_2CH_2O)_\alpha$—$(CH_2)_\beta Br$; —$(CH_2CH_2O)_\alpha$—$(CH_2)_\beta I$; —$(CH_2CH_2O)_\alpha$—$(CH_2)_\beta$-Phenyl; various aryl groups (see NOTE 1); various fused aromatic rings (see NOTE 2); various polymerizable functionalities attached through a linkage which can be chosen from a linear or branched alkyl chain with up to 25 carbons, various aryl groups, $(CH_2CH_2O)_\alpha$—$(CH_2)_\beta$—, and —$(CH_2CH_2O)_\alpha$—$(CH_2)_\beta CO_2$ (see NOTE 2A);

$R_{a1}$, $R_{a2}$, and $R_{a3}$ are independently selected from: H; a linear or branched alkyl group with up to 25 carbons;

$R_{a1}$, $R_{a2}$, and $R_{a3}$ can also be a functional group derived essentially from one of the 20 naturally occurring amino acids: alanine; valine; leucine; isoleucine; proline; tryptophan; phenylalanine; methionine; glycine; serine; threonine; tyrosine; cysteine; glutamine; asparganine; lysine; arginine; histidine; aspartic acid; and glutamic acid; a polypeptide; adenine; guanine; tyrosine; cytosine; uracil; biotin; ferrocene, ruthenocene, cyanuric chloride and derivatives thereof, or methacryloyl chloride. By "derived essentially", it is meant that $R_{a1}$, $R_{a2}$, and $R_{a3}$ may be an amino acid or a functional group that is closely related (e.g., a trivial modification of an amino acid).

where $\alpha$ is 0-10, where $\beta$ is 1-25.

NOTE 1:

$R_a$, $R_b$, $R_c$, $R_d$ can be an aryl group of up to aromatic ring systems having 20 carbons in the aromatic ring framework (i.e., does not include carbons on the substituents), where aryl includes:

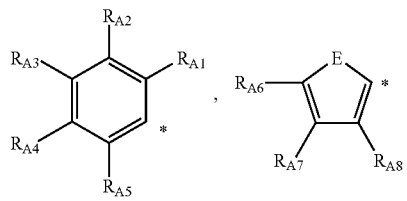

E can be: S; O where $R_{A\#}$, $1 \leq \# \leq 8$, corresponding to the subscripts in the substituents in the structure shown directly above are independently selected from: H; a linear or branched alkyl group with up to 25 carbons; $NR_{A\#1}R_{A\#2}$, $OR_{A\#3}$; or phenyl where $R_{A\#1}$, $R_{A\#2}$, $R_{A\#3}$ are independently selected from: H; a linear or branched alkyl group with up to 25 carbons; or phenyl.

NOTE 2:

$R_a$, $R_b$, $R_c$, $R_d$ are independently selected from:

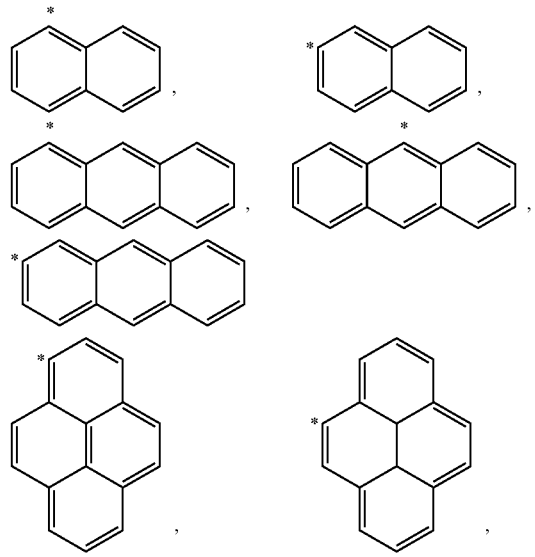

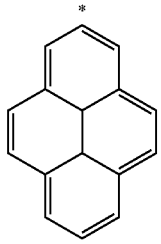

NOTE 2A:

Where polymerizable functionalities include vinyl; allyl; 4-styryl; acroyl; methacroyl; acrylonitrile, which may be polymerized by either a radical, cationic, or anionic polymerization process.

Also where polymerizable functionalities include isocyanate, isothiocyanate, epoxides such that they can be copolymerized with difunctional amines or alcohols such as $HO(CH_2)_\gamma OH$, $H_2N(CH_2)_\gamma NH_2$, where $1<\gamma<25$.

Also where polymerizable functionalities include strained ring olefins such as dicyclopentadienyl, norbomenyl, cyclobutenyl where the two-photon absorbing chromophore is attached to any of the saturated carbon linkages. Such monomers can be polymerized via ring opening metathesis polymerization using an appropriate metal catalyst as would be known to those skilled in the art.

Also where polymerizable functionalities include $(-CH_2)_\delta SiCl_3$; $(-CH_2)_\delta Si(OCH_2CH_3)_3$; or $(-CH_2)_\delta Si(OCH_3)_3$ where the two-photon absorbing monomers can be reacted with water under conditions known to those skilled in the art to form either thin film or monolithic organically modified sol-gel glasses, or modified silicated surfaces, where $0<\delta<25$.

$R_e$, $R_f$, $R_g$, $R_h$, $R_i$, $R_j$, $R_k$, $R_l$, $R_m$

NOTE 3:

$R_e$, $R_f$, $R_g$, $R_h$, $R_i$, $R_j$, $R_k$, $R_l$, $R_m$ are independently selected from: H; a linear or branched alkyl group with up to 25 carbons; $(CH_2CH_2O)_\alpha-(CH_2)_\beta CO_2 R_{a1}$; $-(CH_2CH_2O)_\alpha-(CH_2)_\beta OR_{b1}$; $-(CH_2CH_2O)_\alpha-(CH_2)_\beta NR_{b2}R_{b3}$; $-(CH_2CH_2O)_\alpha-(CH_2)_\beta CONR_{b2}R_{b3}$; $-(CH_2CH_2O)_\alpha-(CH_2)_\beta CN$; $-(CH_2CH_2O)_\alpha-(CH_2)_\beta Cl$; $-(CH_2CH_2O)_\alpha-(CH_2)_\beta Br$; $-(CH_2CH_2O)_\alpha-(CH_2)_\beta I$; $-(CH_2CH_2O)_\alpha-(CH_2)_\beta$-Phenyl; various aryl groups (see NOTE 1); various fused aromatic rings (see NOTE 2); various polymerizable functionalities (see NOTE 2A); $NR_{e1}R_{e2}$; $OR_{e3}$; CHO; CN; $NO_2$; Br; Cl; I; phenyl; an acceptor group containing more than two carbon atoms (see NOTE 3A), and where $R_{e1}$, $R_{e2}$, $R_{e3}$, are independently defined as for $R_n$ and $R_o$ in NOTE 3B;

$R_{b1}$, $R_{b2}$, and $R_{b3}$ can also be a functional group derived essentially from one of the 20 naturally occurring amino acids: alanine; valine; leucine; isoleucine; proline; tryptophan; phenylalanine; methionine; glycine; serine; threonine; tyrosine; cysteine; glutamine; asparganine; lysine; arginine; histidine; aspartic acid; and glutamic acid; or a polypeptide; adenine; guanine; tyrosine; cytosine; uracil; biotin; ferrocene, ruthenocene, cyanuric chloride and derivatives thereof or methacryloyl chloride. By "derived essentially from", it is meant that $R_{b1}$, $R_{b2}$, and $R_{b3}$ can be an amino acid or a functional group that is closely related to an amino acid (i.e., a trivial modification of an amino acid).

where $\alpha$ is 0-10, where $\beta$ is 1-25.

Thus, in general, alkyl groups set forth in the above formulas include those groups having up to 25 carbon atoms and includes both branched and straight chain all groups. Exemplary alkyl groups include methyl, ethyl, propyl, butyl, pentyl, hexyl, heptyl, octyl, nonyl, in the normal, secondary, iso and neo attachment isomers. Aryl groups referred to in the preceding formulas include aromatic hydrocarbons having up to 20 carbon atoms. Exemplary aryl groups include phenyl, naphthyl, furanyl, thiophenyl, pyrrolyl, selenophenyl and tellurophenyl.

NOTE 3A:

Acceptor Groups Containing More than Two Carbon Atoms $R_e$, $R_f$, $R_g$, $R_h$, $R_i$, $R_j$, $R_k$, $R_l$, $R_m$, can be selected from the following list of groups A1-A41 and where $R_n$ and $R_o$ are as defined in NOTE 3B:

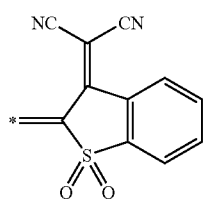 A1

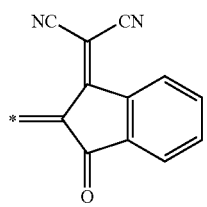 A2

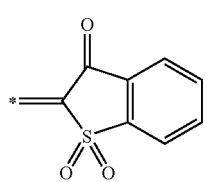 A3

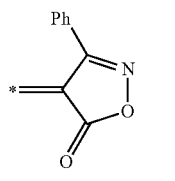 A4

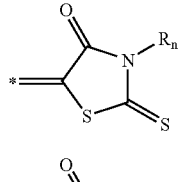 A5

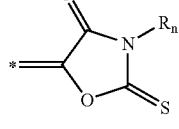 A6

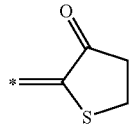 A7

-continued

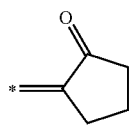 A8

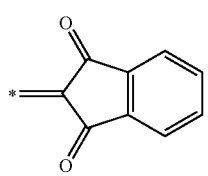 A9

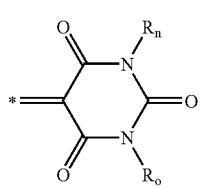 A10

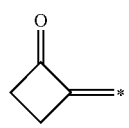 A11

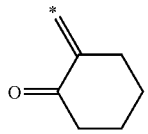 A12

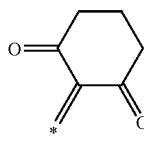 A13

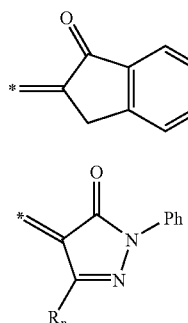 A14

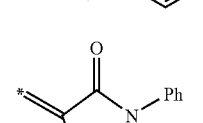 A15

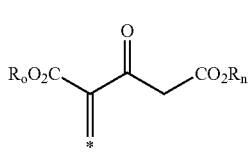 A16

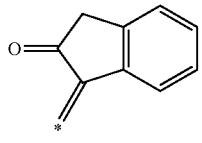 A17

-continued
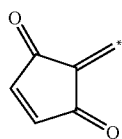 A18
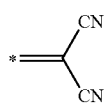 A19
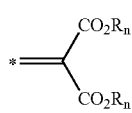 A20
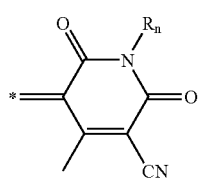 A21
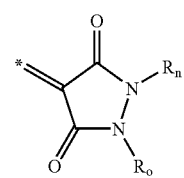 A22
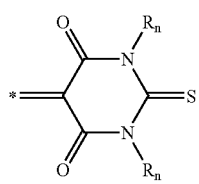 A23
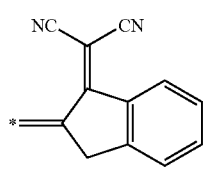 A24
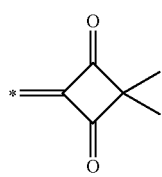 A25
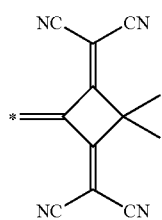 A26
-continued
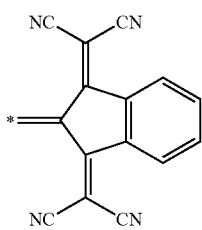 A27
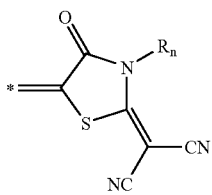 A28
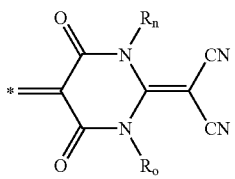 A29
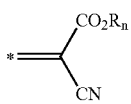 A30
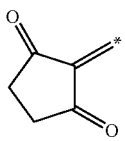 A31
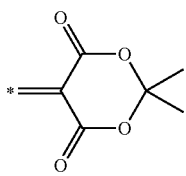 A32
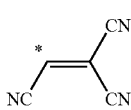 A33
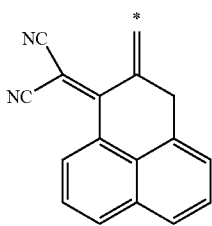 A34
A35

-continued

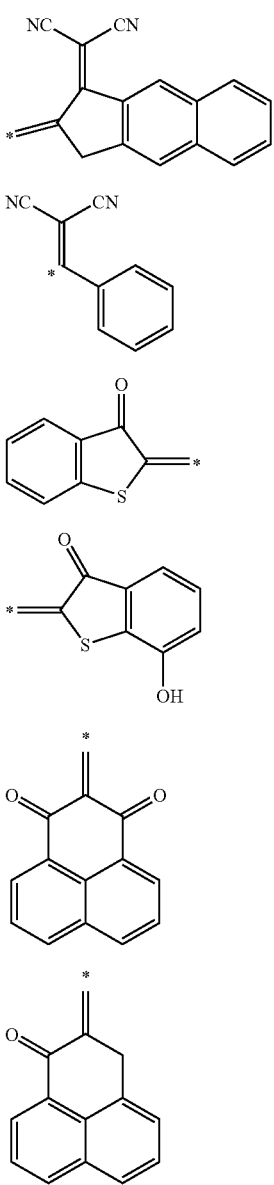

NOTE 3B:

$R_n$, $R_o$ are independently selected from: H; a linear or branched alkyl group with up to 25 carbons; $(CH_2CH_2O)_\alpha-(CH_2)_\beta CO_2R_{\alpha 1}$; $-(CH_2CH_2O)_\alpha-(CH_2)_\beta OR_{g1}$; $-(CH_2CH_2O)_\alpha-(CH_2)_\beta NR_{g2}R_{g3}$; $-(CH_2CH_2O)_\alpha-(CH_2)_\beta CONR_{g2}R_{g3}$; $-(CH_2CH_2O)_\alpha-(CH_2)_\beta CN$; $-(CH_2CH_2O)_\alpha-(CH_2)_\beta Cl$; $-(CH_2CH_2O)_\alpha-(CH_2)_\beta Br$; $-(CH_2CH_2O)_\alpha-(CH_2)_\beta I$; $-(CH_2CH_2O)_\alpha-(CH_2)_\beta$-Phenyl; various aryl groups (see NOTE 1); various fused aromatic rings (see NOTE 2); various polymerizable functionalities (see NOTE 2A);

$R_{g1}$, $R_{g2}$, and $R_{g3}$ are independently selected from: H; a linear or branched alkyl group with up to 25 carbons;

$R_{g1}$, $R_{g2}$, and $R_{g3}$ can also be a functional group derived essentially from one of the 20 naturally occurring amino acids: alanine; valine; leucine; isoleucine; proline; tryptophan; phenylalanine; methionine; glycine; serine; threonine; tyrosine; cysteine; glutamine; asparganine; lysine; arginine; histidine; aspartic acid; and glutamic acid; or a polypeptide; adenine; guanine; tyrosine; cytosine; uracil; biotin; ferrocene, ruthenocene, cyanuric chloride and derivatives thereof or methacryloyl chloride. By "derived essentially from" it is meant that $R_{g1}$, $R_{g2}$, and $R_{g3}$ can be an amino acid or a functional group that is closely related to an amino acid (i.e., a trivial modification of an amino acid).

where α is 0-10, and where β is 1-25.

Class 2 Structures—Compounds where the End Groups are Acceptors

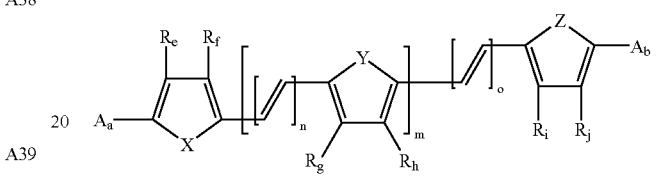
Class 2-I

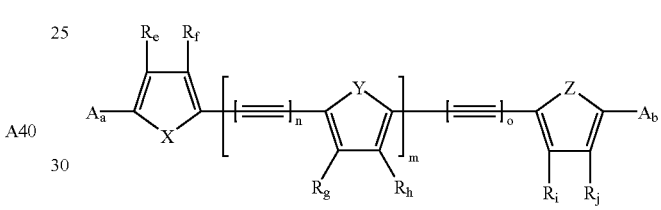
Class 2-II

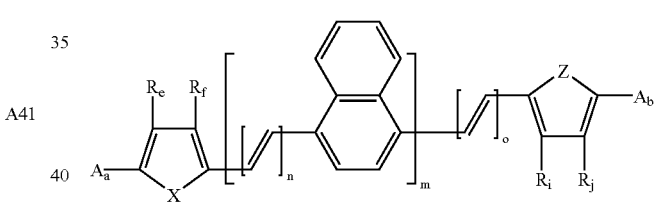
Class2-III

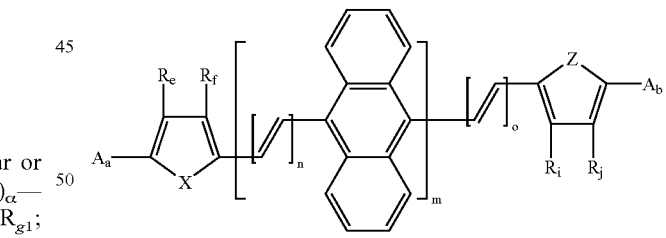
Class 2-IV where $A_a$ and $A_b$ can be independently selected from: CHO; CN; NO$_2$, and

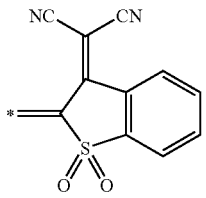
A1

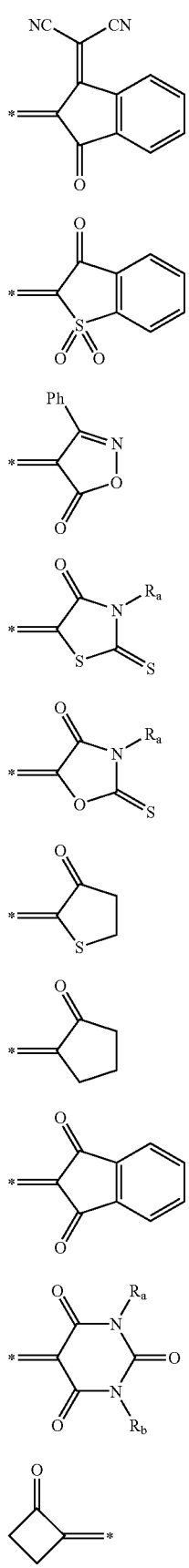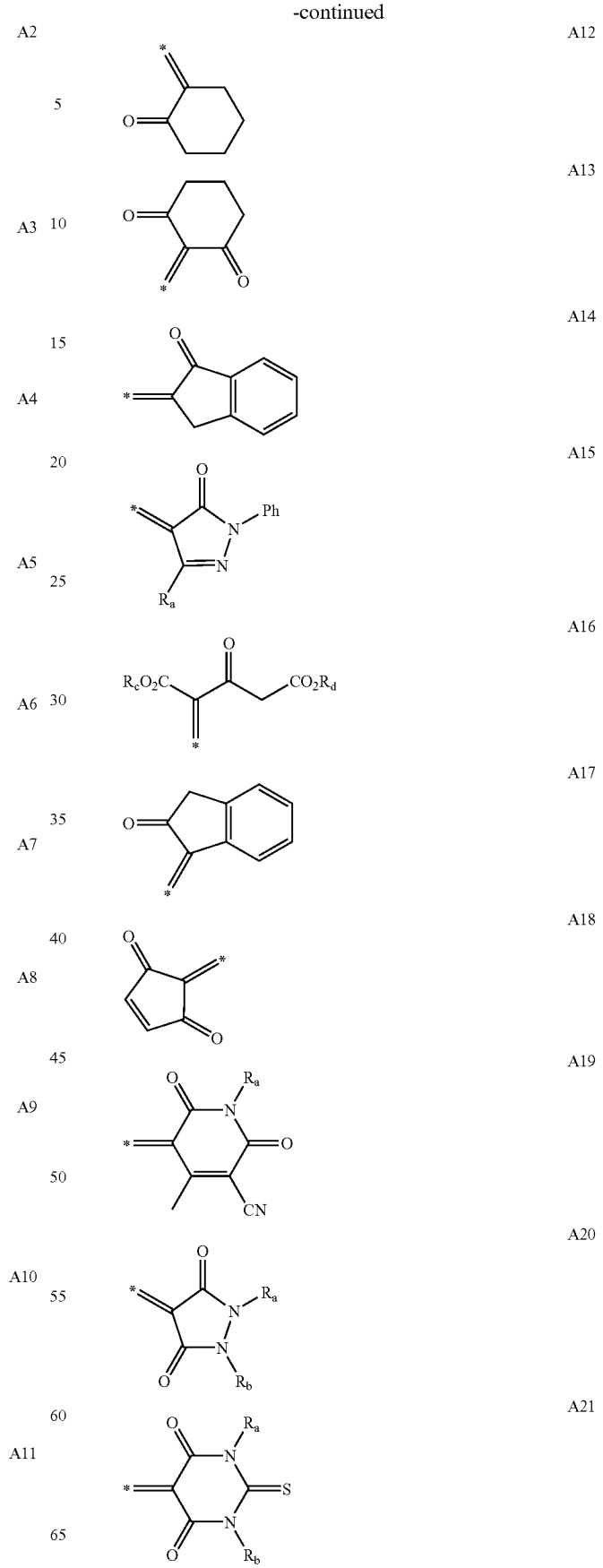

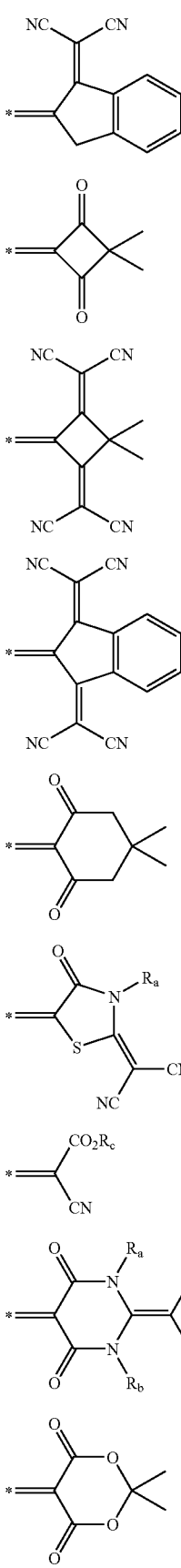
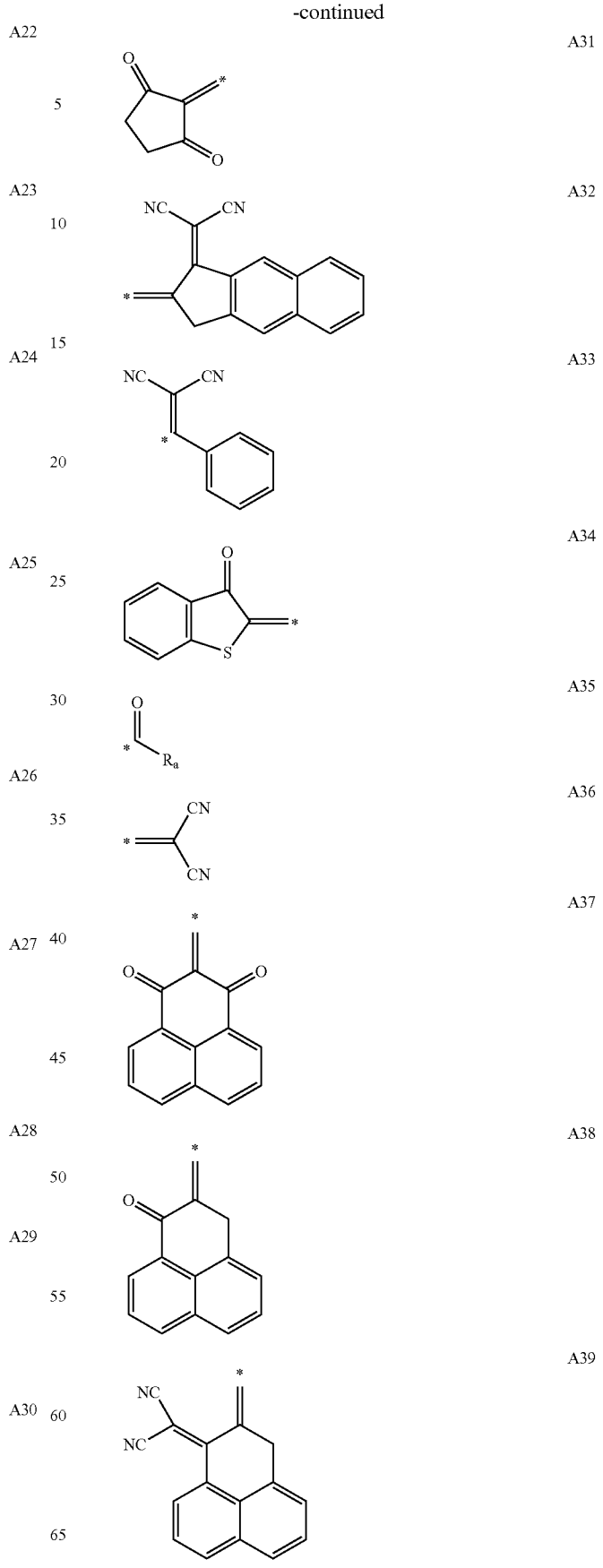

-continued

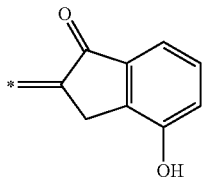
A40

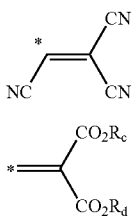
A41

*—C(CO₂R_c)=CO₂R_d (structure)
A42 in addition $A_a$ and $A_b$ can be independently selected from Br, Cl, and I; and where $0 \leq m \leq 10$, $0 \leq n \leq 10$, $0 \leq o \leq 10$.

where X, Y, Z are independently selected from: $CR_k=CR_l$; O; S; N—$R_m$ where $R_k$, $R_l$, $R_m$ are defined in NOTE 3, above for Class 1 molecules.

where $R_e$, $R_f$, $R_g$, $R_h$, $R_i$, $R_j$, are defined in NOTE 3, above for Class 1 molecules.

$R_a$, $R_b$, $R_c$, $R_d$ $R_a$, $R_b$, $R_c$, $R_d$ are independently selected from: H; a linear or branched alkyl group with up to 25 carbons; $(CH_2CH_2O)_\alpha$—$(CH_2)_\beta CO_2R_{a1}$; —$(CH_2CH_2O)_\alpha$—$(CH_2)_\beta OR_{a1}$; —$(CH_2CH_2O)_\alpha$—$(CH_2)_\beta NR_{a2}R_{a3}$; —$(CH_2CH_2O)_\alpha$—$(CH_2)_\beta CONR_{a2}R_{a3}$; —$(CH_2CH_2O)_\alpha$—$(CH_2)_\beta CN$; —$(CH_2CH_2O)_\alpha$—$(CH_2)_\beta Cl$; —$(CH_2CH_2O)_\alpha$—$(CH_2)_\beta Br$; —$(CH_2CH_2O)_\alpha$—$(CH_2)_\beta I$; —$(CH_2CH_2O)_\alpha$—$(CH_2)_\beta$-Phenyl; various aryl groups (see NOTE 1 as described above for Class 1 molecules); various fused aromatic rings (see NOTE 2 as described above for Class 1 molecules); various polymerizable functionalities (see NOTE 2A as described above for Class 1 molecules); $NR_{e1}R_{e2}$; $OR_{e3}$; CN; $NO_2$; Br; Cl; I; phenyl; or an acceptor group containing more than two carbon atoms (see NOTE 3A as described above for Class 1 molecules).

$R_{a1}$, $R_{a2}$, and $R_{a3}$ are independently selected from: H; a linear or branched alkyl group with up to 25 carbons.

$R_{a1}$, $R_{a2}$, and $R_{a3}$ can also be one of the twenty natural the amino acids; alanine; valine; leucine; isoleucine; proline; tryptophan; phenylalanine; methionine; glycine; serine; threonine; tyrosine; cysteine; glutamine; asparganine; lysine; arginine; histidine; aspartic acid; and glutamic acid; or a polypeptide; adenine; guanine; tyrosine; cytosine; uracil; biotin; ferrocene, ruthenocene, or cyanuric chloride and derivatives thereof.

where $\alpha$ is 0-10 and where $\beta$ is 1-25.

$R_{e1}$, $R_{e2}$, and $R_{e3}$ are independently as defined for $R_n$ and $R_o$ in NOTE 3B.

In addition, the invention includes molecules that do not fall into Class 1 or Class 2 formulae but are within the scope of the four structural motifs described herein.

General Description of Uses According to the Invention

The compositions of the invention are organic molecules having multi-photon absorption properties. The compositions themselves may exist as crystals, mesoscopic phases, polymers, glasses, liquids or gases. The compositions may be used alone or in combination with other crystals, mesoscopic phases, polymers, glasses liquids or gases.

The molecules of the present invention may, in some cases, consist of a macroscopic crystal of the molecule. Such crystals may be grown at a slow rate under equilibrium with their mother liquor by a variety of methods known to one skilled in the art. Crystals may also be grown by sublimation at reduced pressure or in some cases from a melt. In the case of vapor or vacuum deposition of crystalline, microcrystalline or amorphorous materials, it is possible using well-developed processes to form multicomponent nanocomposite materials by codeposition with other organic or inorganic materials. Another method of producing a useful optical element involves dissolving the molecule in a solvent to form a solution which can be placed in a container having the desired shape.

A particularly convenient and effective form of an optical element in accordance with the invention involves dispersing the multi-photon absorbing molecules in a polymeric or prepolymeric binder. The multi-photon absorbing molecules can be mixed into the binder or grafted onto the polymer, prepolymer or monomer. Suitable binders include polystyrene, polyacrylonitrile, polymethacrylate, poly(methyl methacrylate), poly(vinyl alcohol), copolymers of methyl methacrylate and methacrylic acid, copolymers of styrene and maleic anhydride and half ester-acids of the latter, as well as many others.

It is preferred that the polymeric binder be highly transparent so that the transparency of the molecules utilized in the practice of this invention can be advantageously employed. However, it is a unique feature of the invention that even in the case where the binder has strong absorption at the wavelength required to initiate single-photon processes, the chromophores may still be excited by the two-photon or multiphoton absorption process.

Generally, the methods according to invention are carried out by converting a multi-photon absorbing molecule to an electronically excited state by absorption of at least two photons of radiation. The excited state then facilitates numerous applications. The molecule may be irradiated with visible, ultraviolet or infrared radiation to effect the multiphoton absorption.

One common form an optical element according to the invention can take is that of a Langmuir-Blodgett (LB) film. As known to those skilled in the art, a small amount of a molecule useful in the practice of this invention, when spread on the surface of a liquid, forms a surface film of monomolecular thickness at the air/liquid interface. When the supporting substrate is slowly immersed in the film bearing liquid body or slowly withdrawn from it, an oriented monomolecular film is formed on the substrate. The preparation and uses of Langmuir-Blodgett films are described in M. C. Petty, M. R. Bryce, D. Bloor, *Introduction to Molecular Electronics*, Edward, Arnold, London, 1995, Chapter 10, which is incorporated herein by reference.

Compositions according to the invention are also useful when incorporated into solutions, prepolymers, polymers, Langmuir-Blodgett thin films, and self-assembled monolayers. The compositions can be advantageously modified in such a way as to allow for variation of ease of dissolution in a variety of host media, including liquids and polymeric hosts, by changing the nature of the substituents attached to the central conjugated bridge framework of the molecule as well as by changing either the donors or acceptors. In addition, by controlling the length and composition of the $\pi$-bridge of the molecule, it is possible to control the position and strength of the two-photon (or higher-order) absorption and the two-photon (or higher-order) excited fluorescence.

Synthesis and Characterization of Multi-photon Absorbing Compounds

Some compositions according to the invention may be prepared by reacting appropriate aldehydes with appropriate ylides under standard Wittig conditions. In some cases, the compounds can be synthesized using the McMurray reaction. Examples of Specific Compounds for the General Structures Shown Earlier which Exhibit Two-photon or Higher-order Absorption.

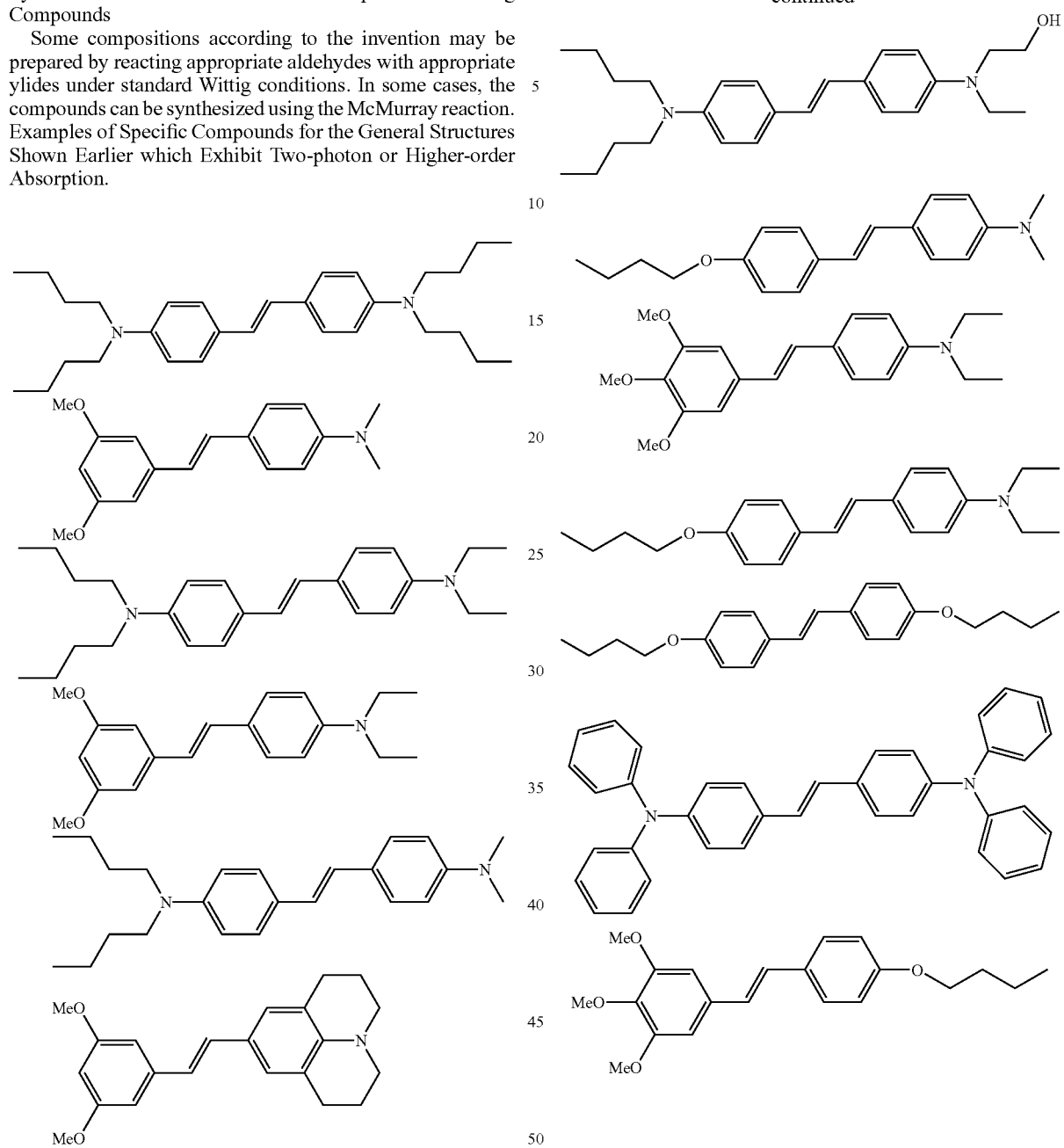

EXAMPLES OF STILBENE CHROMOPHORES

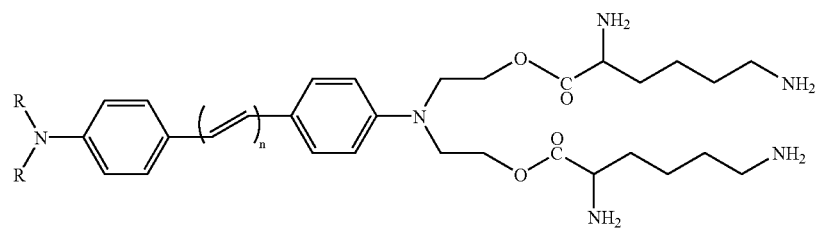

• 6 HCl where n = 1 or 2

Examples of amino acid-containing water soluble multi-photon absorbing chromophores according to the invention.
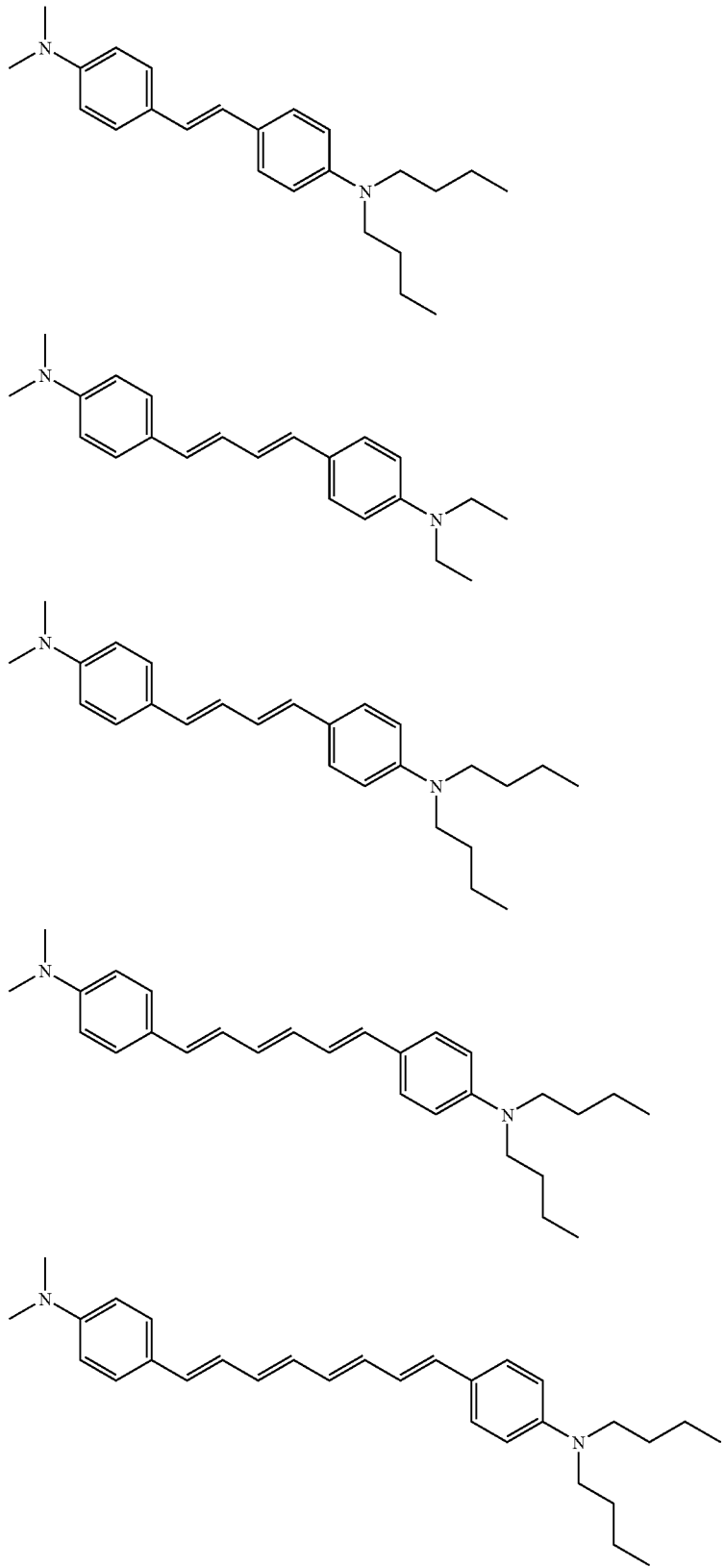

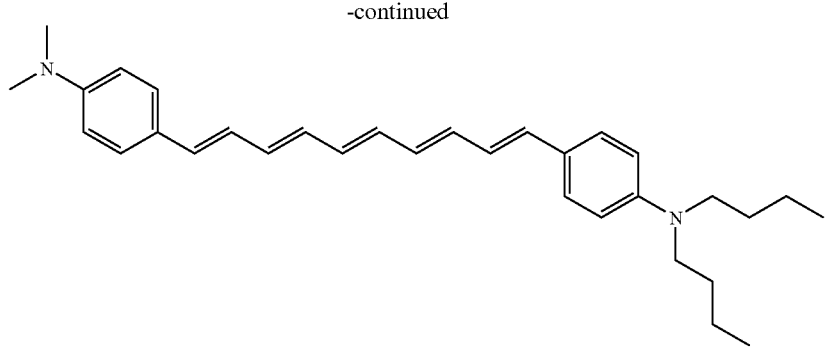

Examples of Bis (dialkylaminophenyl) polyenes with n=1-5 double bonds between the phenyl groups.

General Wittig Procedure

Figure 3:
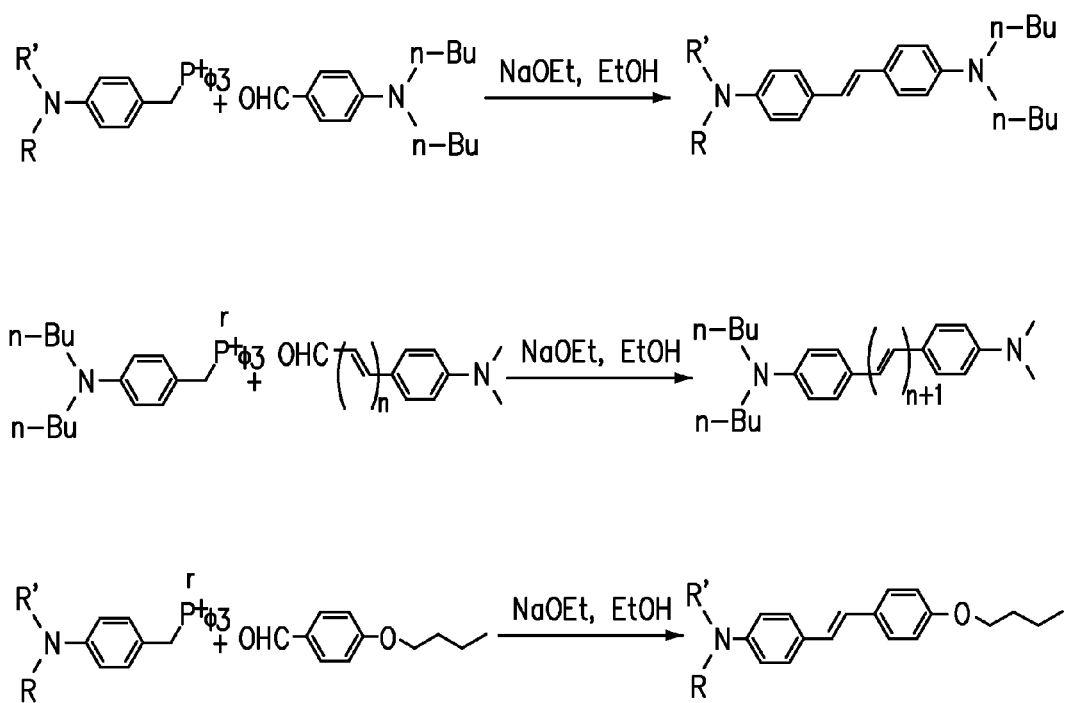
FIG. 3 illustrates a Wittig reaction scheme for synthesis of bis-donor-substituted stilbene and bis-donor-substituted diphenylpolyenes according to the invention.

All the reactions were carried out under anhydrous conditions by use of Schlenk techniques. FIG. 3 illustrates the general scheme depicting the synthesis of bis-donor stilbene and bis-donor-substituted-diphenylpolyenes by the Wittig reaction. Typically, the aldehydes used in the Wittig reaction were commercially available or synthesized by methods previously reported. The phosphonium salts were synthesized according to literature procedures. Other aldehdyes and phosphonium salt that could be employed in this reaction would be known to one skilled in the art of organic synthesis and with the aid of the knowledge provided in the example given below.

EXAMPLE 1

0.15 mol of sodium were slowly dissolved in 100 mL of ethanol and added to a solution of 0.05 mol of the corresponding aldehyde and the phosphonium salt in 300 mL of ethanol. This mixture was heated under reflux for 15 hours. After cooling down to room temperature, 100 mL of methanol and 100 mL of water were added to precipitate the substituted trans-stilbene or substituted diphenyl polyene, respectively. Usually, triphenylphosphinoxide and substituted cis-stilbene, also formed in the reaction, don't precipitate in this solvent mixture. The powder was separated by filtration. Filtration over a short column of Florisil with toluene as eluant usually yields further purification. To achieve correct elemental analysis the products were either chromatographed or recrystallized in ethanol in case of the stilbene derivatives, or acetone in case of the diphenylpolyenes derivatives. The yields varied between 10% and 60% for all of the reactions.

Characterizing Data for Compounds Synthesized by the Above General Wittig Procedure:

EXAMPLE 2

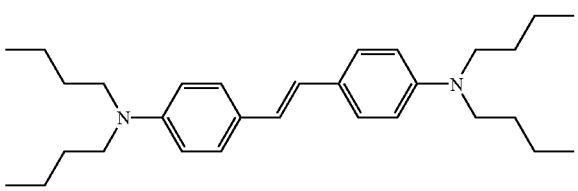

$^1$H NMR ($d_6$-acetone) δ 7.31 (d, J=8.7 Hz, 4H), 6.81 (s, 2H), 6.64 (d, J=8.7 Hz, 4H), 3.32 (t, J=7.5 Hz, 8H), 1.57 (m, 8H), 1.36 (m, 8H), 0.94 (t, J=7.27, 12H); $^{13}$C NMR δ 14.26, 20.87, 30.27, 51.28, 112.73, 124.77, 126.50, 127.82, 148.12; accurate FAB mass spectrum (m/z) for M$^+$ $C_{30}H_{46}N_2$, calcd 434,3661. found 434,3673.

EXAMPLE 3

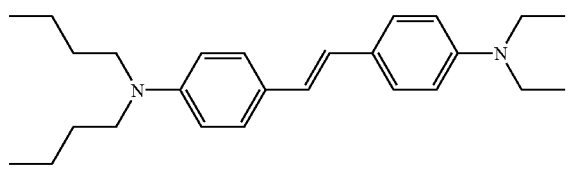

$^1$H NMR ($d_6$-acetone) δ 7.32 (d, J=8.0 Hz, 4H), 6.82 (s, 2H), 6.67 (d, J=4.6 Hz, 2H), 6.64 (d, J=4.7 Hz, 2H), 3.42-3.29 (m, 8H), 1.62-1.52 (m, 4H), 1.42-1.30 (m, 4H), 1.13 (t, J=7.0 Hz, 6H), 0.94 (t, J=7.0 Hz, 6H); accurate FAB mass spectrum (m/z) for M$^+$ $C_{26}H_{38}N_2$, calcd 378.3035. found 378.3039. elemental analysis, calcd: C, 82.48, H, 10.12, N, 7.40. found: C, 82.30; H, 9.76; N, 7.14.

EXAMPLE 4

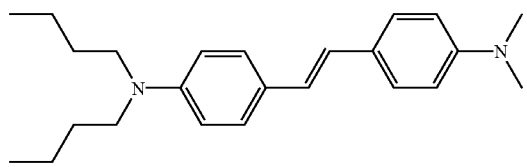

$^1$H NMR ($d_6$-acetone) δ 7.35 (d, J=7.2 Hz, 2H), 7.32 (d, J=7.0 Hz, 2H), 6.84 (s, 2H), 6.71 (d, J=8.7 Hz, 2H), 6.65 (d, J=8.7 Hz, 2H), 3.32 (t, J=7.5 Hz, 4H), 2.93 (s, 6H), 1.62-1.52 (m, 4H), 1.40-1.32 (m, 4H), 0.94 (t, J=7.3 Hz, 6H); accurate FAB mass spectrum (m/z) for M$^+$ $C_{24}H_{34}N_2$, calcd 350.2722. found 350.2720. elemental analysis, calcd: C, 82.23, H, 9.78, N, 7.99. found: C, 81.83; H, 9.90; N, 8.07.

EXAMPLE 5

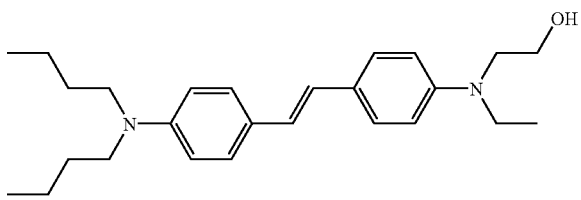

$^1$H NMR ($d_6$-acetone) δ 7.31 (d, J=8.7 Hz, 4H), 6.87 (s, 2H), 6.69 (d, J=8.9 Hz, 2H), 6.64 (d, J=8.9 Hz, 2H), 3.69 (t, J=5.8 Hz, 2H), 3.48-3.42 (m, 4H), 3.32 (t, J=7.5 Hz, 4H), 1.62-1.52 (m, 4H), 1.42-1.32 (m, 4H), 1.13 (t, J=7.0 Hz, 3H), 0.94 (t, J=7.3 Hz, 6H); accurate FAB mass spectrum (m/z) for M$^+$ C$_{26}$H$_{38}$N$_2$, calcd 394.2984. found 394.2990.

EXAMPLE 6

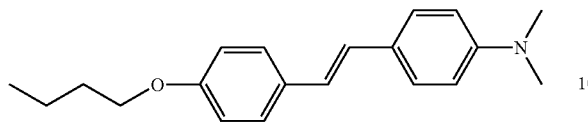

$^1$H NMR (CDCl$_3$) δ 7.41 (d, 3J 3.3 Hz, 2H), 7.39 (d, 3J 2.0 Hz), 6.90-6.86 (m, 4H), 6.72 (d, 3J 8.5 Hz, 2H), 3.98 (t, 3J 6.5 Hz, 2H), 2.98 (s, 6H), 1.80-1.75 (m, 2H), 1.54-1.46 (m, 2H), 0.98 (t, J=7.3 Hz, 3H); accurate FAB mass spectrum (m/z) for M$^+$ C$_{20}$H$_{25}$NO, calcd 395.1936. found 395.1929.

EXAMPLE 7

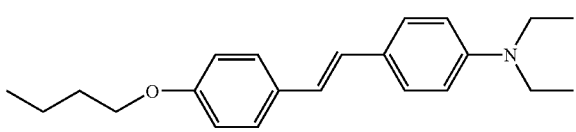

$^1$H NMR (CDCl$_3$) δ 7.45-7.30 (m, 4H), 6.95-6.80 (m, 4H), 6.69 (d, J=6.0 Hz, 2H), 3.97 (t, J=6.3 Hz, 2H), 3.38 (d, broad, 4H), 1.82-1.72 (m, 2H), 1.56-1.46 (m, 2H), 1.18 (t, J=7.04 Hz, 6H), 0.97 (t, J=7.2 Hz, 3H), accurate FAB mass spectrum (m/z) for M$^+$ C$_{22}$H$_{29}$NO, calcd 323.2249. found 323.2238.

EXAMPLE 8

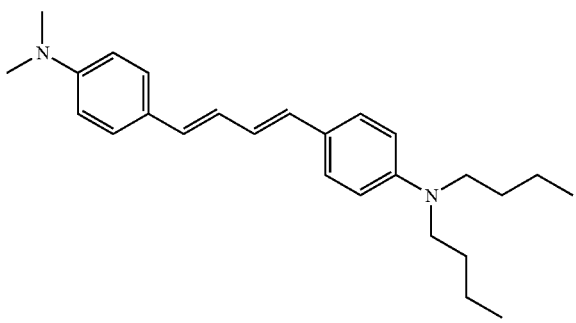

$^1$H NMR (d$_6$-benzene) δ 7.45 (d, J=4.4 Hz, 2H), 7.42 (d, J=4.3 Hz, 2H), 7.04-6.95 (m, 2H), 6.74-6.55 (m, 6H), 3.06 (t, J=7.5 Hz, 4H), 2.51 (s, 6H), 1.44 (p, J=7.3 Hz, 4H), 1.16 (s, J=7.5 Hz, 4H), 0.84 (t, J=7.3 Hz, 6H), accurate FAB mass spectrum (m/z) for M$^+$ C$_{26}$H$_{36}$N$_2$, calcd 376.2878. found 376.2880. elemental analysis, calcd: C, 82.93, H, 9.64, N, 7.44. found: C, 82.72; H, 9.78; N, 7.44.

EXAMPLE 9

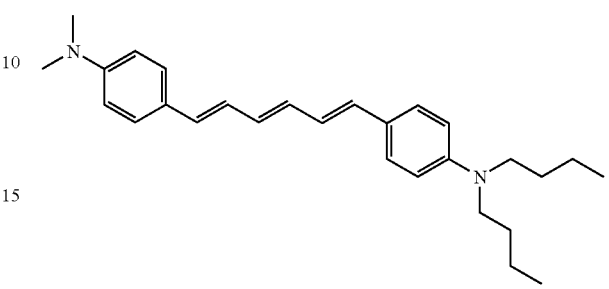

$^1$H NMR (d$_6$-benzene) δ 7.42-7.37 (m, 4H), 6.97-6.89 (m, 2H), 6.68-6.54 (m, 8H), 3.04 (t, J=7.5 Hz, 4H), 2.49 (s, 6H), 1.42 (p, J=7.5 Hz, 4H), 1.15 (s, J=7.3 Hz, 4H), 0.83 (t, J=7.3 Hz, 6H), $^{13}$C NMR (d$_6$-benzene) δ 150.11, 147.91, 132.93, 132.53 (2 signals), 132.24, 128.16, 127.83, 126.99, 126.26, 126.05, 125.69, 50.93, 40.03, 29.82, 20.55, 14.16; accurate FAB mass spectrum (m/z) for M$^+$ C$_{28}$H$_{38}$N$_2$, calcd 402.3035. found 402.3041. elemental analysis, calcd: C, 83.53, H, 9.51, N, 6.96. found: C, 83.18; H, 9.63; N 6.79.

EXAMPLE 10

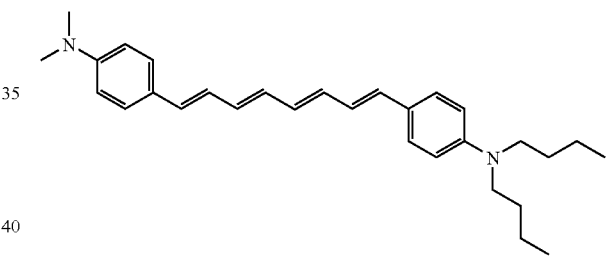

$^1$H NM (d$_6$-benzene) δ 7.50-7.30 (m, 4H), 6.95-6.78 (m, 2H), 6.75-6.38 (m, 10H), 3.05 (t, J=7.1 Hz, 4H), 2.50 (s, 6H), 1.50-1.30 (m, 4H), 1.15 (q, J=7.2 Hz, 4H) 0.84 (t, J=7.1 Hz, 6H), accurate FAB mass spectrum (m/z) for M$^+$ C$_{30}$H$_{40}$N$_2$, calcd 428.3191. found 428.3176. elemental analysis, calcd: C, 84.06 H, 9.41, N, 6.54. found: C, 83.86; H, 9.20; N, 6.28.

EXAMPLE 11

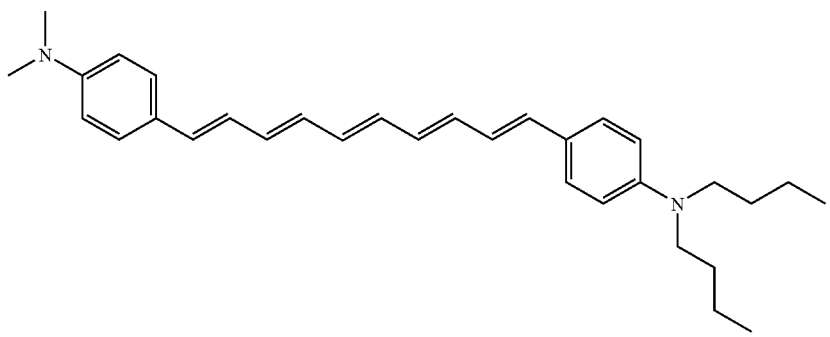

¹H NMR (d₆-benzene) δ 7.45-7.32 (m, 4H), 6.95-6.80 (m, 2H), 6.68-6.37 (m, 12H), 3.03 (t, J=7.4 Hz, 4H), 2.48 (s, 6H), 1.50-1.28 (m, 4H), 1.20-1.05 (m, 4H), 0.83 (t, J=7.3 Hz, 6H); accurate FAB mass spectrum (m/z) for M⁺ $C_{32}H_{42}N_2$, calcd 454.3348. found 454.3332. elemental analysis, calcd: C, 84.53 H, 9.31, N, 6.16. found: C, 83.17; H, 9.70; N, 5.58.

EXAMPLE 12

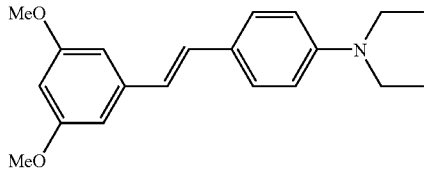

¹H NMR (CDCl₃) δ 7.40 (d, J=8.4 Hz, 2H), 7.12 (d, J=16.3 Hz, 1H), 6.88 (d, J=16.3 Hz, 1H), 6.71-6.68 (m, 4H), 6.33 (t, J=1.9 Hz, 1H), 3.80 (s, 6H), 3.41 (q, J=7.0 Hz, 4H), 1.13 (t, J=7.2 Hz, 6H).

EXAMPLE 13

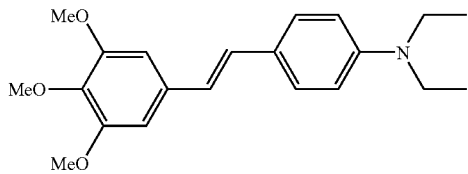

¹H NMR (CDCl₃) δ 7.39 (d, J=8,7 Hz, 2H), 6.95 (d, J=16.0 Hz, 1H), 6.82 (d, 16 Hz, 1H), 6.71 (s, 2H), 6.67 (d, J=8.7 Hz, 2H), 3.92 (s, 6H), 3.86 (s, 3H), 3.38 (q, J=7.1 Hz, 4H), 1.19 (t, J=7.0 Hz, 6H); accurate FAB mass spectrum (m/z) for M⁺ $C_{21}H_{27}NO_3$, calcd 341.1991. found 341.2001. elemental analysis, calcd: C, 73.87, H, 7.97, N, 4.10 . found: C, 73.78; H, 8.07; N, 4.00.

EXAMPLE 14

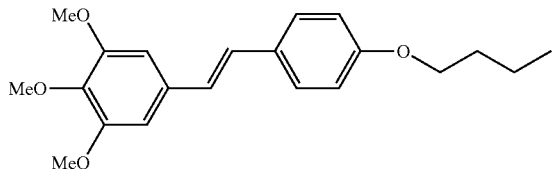

¹H NMR (CDCl₃) δ 7.43 (d, J=8.5 Hz, 2H) 6.95-6.88 (m, 4H), 6.72 (s, 2H), 3.98 (t, J=6.5 Hz, 2H), 3.91 (s, 6H), 3.87 (s, 3H), 1.78 (m, 2H), 1.50 (m, 2H), 0.98 (t, J=7.3 Hz, 3H) ); ¹³C NMR δ 13.83, 19.22, 31.29, 56.07, 60.92, 67.22, 103.26, 114.68, 126.34, 127.56, 127.80, 129.74, 133.45, 153.34, 158.87; accurate FAB mass spectrum (m/z) for M⁺ $C_{22}H_{28}O_2$, calcd 342.1831. found 342.1831. elemental analysis, calcd: C, 73.66, H, 7.65. found: C, 73.41; H, 7.85

EXAMPLE 15

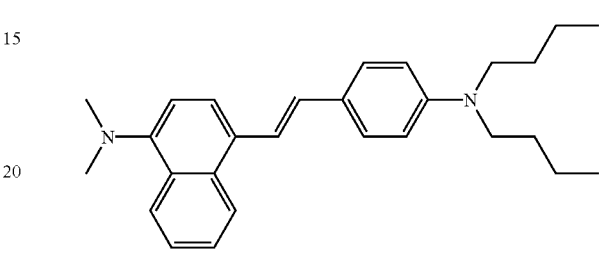

¹H NMR (d₆-acetone) δ 8.33-8.28 (m, 2H), 7.72-7.67 (m, 2H), 7.52-7.48 (m, 4H), 7.14 (d, J=7.9 Hz, 1H), 7.04 (d, J=16.0 Hz, 1H), 6.70 (d, J=8.7 Hz, 2H), 3.36 (t, J=7.5 Hz, 4H), 2.86 (s, 6H), 1.60 (m, 4H), 1.38 (m, 4H), 0.95 (t, J=7.3 Hz, 6H); ¹³C NMR δ 150.99, 148.73, 133.39, 131.43, 131.30, 129.78, 128.65, 126.45, 126.07, 125.61, 125.36, 125.06, 123.52, 120.86, 115.03, 112.62, 51.26, 45.38, 30.26, 20.86, 14.26; accurate FAB mass spectrum (m/z) for M⁺ $C_{28}H_{36}N_2$, calcd 400.2878. found 400.2888. elemental analysis, calcd: C, 83.95, H, 9.06, N, 6.99 . found: C, 83.91; H, 8.52; N, 6.93.

EXAMPLE 16

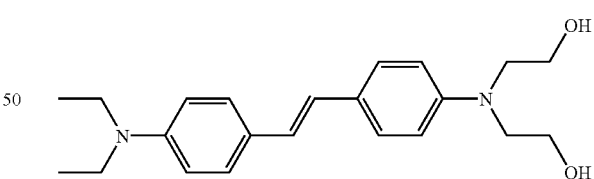

¹H NMR (d₆-acetone) δ 7.32 (m, 4H), 6.83 (s, 2H), 6.70 (d, J=8.8 Hz, 2H), 6.66 (d, J=8.8 Hz, 2H), 3.73 (t, J=5.6 Hz, 4H), 3.55 (t, J=5.7 Hz, 4H), 3.39 (q, J=7.0 Hz, 4H), 1.13 (t, 7.0 Hz, 6H); IR (KBr pellet) 3386.40 (m broad), 2967.86 (m), 1607.93 (s), 1520.15 (s), 1390.74 (m), 13 53.33 (s), 1265.34 (m), 1189.59 (m), 1152.10 (w), 1077.47 (w), 1007.76 (w), 970.86 (w), 818.60(m) cm⁻¹; accurate FAB mass spectrum (m/z) for M⁺ $C_{22}H_{30}N_2O_2$, calcd 354.2307. found 354.2304.

EXAMPLE 17

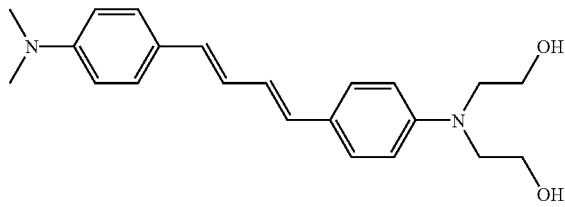

$^1$H NMR (d$_6$-acetone) δ 7.35-7.20 (m, 4H), 6.90-6.65 (m, 6H), 6.48 (d, J=14 Hz), 4.19 (t, J=5.5 Hz, 2H, OH protons), 3.80-3.78 (m, 4H), 3.56 (t, J=5.7 Hz, 4H), 2.94 (s, 6H); accurate FAB mass spectrum (m/z) for M$^+$ C$_{22}$H$_{28}$N$_2$O$_2$, calcd 352.2151. found 352.2154. elemental analysis, calcd: C, 74.97, H, 8.01, N, 7.95 . found: C, 74.62; H, 8.27; N, 7.82. IR (KBr pellet) 3279.40 (m, broad), 3009.09 (m), 2878.66 (m), 1602.69 (s), 1513.54 (s), 1389.62 (m), 1351.78 (s), 1185.92 (s), 1061.93 (m), 986.26 (m), 838.50 (m), 798.78 (m), 520.33 (w) cm$^{-1}$.

EXAMPLE 18

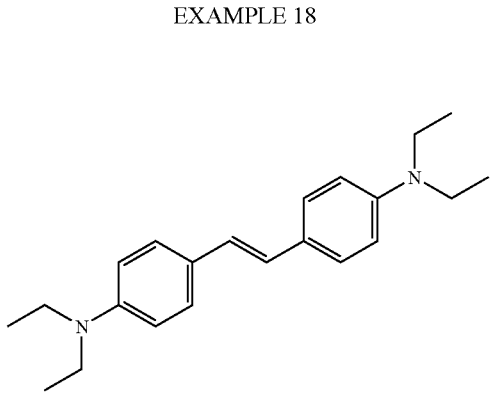

$^1$H NMR (CDCl$_3$, 300 MHz) δ 7.46 (d, 4H, J=8.6 Hz); 7.12 (s, 2H); 6.57 (d, 4H), J=8.6 Hz); 2.95 (q, 8H, J=7.0 Hz); 0.87 (t, 12H, J=7.0 Hz); $^{13}$C NMR (CDCl$_3$, 75 Hz) δ 147.1, 127.8, 126.8, 125.1, 112.5, 44.5, 12.8; λ$_{max}$=372 nm (THF);

EXAMPLE 19

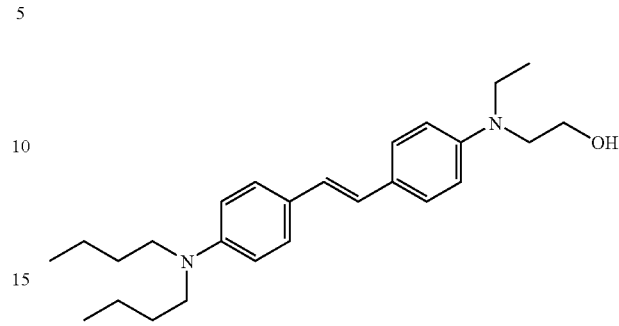

$^1$H NMR (d$_6$-acetone) δ 7.34 (d, J=8.7 Hz, 4H), 6.85 (s, 2H), 6.72 (d, J=8.8 Hz, 2H), 6.67 (d, J=8.8 Hz, 2H), 3.72 (t, J=6.3 Hz, 2H), 3.46 (q, J=6.3 Hz, 2H), 3.36 (t, J=7.5 Hz, 4H), 1.60 (m, 4H), 1.43 (m, 4H), 1.17 (t, J=7.0 Hz, 3H), 0.97 (t, 6H, J=7.3 Hz); $^1$H NMR (d$_6$-acetone) δ 147.7, 147.6, 126.5, 126.1, 124.6, 124.4, 112.7, 112.6, 112.5, 112.4, 59.7, 53.1, 51.0, 45.6, 29.8, 20.6, 14.0, 12.2. Anal. Calc. for C$_{26}$H$_{38}$N$_2$O: C, 79.14; H, 9.71; N, 7.10. Found: C, 78.84; H, 9.80; N, 6.97.

EXAMPLE 20

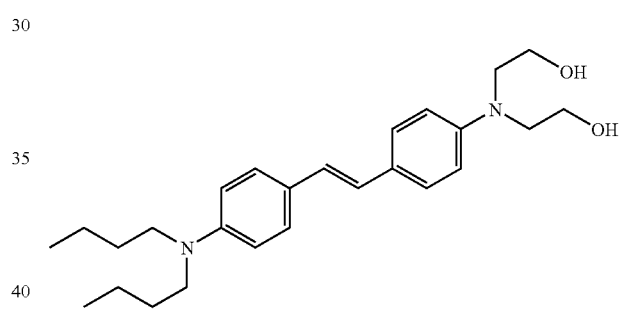

$^1$H NMR (d$_6$-acetone) δ 7.37 (d, J=8.7 Hz, 4H), 6.86 (s, 2H), 6.73 (d, J=8.9 Hz, 2H,), 6.70 (d, J=8.9 Hz, 2H), 3.77 (t, J=5.7 Hz, 4H), 3.57 (t, J=5.7 Hz, 4H), 3.41 (q, J=7.0 Hz, 4H), 1.16 (t, J=7.0 Hz, 6H).

EXAMPLE 21

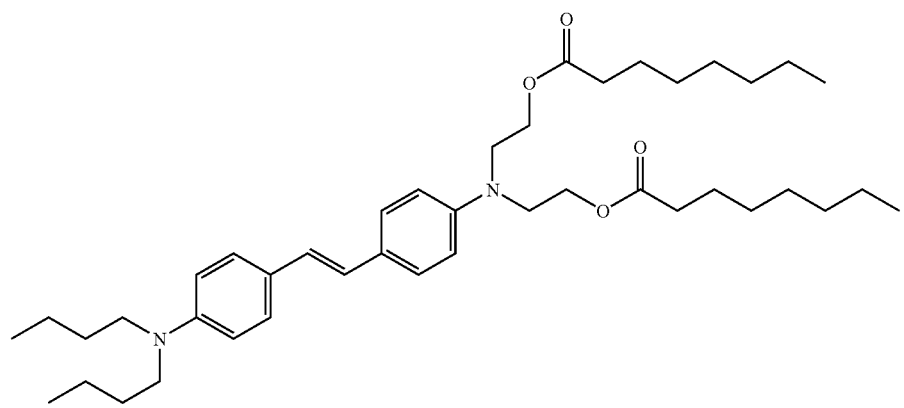

mp. 40-50° C.; $^1$H NMR (d$_6$-acetone) δ 7.38 (t, J=8.9 Hz, 4H), 6.89 (bd, 2H), 6.87 (d, J=8.8 Hz, 2H,), 6.70 (d, J=8.8 Hz, 2H), 4.29 (t, J=6.0 Hz, 4H), 3.72 (t, J=6.0 Hz, 4H), 3.43 (q, J=7.0 Hz, 4H), 2.32 (t, J=7.4 Hz, 4H), 1.60 (m, 4H), 1.30 (bs, 16H), 1.17 (t, J=7.0 Hz, 6H), 0.90 (t, J=7.0 Hz, 6H); $^{13}$C NMR (d$_6$-acetone, 75 MHz) δ 173.4, 147.4, 147.2, 127.7, 127.5, 126.0, 125.3, 124.1, 112.8, 112.3, 61.6, 49.9, 44.5, 34.2, 32.1, 29.4, 25.3, 23.0, 14.0, 12.6.

EXAMPLE 22

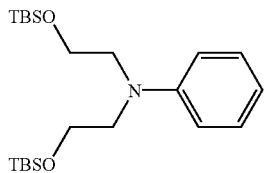

N,N-di-(2-t-butyldimethylsiloxy)ethyl-aniline. N-phenyl diethanolamine (28.04 g, 154.7 mmol) was added at 0° C. to a stirred solution of t-butyldimethylsilylchloride (58.299 g, 386.78 mmol) and imidazole (31.598 g, 464.1 mmol) in 250 mL N,N-dimethylformamide. The reaction mixture was stirred overnight at room temperature and then was added to ice water and extracted with ether. The organic layer was washed three times with brine and was dried over magnesium sulfate. Evaporation of solvent yielded 63.35 g (100%) of the crude product as a light purple oil which was taken on without further purification: R$_F$ 0.60 (90:10-hexane:ethyl acetate); $^1$H NMR (300 MHz, acetone-d6) δ 0.07 (s, 6H), 0.92 (s, 9H), 3.58 (t, J=6.13 Hz, 2H), 3.83 (t, J=6.11, 2H), 6.60 (t, 1H), 6.75 (d, J=8.34 Hz, 2H), 7.16 (m, 2H).

EXAMPLE 23

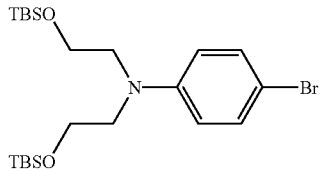

4-bromo-N,N-di-(2-t-butyldimethylsiloxy)ethyl-aniline. N-bromosuccinamide (32.116 g, 180.43 mmol) was dissolved in 150 mL anhydrous N,N-dimethylformamide and added at 0° C. to a stirred solution of N,N-di-(2-t-butyldimethylsiloxy)ethyl-aniline (70.37 g, 171.84 mmol) in 140 mL anhydrous N,N-dimethylformamide. The flask was covered with aluminum foil and stirred overnight in the dark at room temperature. The reaction mixture was then poured into ice water and extracted with ether. The organic layer was washed three times with brine and was dried over magnesium sulfate. Evaporation of solvent yielded 77.765 g (93%) of the crude product as a light purple oil which was taken on without further purification: R$_F$ 0.60 (90:10-hexane:ethyl acetate); $^1$H NMR (300 MHz, d$_6$-acetone) δ 0.06 (s, 6H), 0.91 (s, 9H), 3.59 (t, J=5.89 Hz, 2H), 3.84 (t, J=5.87, 2H), 6.72 (d, J=9.02 Hz, 2H), 7.27 (d, J=8.91 Hz, 2H).

EXAMPLE 24

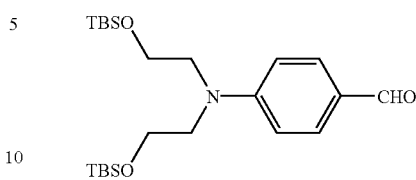

4-N,N-di-(2-t-butyldimethylsiloxy)ethyl-benzaldehyde. t-Butyllithium (35.34 mmol) was added via syringe under nitrogen and at −76° C. to a stirred solution of 4-bromo-N,N-di-(2-t-butyldimethylsiloxy)ethyl-aniline (8.63 g, 17.67 mmol) in 175 mL dry THF. The reaction mixture was stirred for 30 minutes at −76° C. and then N,N-dimethylformamide (3.875 g, 53.0 mmol) was added via syringe. The reaction mixture was allowed to warm to room temperature and then brine was added and the aqueous layer was extracted with ether. The combined organic layers were washed twice with brine and dried over magnesium sulfate. The crude was purified via flash chromatography over silica gel with gradual elutions from 95/5 to 80/20 (hexanes:ethyl acetate). Evaporation of solvent yielded 3.126 g (40%) of a light yellow oil. The adjusted yield=51%: R$_F$ 0.20 (90:10-hexane:ethyl acetate); $^1$H NMR (300 MHz, acetone-d6) δ 0.04 (s, 6H), 0.89 (s, 9H), 3.73 (t, J=5.75 Hz, 2H), 3.90 (t, J=5.71, 2H), 6.90 (d, J=8.85 Hz, 2H), 7.69 (d, J=8.92 Hz, 2H), 9.71 (s, 1H).

EXAMPLE 25

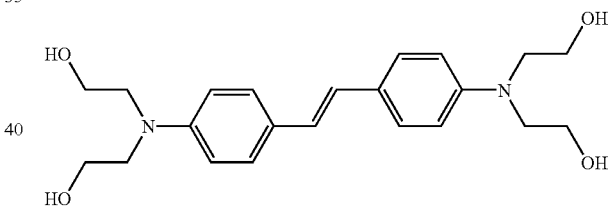

4,4'-bis-(diethanolamino)stilbene. Sodium (1.099 g, 47.8 mmol) was dissolved in 35 mL ethanol and then added to a stirred solution of 4-N,N-di-(2-t-butyldimethylsiloxy)ethyl-benzaldehyde (6.97 g, 15.93 mmol) and bis-diethanolaminobenzyltriphenylphosphoniumiodide (9.032 g, 15.93 mmol) in 35 mL ethanol. The reaction mixture was refluxed overnight under nitrogen balloon atmosphere. Water (~10 mL) was added and the solution was stirred while cooling to room temperature. The precipitate was recovered by suction filtration and the ethanol solution was diluted with 20 mL water and extracted with ethyl acetate. A solid precipitated out of the aqueous fraction and was filtered. The combined solid fractions were washed with 50/50 (methanol:water) and air dried to yield 3.485 g (57%) of a tan solid. The crude was taken on without further purification: R$_F$ 0.18 (ethyl acetate); $^1$H NMR (d$_6$-acetone) δ 3.57 (t, J=5.60 Hz, 4H), 3.76 (q, J=5.53, 4H), 4.18 (t, 2H), 6.72 (d, J=8.71 Hz, 2H), 6.86 (s, 1H), 7.34 (d, J=8.72 Hz, 2H).

Figure 4:
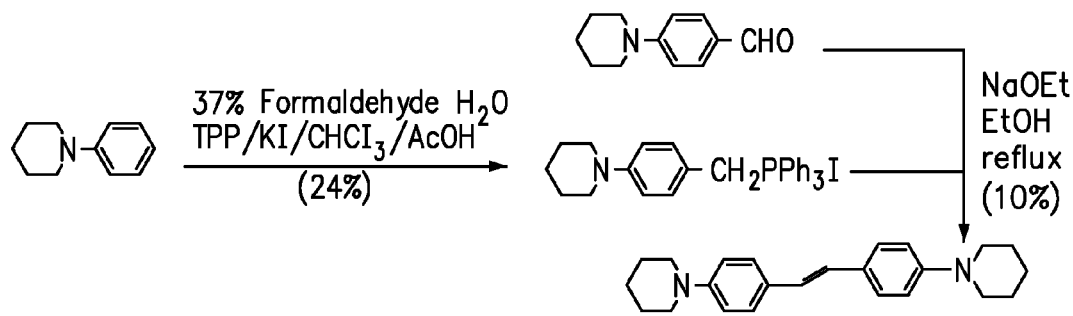
FIG. 4 illustrates a reaction scheme for the synthesis of piperidine stilbenes according to the invention.

FIG. 4 illustrates a reaction scheme for the synthesis of piperidine stilbenes.

4(triphenylphosphinemethylene iodide)-1-phenylpiperidine. Glacial acetic acid (3.9 mL) was added to a stirred solution of triphenylphosphine (5.246 g, 20.0 mmol), potassium iodide (3.32 g, 20.0 mmol), 1-phenylpiperidine (3.289 g, 20.4 mmol), and 37% aqueous formaldehyde (1.5 mL) in 15 mL chloroform. The reaction mixture was refluxed overnight and then cooled to room temperature. Ether (100 mL) was added dropwise with stirring. The solution was decanted off and the gummy solid was dissolved in chloroform and washed with brine. The organic layer was dried over magnesium sulfate. Evaporation of solvent yielded 2.707 g (24%) of a light orange solid. The crude product was taken on without further purification or characterization.

EXAMPLE 27

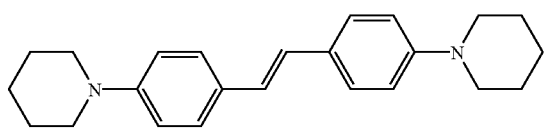

4,4'-dipiperidinylstilbene. Sodium (221 mg, 9.61 mmol) was dissolved in 10 mL ethanol and then added to a stirred solution of 4-piperidinylbenzaldehyde (909 mg, 4.8 mmol) and 4-(triphenylphosphinemethylene iodide)-1-phenylpiperidine (2.707 g, 4.8 mmol) in 15 mL ethanol. The reaction mixture was refluxed overnight under nitrogen balloon atmosphere. Water (~5 mL) was added and the solution was stirred while cooling to room temperature. The precipitate was recovered by suction filtration and rinsed with methanol to yield 145 mg (9%) of a tan solid:$R_F$ 0.38 (90:10-hexanes:ethyl acetate); $^1$H NMR (d$_6$-acetone) δ 1.50-1.80 (m, 6H), 3.19 (t, J=4.66 Hz, 4H), 6.92 (d, J=8.83 Hz, 2H), 6.94 (s, 1H), 7.40 (d, J=8.63 Hz, 2H).

Figure 5:
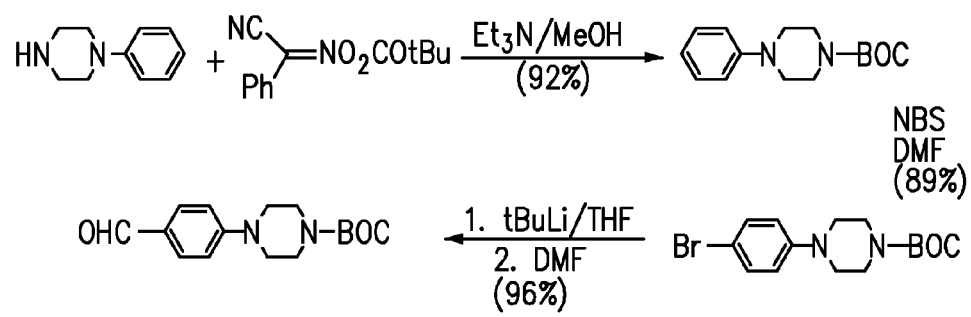
FIG. 5 illustrates a reaction scheme for the synthesis of 4-[N-(t-butoxycarbonyl)]-piperazine benzaldehyde according to the invention.

FIG. 5 illustrates a reaction for the synthesis of 4-[N-(t-Butoxycarbonyl)]-piperazine-benzaldehyde.

EXAMPLE 28

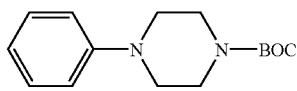

N-(t-Butoxycarbonyl)-1-phenylpiperazine. 1-Phenylpiperazine (9.223 g, 56.85 mmol), BOC-ON (14.0 g, 56.85 mmol) (purchased from Aldrich Chemical Company), and triethylamine (7.19 g, 71.06 mmol) in 570 mL methanol were refluxed overnight. Water was added and the solution was extracted with ether. The organic layer was washed with brine and dried over magnesium sulfate. The crude was purified via flash chromatography over silica gel with gradual elutions from 90/10 to 80/20 (hexanes:ethyl acetate). Evaporation of solvent yielded 13.647 g (92%) of a white solid:$R_F$ 0.38 (90:10-hexanes:ethyl acetate); $^1$H NMR (d$_6$-acetone) δ 1.46 (s, 9H), 3.13 (t, J=5.19 Hz, 4H), 3.54 (t, J=5.03 Hz, 4H), 6.83 (t, J=7.29 Hz, 1H), 6.98 (d, J=8.16 Hz, 2H), 7.24 (t, J=7.59 Hz, 2H); $^{13}$C NMR (d$_6$-acetone) δ 28.24, 44.0, 49.62, 79.36, 116.91, 120.20, 129.48, 152.13, 154.64.

EXAMPLE 29

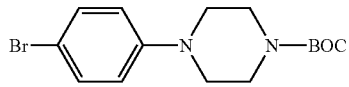

4-bromo-[N-(t-Butoxycarbonyl)]-1-phenylpiperazine. N-bromosuccinamide (4.195 g, 23.57 mmol) was dissolved in 20 mL anhydrous N,N-dimethylformamide and added to a stirred solution of N-(t-Butoxycarbonyl)-1-phenylpiperazine (6.0 g, 22.89 mmol) in 20 mL anhydrous N,N-dimethylformamide. The flask was covered with aluminum foil and stirred overnight in the dark at room temperature. Water (40 mL) was added and the precipitate was filtered. The crude solid was taken up in chloroform, washed with brine, and dried over magnesium sulfate. Evaporation of solvent yielded 6.95 g (89%) of a white solid which was carried on without further purification:$R_F$ 0.45 (80:20-hexanes:ethyl acetate); $^1$H NMR (d$_6$-acetone) δ 1.46 (s, 9H), 3.14 (t, J=4.87 Hz, 4H), 3.53 (t, J=4.80 Hz, 4H), 6.95 (d, J=8.85 Hz, 2H), 7.37 (d, J=8.94 Hz, 2H).

EXAMPLE 30

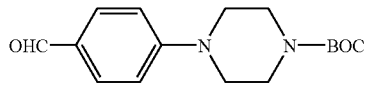

4-[N-(t-Butoxycarbonyl)]-piperazine-benzaldehyde. t-Butyllithium (29.32 mmol) was added via syringe under nitrogen and at −76° C. to a stirred solution of 4-bromo-[N-(t-butoxycarbonyl)]-1-phenylpiperazine (5.0 g, 14.66 mmol) in 145 mL dry tetrahydrofuran. The reaction mixture was stirred for 15 minutes at −76° C. and then N,N-dimethylaformamide (4.287 g, 58.6 mmol) was added via syringe. The reaction mixture was allowed to warm to room temperature and then brine was added. The organic layer was washed with brine and dried over magnesium sulfate. Evaporation of solvent yielded 4.099 g (96%) of a yellow-orange solid which was carried on without further purification: $R_F$ 0.17 (80:20-hexanes:ethyl acetate).

Figure 6:
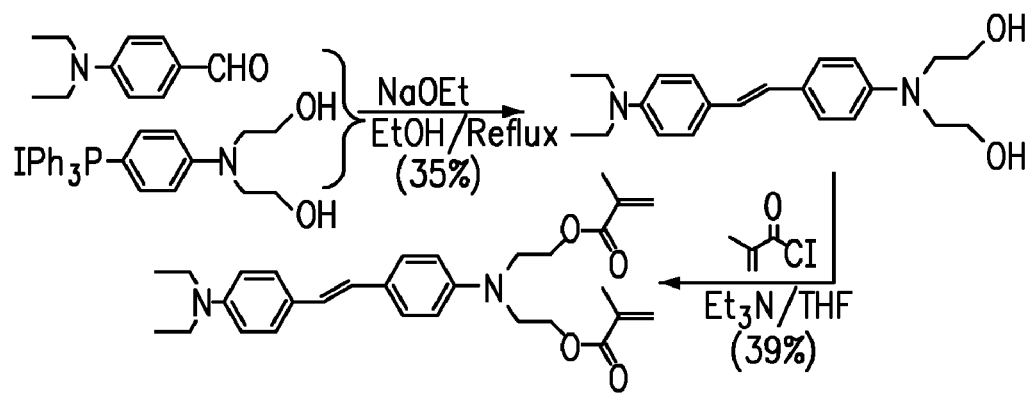
FIG. 6 illustrates a reaction scheme for the synthesis of dimethacrylate-substituted bis-donor stilbenes according to the invention.

FIG. 6 illustrates a reaction scheme for the synthesis of dimethacrylate substituted bis-donor-stilbenes.

EXAMPLE 31

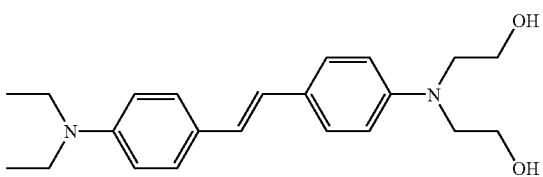

4'-diethanolamino-4-diethylaminostilbene. Sodium (5.84 g, 254 mmol) was dissolved in 150 mL ethanol and then added to a stirred solution of bis-diethanolaminobenzyltriphenylphosphoniumiodide (48.01 g, 84.69 mmol) and 4-diethylaminobenzaldehyde (15.0 g, 84.69 mmol) in 250 mL ethanol. The reaction mixture was refluxed overnight under nitrogen balloon atmosphere. The crude was concentrated to ~300 mL and then water (50 mL) was added and the solution was heated to dissolve everything. The reaction was then stirred while cooling to room temperature and then was placed in an ice bath for 30 minutes. The resulting solid was filtered and washed with 50/50 (ethanol:water). The solid was taken up in hot tetrahydrofuran and magnesium sulfate and a small scoop of silica gel was added. The solution was filtered and concentrated to a slurry. Filtration yielded 7.78 g of product and a second crop was isolated to yield a total of 9.58 g (35%) of a yellow solid: $^1$H NMR (d$_6$-acetone) δ 1.17 (t, J=6.98 Hz, 6H), 3.42 (q, J=7.02 Hz, 4H), 3.59 (t, J=5.58 Hz, 4H), 3.78 (q, J=5.58 Hz, 4H), 4.19 (t, J=5.50 Hz, 2H), 6.72 (m, 4H), 6.86 (s, 2H), 7.35 (d, J=7.48 Hz, 4H).

EXAMPLE 32 added to a stirred solution of bis-diethanolaminobenzyltriphenylphosphoniumiodide (1.273 g, 2.24 mmol) and 6[N,N'-dimethaminophenyl]-hepta-2,4,6,-trien-1-al (510 mg, 2.24 mmol) in 10 mL ethanol. The reaction mixture was refluxed overnight under nitrogen balloon atmosphere. Water (10 mL) was added and the solution was stirred at room temperature for 1 hour and then at 0° C. for one hour. The solution was filtered through a medium glass frit and the solid was washed with methanol and air dried to yield 610 mg (67%) of a dark brown solid: $^1$H NMR (d$_6$-acetone) δ 2.98 (s, 6H), 3.58 (t, J=5.52 Hz, 4H), 3.76 (q, J=4.55 Hz, 4H), 4.20 (bds, 2H), 6.35-6.80 (m, 4H), 6.70 (m, 4H), 7.30 (t, J=9.11 Hz, 4H).

EXAMPLE 34

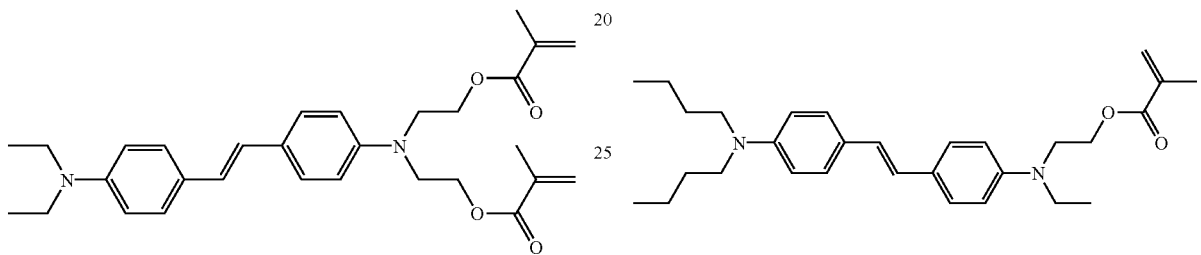

4'-[N,N-di-(2-[(2-methyl-1-oxo-2-propenyl)oxy]ethyl)-amino]-4-diethylaminostilbene. Methacryloylchloride (713 mg, 6.83 mmol) was added at 0° C. to a stirred suspension of 4'-diethanolamine-4-diethylaminostilbene (1.0 g, 3.10 mmol) and triethylamine (784 mg, 7.75 mmol) in 31 mL tetrahydrofuran. The reaction mixture was stirred for 2 hours at room temperature and was then treated with 10% HCl. The organic layer was separated, washed with brine, and dried over magnesium sulfate. The crude was concentrated to a slurry and then filtered and the solid was rinsed with tetrahydrofuran. The liquid portions were combined and adsorbed onto silica gel and purified via flash chromatography with gradual elutions from neat hexanes to 95/5 (hexanes:ethyl acetate). Evaporation of solvent yielded 589 mg (39%) of a light green oil: $R_F$ 0.67 (50:50-hexanes:ethyl acetate); $^1$H NMR (d$_6$-acetone) δ 1.17 (t, J=7.01 Hz, 6H), 1.93 (s, 6H), 3.42 (q, J=7.01 Hz, 4H), 3.82 (t, J=5.93 Hz, 4H), 4.38 (t, J=5.89 Hz, 4H), 5.65 (s, 2H), 6.09 (s, 2H), 6.69 (d, J=8.70, 2H), 6.90 (d, J=8.97 Hz, 4H), 7.38 (t, J=8.90 Hz, 4H).

EXAMPLE 33

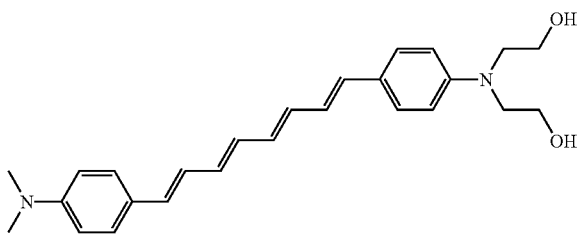

4-[4'-N,N-diethanolamino-(trans-1, trans-3, trans-5, trans-7-octatetraenyl)phenyl]-N,N-dimethylaniline. Sodium (206 mg, 8.98 mmol) was dissolved in 12 mL ethanol and then 4-dibutylamino, 4'-ethyl,-2-hydroxyethylaminostilbene (0.100 g, 0.250 mmol) was dissolved in the smallest amount of dry tetrahydrofuran as possible. Triethylamine (>0.14 mL, excess) was added to the stilbene and stirred for 15 min. Addition of methacryloyl chloride (>0.10 mL, excess) caused the immediate formation of precipitates. After the addition of the acid chloride, the reaction was allowed to stir for 5 min. and was shown to be complete by thin layer chromatography. The mixture was diluted with diethyl ether (25 mL) and the organics were washed with water (3×10 mL), washed with brine (1×10 mL), and dried using K$_2$CO$_3$. Column chromatography on silica gel hexane/ethylacetate (9:1) yielded the desired acrylate as a clear oil (~50% for this tiny scale). $^1$H NMR (d$_6$-acetone) δ 7.39-7.34 (m, 4H), 6.87-6.67 (m, 6H), 6.09 (s, 1H), 5.65 (s, 1H), 4.34 (t, J=6.0 Hz, 2H), 3.70 (t, J=6.0 Hz, 2H), 3.51 (q, J=7.0 Hz, 2H), 3.36 (t, J=7.4 Hz, 6H), 1.93 (s, 3H), 1.60 (p, J=7.1 Hz, 4H), 1.38 (sx, J=7.3 Hz, 4H), 1.19 (t, J=6.9 Hz, 3H), 0.98 (t, J=7.3 Hz, 6H).

General Procedure for the Sterification of the Bishydroxyethyl Substituted Compounds with bis-Boc-lysine:

0.01 mol of the appropriate dialcohol, 0.03 mol of the amino acid and 0.025 mol of hydroxybenztriazole (HOBT.H$_2$O) were dissolved in 60 mL of anhydrous N,N-dimethylformamide and stirred under nitrogen atmosphere. After cooling down to 0° C., 0.035 mol of dicyclohexylcarbodiimide were added at once. The solution was allowed to warm to ambient temperature and stirred for further 15 h. The precipitated urea was filtered off and the solution was diluted with 200 mL of diethyl ether. The organic phase was washed three times with 50 mL of water, dried over Na$_2$SO$_4$ and evaporated to dryness. To remove the excess of amino acid, the residue was dissolved in diethyl ether and filtered over a short column of Florisil. The organic solvent was evaporated again yielding the bisester as a solid. Yields were typically around 70-80%.

EXAMPLE 35

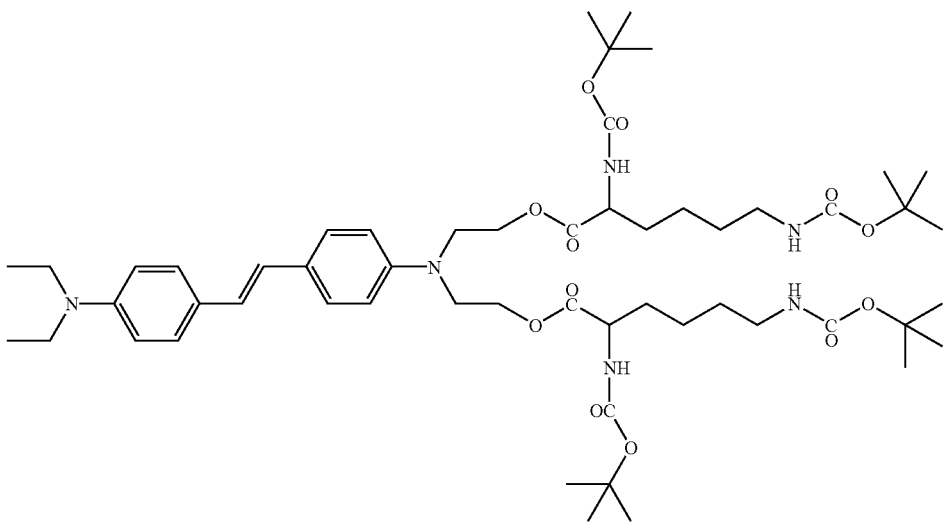

¹H NMR (d₆-acetone) δ 7.38 (d, J=8.7 Hz, 2H), 7.34 (d, J=8.8 Hz, 2H), 6.93-6.78 (m, 4H), 6.66 (d, J=8.7 Hz), 5.93 (b, 2H), 4.4-4.25 (m, 4H), 4.19-4.05 (m, 2H), 3.76 (m, 4H), 3.39 (q, J=7.0 Hz, 4H), 3.04 (q, J=6.2 Hz, 4H), 2.40-1.55 (m, 8H), 1.40 and 1.39 (s, 18 BOC H and 4 CH$_2$ H), 1.11 (t, J=7 Hz, 6H); IR (KBr pellet) 3385.35 (m broad), 2975.70 (m), 2925.26 (m), 2868.32 (w), 1711.43 (s), 1610.89 (m), 1522.55 (s), 1458.04 (w), 1366.21 (m), 1251.55 (m), 1171.18 (s), 1015.40 (w), 859.00 (w), 818.04 (w) cm⁻¹; accurate FAB mass spectrum (m/z) for M⁺ $C_{54}H_{86}N_6O_{12}$ calcd 1010.6303. found 1010.6304. elemental analysis, calcd: C, 64.13, H, 8.57, N, 8.31. found: C, 63.77; H, 8.82; N, 9.10.

EXAMPLE 36

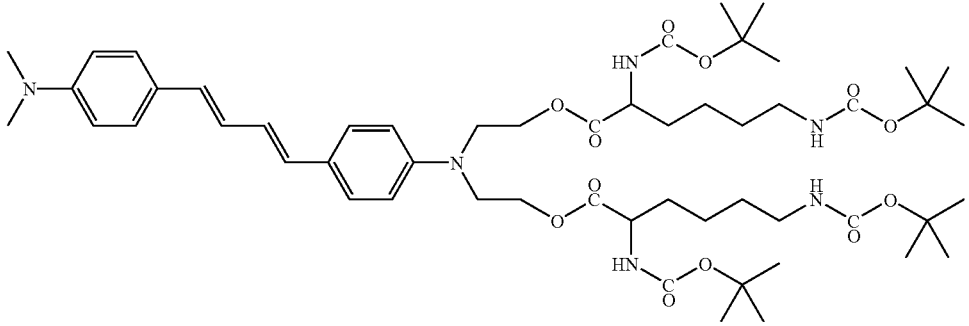

¹H NMR (d₆-acetone) δ 7.40-7.25 (m, 4H), 6.90-6.60 (m, 6H), 6.55-6.40 (m, 2H), 6.23 (d, J=7.8 Hz, 2H, HC—NH proton), 5.94 (b, 2H, H$_2$C—NH protons), 4.38-4.25 (m, 4H), 4.20-4.05 (m, 2H), 3.76 (t, J=5.0 Hz, 4H), 3.10-3.00 (m, 4H), 2.94 (s, 6H), 1.80-1.50 (m, 4H), 1.44-1.22 (m, 26H); accurate FAB mass spectrum (m/z) for M⁺ $C_{54}H_{84}N_6O_{12}$, calcd 1008.6147. found 1008.6141. IR (KBr pellet) 3335.94 (w, broad), 2931.34 (m), 2118.44 (m), 1711.06 (s), 1605.33 (m), 1515.90 (s), 1451.52 (w), 1365.78 (m), 1249.00 (m), 1169.03 (s), 984.09 (w), 796.31 (w) cm⁻¹.

General Procedure for the Deprotection of the Boc-protected Amino Groups:

Through 600 mL of ethyl acetate, gaseous HCl was bubbled while stirring for one hour. Then, the tetra-Boc di-ester was added in portions over 5 min. and the clear solution was kept stirring. After a while, a white solid precipitated. Stirring was continued for 1 further hour. The ethyl acetate was distilled and the remaining white solid was suspended in diethyl ether. After filtration, the tetra ammonium tetrachloride salt was isolated in quantitative yield.

EXAMPLE 37

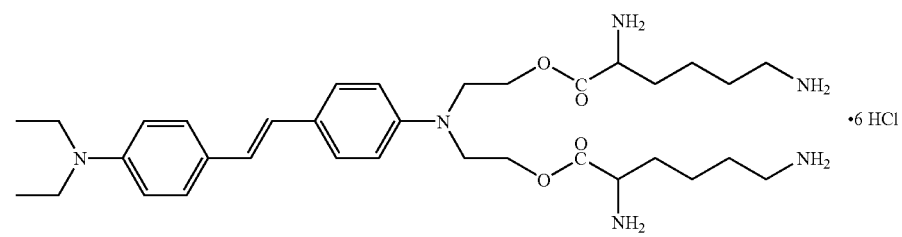

$^1$H NMR (D$_2$O) δ 7.79 (d, J=8.2 Hz, 2H), 7.72 (d, J=8.3 Hz, 2H), 7.49 (d, J=8.2 Hz, 2H), 7.35-7.20 (m, 4H), 4.49 (b, 4H), 4.02 (t, J=6.3 Hz, 2H), 3.95-3.75 (m, 4H), 3.70-3.55 (m, 4H), 2.87 (t, J=7.5 Hz, 4H), 1.90-1.65 (m, 4H), 1.60-1.45 (m, 4H), 1.42-1.15 (m, 4H), 1.11 (t, J=7.1 Hz, 6H); Ir (KBr pellet) 3423.42 (m broad), 2960.10 (s broad), 2647.68 (m), 2604.98 (m), 1996.44 (w), 1751.93 (s), 1597.50 (m), 1516.95 (s), 1458.53 (m), 1388.05 (w), 1212.19 (m), 1150.47 (w), 1129.14 (w), 1043.83 (w), 1011.84 (w), 840.72 (w) cm$^{-1}$; accurate FAB mass spectrum (m/z) for MH$^+$ C$_{34}$H$_{55}$N$_6$O$_4$ calcd 611.4285. found 611.4262.

EXAMPLE 38

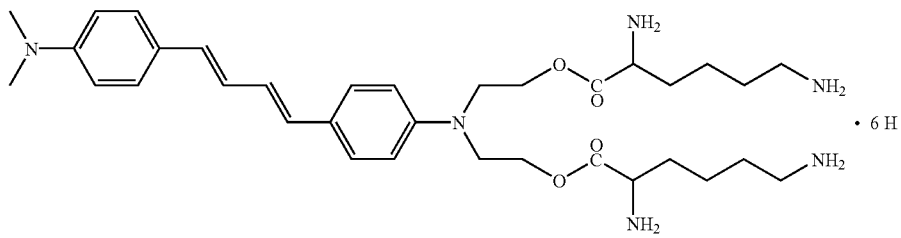

$^1$H NMR (D$_2$O) δ 7.72 (d, J=8.2 Hz, 2H), 7.69-7.35 m, 4H), 7.27-6.98 (m, 4H), 6.88-6.75 (m, 2H), 4.53 (b, 4H), 4.04 (t, J=6.2 Hz), 4.00-3.65 (m, 4H), 3.32 (s, 6H), 2.91 (t, J=7.5 Hz, 4H), 1.90-1.70 (m, 4H), 1.65-1.50 (m, 4H), 1.48-1.15(m, 4H); accurate FAB mass spectrum (m/z) for MH$^+$ C$_{34}$H$_{53}$N$_6$O$_4$ calcd 609.4128. found 609.4102. elemental analysis, calcd: C, 49.35, H, 7.06, N, 10.15. found: C, 50.09; H, 7.94; N, 8.92. IR (KBr pellet) 3430.64 (m, broad), 2934.60 (s, broad), 2612.09 (m, broad), 1751.11 (s), 1701.42 (m), 1595.50 (m), 1509.31 (s), 1459.71 (m), 1388.62 (m), 1366.92 (m)1246.44 (m), 1210.95 (m), 1168.24 (m), 1129.14 (m), 1050.94 (w), 994.98 (m), 898.10 (w), 855.45 (w), 802.13 (w), 731.04 (w), 695.49 (w), 554.61 (w) cm$^{-1}$.

Figure 7:
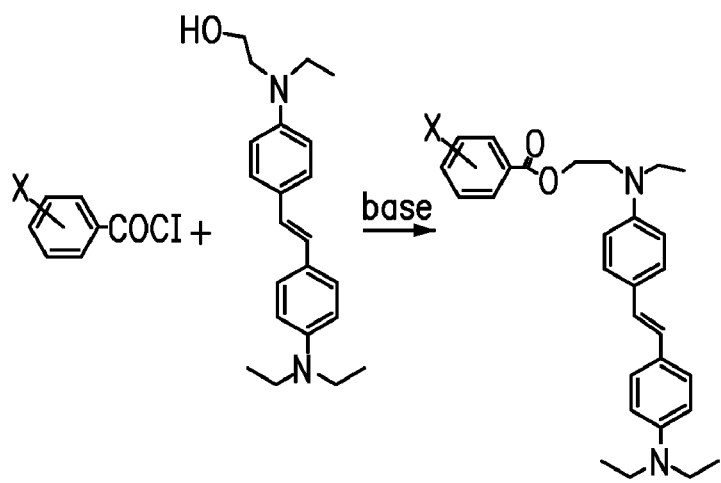
FIG. 7 illustrates a reaction scheme for the synthesis of bis-(dialkylamino)stilbenes substituted with benzoate esters according to the invention.

FIG. 7 illustrates a reaction scheme for the synthesis of bis dialkylamino stilbene substituted with benzoate esters.

EXAMPLE 39

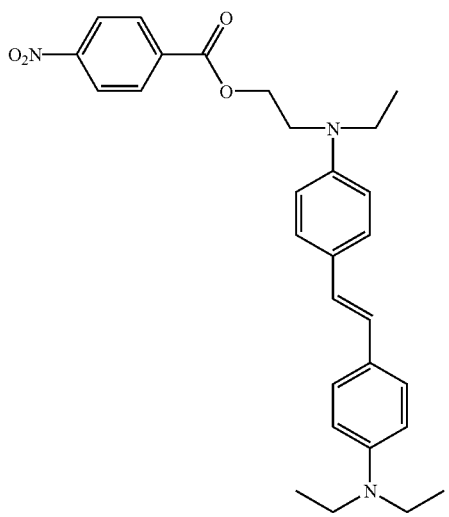

EXAMPLE 40

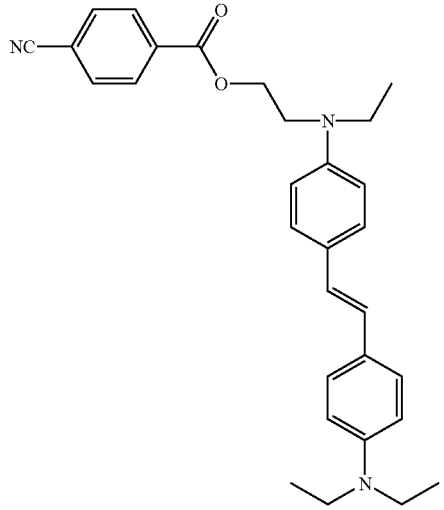

$^1$H NMR (16-acetone): δ 8.28 (d, J=8.1 Hz, 2H), 8.06 (d, J=8.7 Hz, 2H), 7.46 (t, J=7.7 Hz, 4H), 6.95 (m, J=6.3 Hz, 4H), 6.79 (d, J=8.7 Hz, 2H), 4.67 (t, J=5.9 Hz, 2H), 3.94 (t, J=5.7 Hz, 2H), 3.65 (q, J=6.9 Hz, 2H), 3.52 (q, J=6.9 Hz, 4H), 1.28 (m, J=6.9 Hz, 2H); Elemental Analysis Cal'd for C$_{30}$H$_{33}$N$_3$O$_2$: C, 77.06; H, 7.11; N, 8.99. (Found): C, 76.90; H, 6.81; N, 8.91. MS (m/e, FAB): 467.3 (100%, M$^+$); λ$_{max}$ (nm, acetone): 370.4; IR(KBr, cm$^{-1}$): 1723.3 (C=O),2227.6 (CN).

$^1$H NMR (d$_6$-acetone): δ 8.38 (d, J=8.4 Hz, 2H), 8.27 (d, J=8.7 Hz, 2H), 7.38 (t, J=8.7 Hz, 4H,) 6.86 (d, J=8.4 Hz, 4H), 6.70 (d, J=8.4 Hz, 2H), 4.60 (t, J=5.9 Hz, 2H), 3.86 (t, J=5.9 Hz, 2H), 3.57 (q, J=6.9 Hz, 2H), 3.43 (q, J=6.9 Hz, 4H), 1.19 (m, J=6.9 Hz, 2H); Elemental Analysis Cal'd for C$_{29}$H$_{33}$N$_3$O$_4$: C, 71.44; H, 6.82; N, 8.62. (Found): C, 71.40; H, 6.70; N, 8.62. MS (m/e, FAB): 487.3 (100%, M$^+$); λ$_{max}$ (nm, acetone): 370.4; IR(KBr, cm$^{-1}$): 1722.0 (C=O).

EXAMPLE 41

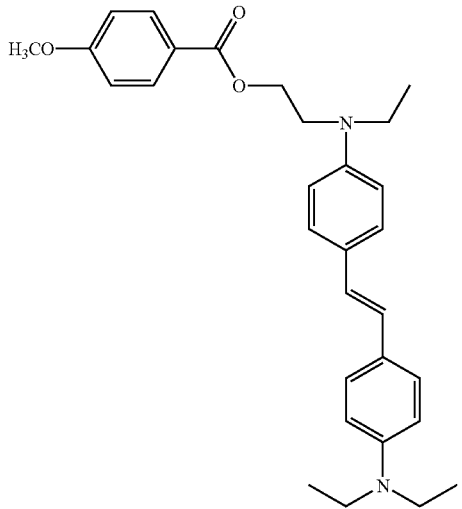

¹H NMR (d₆-acetone): δ 7.99 (d, J=8.7 Hz, 2H), 7.38 (m, J=7.7 Hz, 4H), 7.04 (d, J=8.7 Hz, 4H), 6.86 (m, J=7.8 Hz, 4H), 6.70 (d, J=8.4 Hz, 2H), 4.48 (t, J=6.0 Hz, 2H), 3.79 (t, J=6.0 Hz, 2H), 3.56 (q, J=6.9 Hz, 2H), 3.43 (q, J=6.9 Hz, 4H), 1.19 (m, J=6.5 Hz, 2H); Elemental Analysis Cal'd for $C_{30}H_{36}N_2O_3$: C, 76.24; H, 7.68; N, 5.93. (Found): C, 76.15; H, 7.69; N, 5.75. MS (m/e, FAB): 472.3 (100%, M⁺); $\lambda_{max}$ (nm, acetone): 371.4; IR(KBr, cm⁻¹): 1708.6 (C=O).

EXAMPLE 42

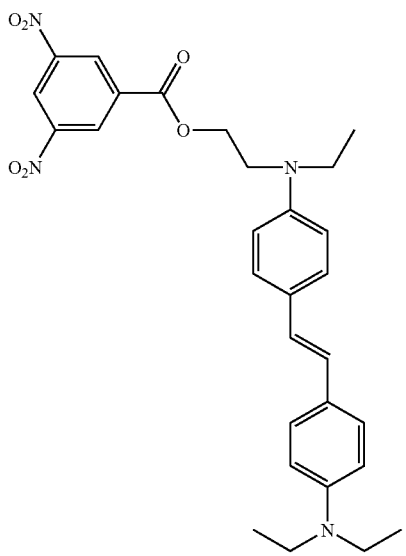

¹H NMR (d₅-pyridine): δ 9.24 (s, 1H), 9.13 (s, 2H), 7.63 (overlapped with solvent), 6.97 (d, J=7.8 Hz, 2H), 6.77 (d, J=7.8 Hz, 2H), 4.67 (t, 2H), 3.77 (t, 2H), 3.44 (q, J=6.3 Hz, 2H), 3.23 (q, J=6.3 Hz, 4H), 1.13 (t, J=6.3 Hz, 3H), 1.03 (t, J=6H); Elemental Analysis Cal'd for $C_{29}H_{32}N_4O_6$. (Found): C, 65.40; H, 6.06; N, 10.52. (Found): C, 65.40; H, 6.31; N, 10.52. MS (m/e, FAB): 532.2 (35%, M⁺). $\lambda_{max}$ (nm, N,N-dimethylformamide): 374.1; IR(KBr, cm⁻¹): 1732.7 (C=O).

Figure 8:
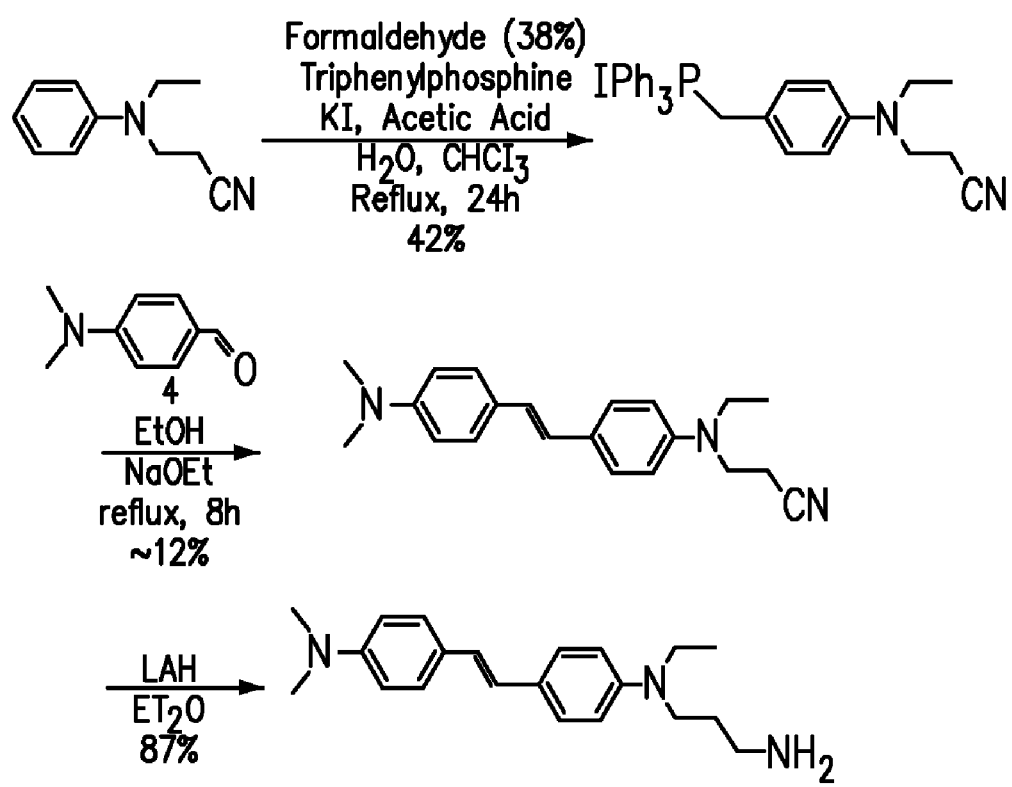
FIG. 8 illustrates a reaction scheme for the synthesis of an cyano-substituted and primary amino-substituted stilbene according to the invention.

FIG. 8 illustrates a reaction scheme for the synthesis of an cyano substituted and primary amino substituted stilbene.

Figure 9:
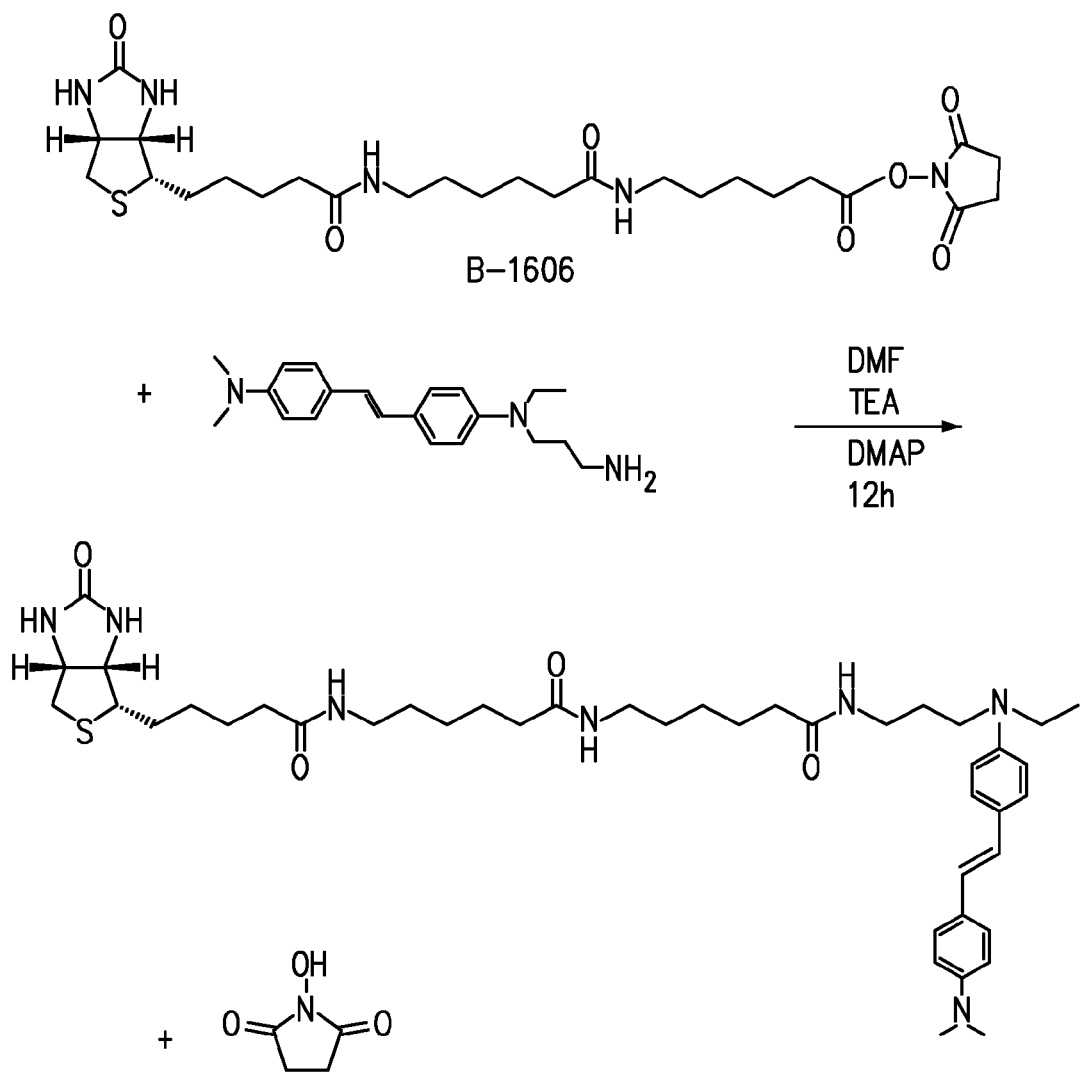
FIG. 9 illustrates a reaction scheme for the synthesis of an amine biotin substituted two-photon absorbing stilbene.

FIG. 9 illustrates a reaction scheme for the synthesis of an amine biotin substituted two-photon absorbing stilbene.

EXAMPLE 43

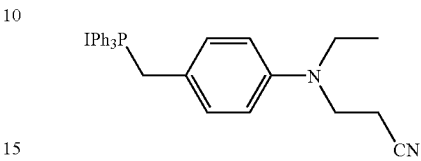

A suspension of formaldehyde (37.5 mL, 37% solution), triphenylphosphine (131 g, 0.5 mmol), KI (82.6 g, 0.5 mol), N,N-ethyl-2-cyanoethylaniline (87.1 g, 0.5 mol), CHCl₃ (375 mL), H₂O (2.5 mL), and glacial acetic acid (95 mL) was heated to reflux for 24 h. The mixture was then filtered while warm to remove unreacted KI. The filtrate was allowed to cool and was then poured into diethylether (800 mL). This mixture was stirred until a fluffy white precipitate formed (8 h). The precipitated product was collected by vacuum filtration and was rinsed with 1.5 L toluene to remove excess triphenylphosphine. The remaining solvent was removed from the white solid in vacuo to yield 120 g (42.0% yield). ¹H NMR (d₄-MeOH) δ 7.91-7.60 (m, 15H), 6.84-6.60 (m, 4H), 4.83-4.75 (m, 2H), 3.63 (t, J=6.44, 2H), 3.41 (q, J=6.95, 2H), 2.66 (t, J=6.48, 2H), 1.12 (t, J=6.97, 3H).

EXAMPLE 44

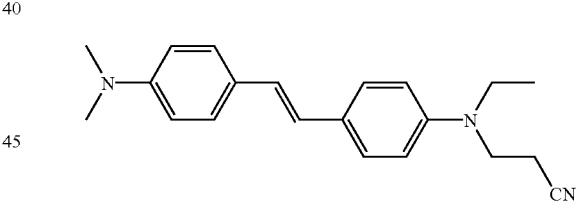

Sodium ethoxide was prepared by dissolving sodium (2.40 g, 104 mmol) in absolute ethanol (200 mL). To a solution of 4-[N,N-ethyl, 2-cyanoethylamino]benzyltriphenylphosphonium iodide, (30.2 g, 52.4 mmol) and dimethylaminobenzaldehyde (7.44 g, 49.9 mmol) in absolute ethanol (400 mL), the sodium ethoxide solution was added in one portion. The mixture was heated to reflux for approximately 8 h, and then cooled to 50° C. before adding 400 mL of H₂O. Upon cooling to ambient temperature, the product precipitated. Filtration of the pale yellow fluorescent product, 1.90 g (12.0% yield), yielded mostly pure trans product. ¹H NMR (300 MHz, d₆-acetone) δ 7.39-7.35 (m, 4H), 6.88 (s, 2H), 6.78-6.70 (m, 4H), 3.73 (t, J=6.78, 2H), 3.50 (q, J=6.96, 2H), 2.94 (s, 6H), 2.74 (t, J=6.84, 2H), 1.17 (t, J=6.97, 3H); IR (neat, NaCl) diagnostic signal (weak) 2246 cm⁻¹.

EXAMPLE 45

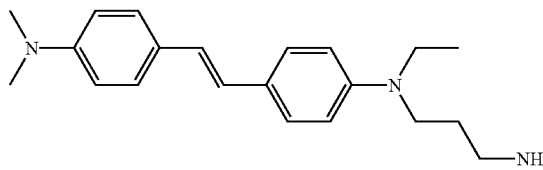

To a suspension of 4-dimethylamino-4'-[ethyl, 2-cyanoethylamino]-stilbene (0.480 g, 1.50 mmol) in dry diethylether (170 mL), lithium aluminum hydride (0.114 g, 3.01 mmol) was added as a solid in portions. Within 10 min. a yellow precipitate began to form. At this point, thin layer chromatography showed no starting material 4-dimethylamino-4'-[ethyl, 2-cyanoethylamino]-stilbene. The reaction suspension was stirred overnight. Carefully (under nitrogen atmosphere) the yellow precipitate was collected by vacuum filtration and was rinsed with copious amounts of diethylether. The reactive cake of solid was dissolved in ethylacetate, cooled to 5° C., and carefully quenched with $H_2O$. The aqueous layer was extracted with ethylacetate (2x) and the organics were combined and dried with $Na_2SO_4$. Removal of solvent in vacuo yielded 0.420 g of pure yellow solid product (87.0% yield). $^1H$ NMR ($d_6$-acetone) δ 7.39-7.34 (m, 4H), 6.88 (s, 2H), 6.74-6.70 (m, 4H), 3.45-3.40 (m, 4H), 3.22 (t, J=6.47, 2H), 3.15 (m, 2H), 2.93 (s, 6H), 1.90-1.86 (m, 2H), 1.14 (t, J=6.86, 3H); IR (neat, NaCl) diagnostic signals (weak) 3400-3200 cm$^{-1}$.

EXAMPLE 46

4-dimethylamino-4'-[ethyl,3-aminopropylamino]-stilbene. (0.0253 g, 0.0773 mmol) in 1.0 mL of dry N,N-diethylformamide was combined with triethylamine (>0.012 mL) and a tiny fleck of N,N-dimethylaminopyridine. After stirring the mixture for 10 min. Molecular Probes B-1606 was added as a solid. The addition arm of the flask was rinsed with an additional 0.5 mL of N,N-dimethylformamide. The reaction mixture was stirred for 24 h before all volatiles were removed in vacuo. The crude NMR of the residue in N,N-dimethylformamide-d7 clearly showed the formation of hydroxysuccinimide, and the biotin substituted stilbene pictured above, (diagnostic signal δ 11.07, br s, $R_2NOH$).

General Procedure for the Preparation of Stilbenes via McMurry Coupling:

EXAMPLE 47

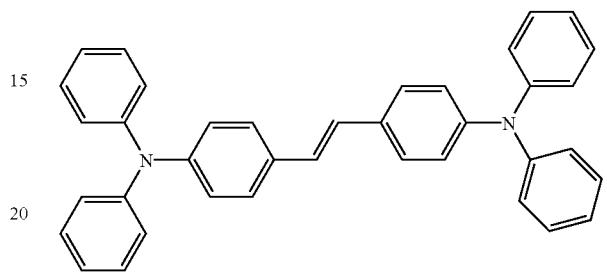

4,4'-Bis(N,N-diphenylamino)stilbene. To a suspension of zinc dust (4.7 g) in 150 mL THF, was added under nitrogen with stirring a solution of 37 mL 1.0 M $TiCl_4$ (in $CH_2Cl_2$) over 20 min. The reaction mixture was heated under reflux for 1 h, and then a solution of N,N-disubstituted benzaldehyde (7.3 mmol) and pyridine (4.7 mL) in 100 mL tetrahydrofuran was added through a syringe over 30 min to the gently refluxing suspension. After refluxing under nitrogen for 18 h, a quenching solution of $K_2CO_3$ (10%, 25 mL) was carefully introduced. The reaction mixture was filtered and the filtrate was concentrated in vacuo, and then extracted with 200 mL methylene chloride. The extract was washed with water (twice 100 mL each), and dried over anhydrous sodium sulfate. The solvent was evaporated under reduced pressure and the residue was subjected to column chromatography with the appropriate solvent. M.P. 247-259° C. $^1H$ NMR ($d_6$-acetone) δ 7.50(d, J=8.63 Hz, 4H), 7.31(m, 8H), 7.12(s, 2H), 7.07(m, 12H), 7.01(d, J=8.53 Hz, 4H); MS (FAB), m/z 514 (M$^+$).

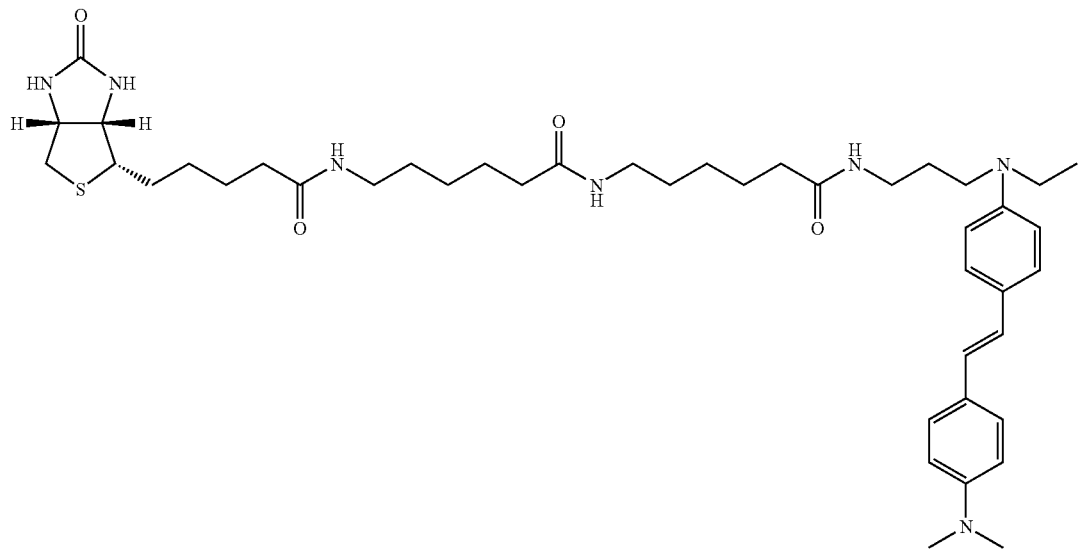

EXAMPLE 48

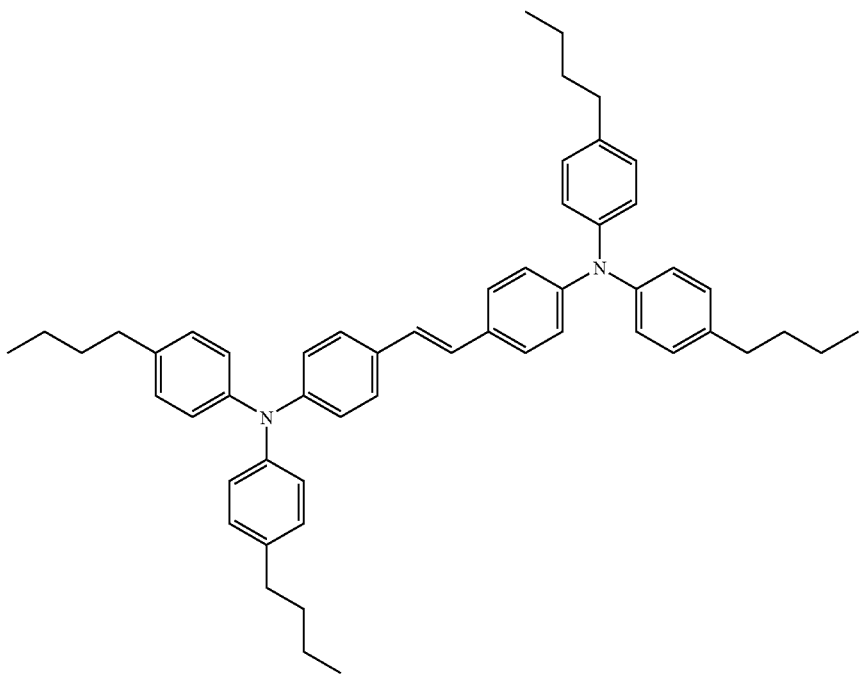

Synthesized by general procedure for the preparation of stilbenes via McMurry coupling described for 4,4'-Bis(N,N-diphenylamino)stilbene. Yellow solid; $^1$H NMR (d$_6$-benzene, 300 MHz) δ 7.23 (d, 4H, J=8.7 Hz); 7.16 (t, 12H); 6.97 (d, 8H, J=8.3 Hz); 6.94 (s, 2H); 2.44 (t, 8H, J=7.6 Hz); 1.48 (m, 8H); 1.26 (m, 8H); 0.85 (t, 12H, J=7.2 Hz); $^{13}$C NMR (CDCl$_3$, 75 MHz) δ 147.9, 146.1, 137.8, 132.0, 129.7, 127.6, 126.9, 125.0, 123.4, 35.4, 34.1, 22.7, 14,1; λ$_{max}$=394 nm (toluene); Anal. Calc. for C$_{54}$H$_{62}$N$_2$: C, 87.75; H, 8.45; N, 3.79. Found: C 87.27; H, 8.41; N, 3.99.

EXAMPLE 49

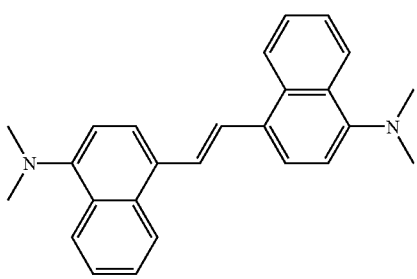

Synthesized by general procedure for the preparation of stilbenes via McMurry coupling described for 4,4'-Bis(N,N-diphenylamino)stilbene. $^1$H NMR (d$_6$-acetone) δ 8.28-8.36 (m, 4H), 7.90-7.92 (m, 4H), 7.52-7.58 (m, 4H), 7.19 (d, J=7.9 Hz, 2H), 2.90 (s, 12H); $^{13}$C NMR δ 45.50, 114.92, 124.32, 124.68, 125.05, 125.49, 125.74, 126.77, 127.82, 129.65, 130.91, 133.52, 151.82; accurate FAB mass spectrum (m/z) for M$^+$ C$_{26}$H$_{26}$N$_2$, calcd 366.2096. found 366.2044.

EXAMPLE 50

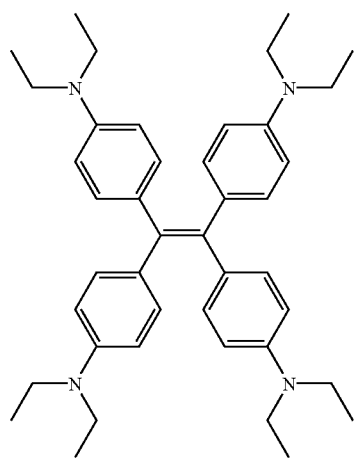

Synthesized by general procedure for the preparation of stilbenes via McMurry coupling described for Bis(N, N-diphenyl-p-amino)stilbene. $^1$H NMR (d$_8$-dioxane) δ 6.79 (d, J=8.5 Hz, 8H), 6.39 (d, J=8.5 Hz, 8H), 3.26 (q, J=6.7 Hz, 16H), 1.07 (t, J=6.8 Hz, 24H), $^{13}$C NMR δ 12.94, 44.53, 111.56, 133.27, 137.52, 133.80, 146.28; accurate FAB mass spectrum (m/z) for M$^+$ C$_{42}$H$_{56}$N$_4$, calcd 616.4505. found 616.4515.

Example of a Copper Coupling to Synthesize a Bithiophene Derivative.

EXAMPLE 51

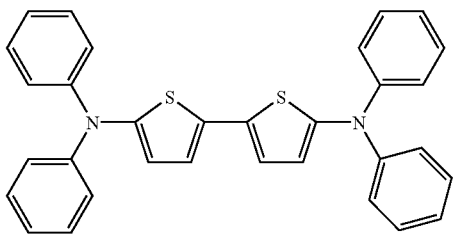

N,N,N,N-tetraphenyl-2,5'-diamino-2',5-bithiophene. To a solution of N,N-diphenyl-2-aminothiophene (1.5 g, 6 mmol) in THF 10 mL) was added slowly a solution of n-butyllithium (2.4 mL, 6 mmol, 2.5 M in hexanes) and stirred at room temperature for 15 min. To the solution was added copper(II) bromide (1.3 g, 6 mmol). The slurry was stirred for 30 min. then quenched with water. The mixture was extracted with methylene chloride and the organic layer was dried over magnesium sulfate and the solvent was removed in vacuum. Column chromatography (toluene, silica gel) gave 0.15 g (10% yield) of the title compound. $^1$H NMR ($d_6$-acetone) δ 7.35 (t, J=8.1 Hz, 4 H), 7.16 (d, J=8.3 Hz, 4H), 7.11 (t, J=8.0 Hz, 2H), 7.01 (d, J=4.1 Hz, 2H), 6.64 (d, J=4.1 Hz, 2H).
Synthesis of a Bis Donor-substituted Stilbene Using a Pd Catalyzed Coupling of a Secondary Amine and a Dibromostilbene

EXAMPLE 52

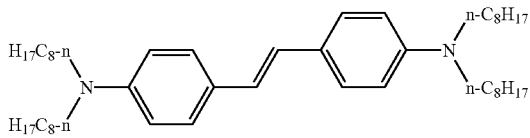

4,4'-Bis-dioctylaminostilbene. An oven dried 3-necked flask was fitted with a reflux condenser and purged with nitrogen. Into the flask was placed 4,4'-dibromostilbene (1.0 g, 2.96 mmol) (synthesized by the general Wittig procedure described above), tris(dibenzylideneacetone)dipalladium (Pd$_2$(dba)$_3$) (13.5 mg, 0.0148 mmol), o-tolylphosphine (13,5 mg, 0.044 mmol), and sodium t-butoxide (711 mg, 7.4 mmol) in 6 mL dry toluene. Dioctylamine (1.608 g, 6.65 mmol) was then added and the reaction mixture was stirred for 48 hours at 80° C. under nitrogen balloon atmosphere. The crude product was then adsorbed onto silica gel and purified via flash chromatography with gradual elutions from 98/2 to 95/5 (hexanes:ethyl acetate). $^1$H NMR ($d_6$-acetone) δ 0.89 (m, 12H), 1.20-1.70 (m, 24H), 3.34 (t, J=7.51 Hz, 8H), 6.66 (d, J=8.75 Hz, 4H), 6.83 (s, 2H), 7.32 (d, J=8.62 Hz, 4H).

EXAMPLE 53

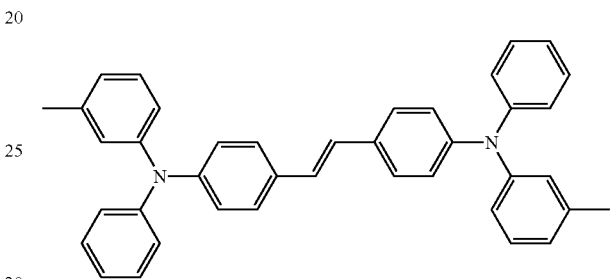

Trans-4,4'-bis(m-tolylphenylamino)stilbene. Pd$_2$dba$_3$ (Example 52) (963 mg, 1.05 mmol) and bis(diphenylphosphino)ferrocene (833 mg, 1.33 mmol) were stirred under nitrogen in dry toluene (500 mL) for 15 min. Trans-4,4'-dibromostilbene (15.00 g, 44.4 mmol) was added against a counterflow of nitrogen and the reaction was stirred for an additional 15 min; sodium tert-butoxide (13.00 g, 135 mmol) was then added and m-tolylphenylamine (16.8 mL, 97.6 mmol) was added from a syringe. After 30 min at room temperature, the reaction mixture was warmed to 95° C. for 24 h, at which time, the reaction appeared complete by thin layer chromatography. The reaction mixture was transferred to a separating funnel together with water (1 L) and ether (500 mL). The aqueous layer was extracted with ether until the extracts were almost colorless. The combined organics were dried over magnesium sulfate, filtered and concentrated by rotary evaporation. The resulting material was dissolved in benzene and passed through a silica plug. The benzene solution was concentrated under reduced pressure and heated. Addition of methanol followed by cooling afforded trans-4,4'-bis(m-tolylphenylamino)stilbene as an NMR-pure yellow powder (22.59 g, 41.6 mmol, 94%). $^1$H NMR ($d_6$-acetone) δ 7.47 (d, J=8.6 Hz, 4H), 7.34-7.27 (m, ca. 6H), 7.19 (t, J=7.7 Hz, 2H), 7.10-6.85 (m, ca. 16H), 2.24 (s, 6H); $^{13}$C NMR (75 MHz, $d_6$-acetone) δ 148.5, 148.4, 148.0, 139.9, 132.9, 130.2, 130.0, 128.1, 127.3, 125.9, 125.0, 124.9, 124.2, 123.8, 122.5, 21.4; UV (THF) $\lambda_{max}$ 305 ($\epsilon_{305}$ 26000), 387 ($\epsilon_{387}$ 51000) nm; UV (acetone) $\lambda_{max}$ 386 nm; UV (ethanol) $\lambda_{max}$ 304, 386 nm; High resolution LSIMS calcd. for C$_{40}$H$_{34}$N$_2$ M$^+$ 542.2722. found 542.2716.

General Procedure for the Synthesis of Bis-styrylbenzenes and Compounds by a General Double Wittig Reaction:

EXAMPLE 54

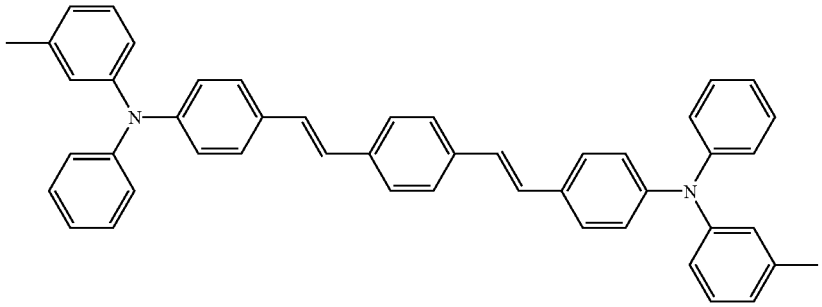

E,E-1,4-Bis[4-(m-tolylphenylamino)styryl]benzene. A solution of tetramethyl α,α'p-xylenediphosphonate (10.7 g, 33.3 mmol) in dry N,N-N,N-dimethylformamide (200 mL) was added dropwise to a stirred suspension of sodium hydride (ca. 10 g, 420 mmol) in dry N,N-N,N-dimethylformamide (250 mL). After 1 h stirring at room temperature, a solution of 4-(m-tolylphenylamino)benzaldehyde (20.6 g, 71.5 mmol) in N,N-dimethylformamide (200 mL) was added dropwise. After 48 h water (200 mL) was added cautiously. The mixture was transferred to a separating funnel together with more water and dichloromethane. The aqueous layer was extracted with dichloromethane until the extracts were almost colorless. The combined organics were dried over magnesium sulfate. After filtration, silica gel was added and the solvent removed under reduced pressure, leaving the product absorbed onto the silica. The crude product was transferred to the top of a silica gel column which was eluted with toluene. Evaporation of the first fraction under reduced pressure afforded a yellow powder (16.3 g, 25.3 mmol, 76%) which was found to be NMR-pure E,E-1,4-bis[4-(m-tolylphenylamino)styryl]benzene. The compound can be conveniently recrystallized from a hot mixture of heptane and toluene. $^1$H NMR (CD$_2$Cl$_2$) δ 7.49 (s, 4H), 7.41 (d, J=8.6 Hz, 4H), 7.30-6.88 (m, 26H), 2.27 (s, 6H); $^{13}$C NMR (dichloromethane-d$_2$) δ 147.9, 147.8, 147.7, 139.7, 137.0, 131.6, 129.6, 129.4, 128.2, 127.6, 126.9, 126.7, 125.7, 124.8, 124.5, 123.6, 123.3, 122.2, 21.5; UV (THF) $\lambda_{max}$ 305 ($\epsilon_{305}$ 34000), 405 ($\epsilon_{405}$ 65000) nm; T$_m$ (DSC) 215° C.; High resolution LSIMS calcd. for C$_{40}$H$_{48}$N$_2$ M$^+$ 644.3192. found 644.3177.

EXAMPLE 55

E,E-3,5-Bis[4-(m-tolylphenylamino)styryl]-1,4-dimethoxybenzene. n-Butyllithium (28.5 mL of a 2.5 M hexane solution, 71.3 mmol) was added dropwise to a slurry of 2,5-bis(triphenylmethylenephosphonium)-1,4-dimethoxybenzene (26.8 g, 35.2 mmol) in dry THF (450 mL) at −78° C.; the reaction mixture immediately became very dark. The cooling bath was removed and the reaction mixture was allowed to warm to room temperature over 2 h before recooling to −78° C. and adding a solution 4-(m-tolylphenylamino)benzaldehyde (21.2 g, 73.8 mmol) in dry tetrahydrofuran (100 mL) dropwise. The reaction mixture was allowed to warm to room temperature and then stirred at room temperature for 2 h before cautiously adding water (300 mL). The mixture was extracted with diethyl ether until the extracts were almost colorless and the combined ether layers were dried on magnesium sulfate. After filtration silica gel was added and the solvent removed under reduced pressure leaving the product absorbed onto the silica. The crude product was transferred to the top of a silica gel column which was eluted with toluene. The first fraction was found to be an approximately statistical mixture of the geometric isomers of 3,5-bis[4-(m-tolylphenylamino)styryl]-1,4-dimethoxybenzene. Further elution gave a trace of an unidentified material, possibly impure 1-[4-(m-tolylphenylamino)phenyl]-pentan-1-ol on the basis of its $^1$H NMR spectrum, and then 4-(m-tolylphenylamino)benzaldehyde. The mixed isomers were dissolved in toluene (1 L) and heated under nitrogen with a few crystals of iodine. After 48 h, the solution was passed through a silica plug. The solvent was removed under reduced pressure and the solids were recrystallized from hot toluene to afford the pure E,E isomer as a bright yellow powder (12.82 g, 18.2 mmol, 52%). $^1$H NMR (CD$_2$Cl$_2$) δ 7.43 (d, J=8.6 Hz, 4H), 7.36 (d, J=16.5 Hz, 2H), 7.27 (t, J=ca. 8 Hz, 4H), 7.19-7.00 (m, ca. 16H), 6.94 (br s, 2H), 6.91-6. (br m, 4H) 3.91 (s, 6H), 2.27 (s, 6H); $^{13}$C NMR (75 MHz, CD$_2$Cl$_2$) δ 151.7, 148.0, 147.8, 147.7, 139.6, 132.2, 129.5, 129.4, 128.5, 127.6,

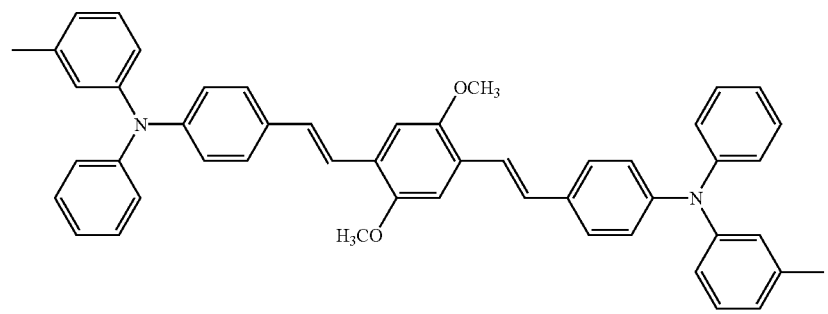

126.7, 125.7, 124.7, 124.4, 123.7, 123.2, 122.2, 121.6, 109.0, 56.6, 21.5; UV (THF) λ$_{max}$ 305 (ε$_{305}$ 37000), 426 (ε$_{426}$ 84000) nm; m.p 254° C.; High resolution EIMS calcd. for $C_{50}H_{44}N_2O_2$ M+ 704.3403. found 704.3404. Anal. calcd for $C_{50}H_{44}N_2O_2$: C, 85.20; H, 6.29; N, 3.97. Found: C, 85.44; H, 6.40; N, 3.86.

EXAMPLE 56

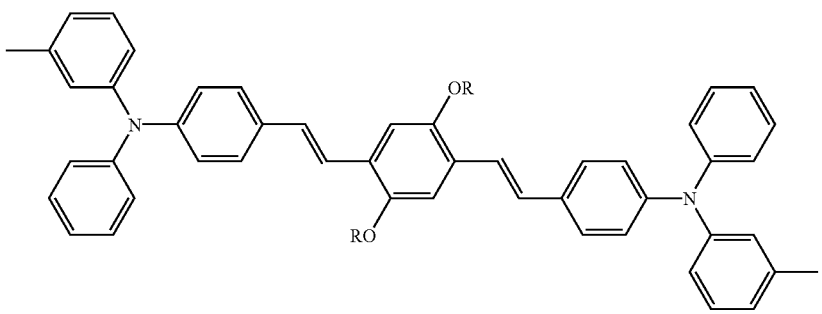

R = $C_{12}H_{25}$

E,E-3,5-Bis[4-(m-tolylphenylamino)styryl]-1,4-di(n-dodecyloxy)benzene. n-Butyllithium (2.3 mL of a 2.5 M hexane solution, 5.75 mmol) was added dropwise to 2,5-bis(triphenylmethylenephosphonium)-1,4-di(n-dodecoxy)benzene (2.498 g, 2.15 mmol) in dry tetrahydrofuran (50 mL) at −78° C.; the reaction mixture immediately became very dark. The cooling bath was removed and the reaction mixture was allowed to warm to room temperature over 2 h before recooling to −78° C. and adding a solution 4-(m-tolylphenylamino)benzaldehyde (1.637 g, 5.70 mmol) in dry TIE (30 mL) dropwise. The reaction mixture was allowed to warm to room temperature and then stirred at room temperature for 2.5 h before cautiously adding water (150 mL). The mixture was extracted with diethyl ether (3×50 mL) and the combined ether layers were dried on magnesium sulfate. After filtration, the solvent removed under reduced pressure; the residue was dissolved in the minimum amount of dichloromethane and the resulting solution was transferred to the top of a silica gel column which was eluted with hexane/ethyl acetate (7:1). The first fraction was found to be a mixture of the geometric isomers of 3,5-bis[4-(m-tolylphenylamino)styryl]-1,4-di(n-dodecoxy)benzene $^1$H NMR (d$_6$-acetone) δ 7.47-6.86 (m, aryl CHs), 6.65 (d), 6.56 (d), 4.12 (t), 4.05 (t), 3.77 (t), 2.25 (overlapping singlets), 2.12-1.19 (m), 0.86 (m)}. The mixed isomers were dissolved in toluene (200 mL) and heated under nitrogen with a few crystals of iodine. After 3 days, the solution was passed through a silica plug. The solvent was removed under reduced pressure to afford a yellow oil (ca. 2.7 g) which was recrystallized from acetone to afford the pure E,E isomer as a bright yellow powder (925 mg, 0.927 mmol, 43%). $^1$H NMR (CD$_2$Cl$_2$) δ 7.42 (d, J=8.6 Hz, 4H), 7.35 (app. s, 2H), 7.27 (t, J=ca 8 Hz, 4H), 7.19-7.01 (m, ca. 16H), 6.95 (s, 2H), 6.89. (br 3-line m, 4H), 4.05 (t, J=7.2 Hz, 4H), 2.27 (s, 6H), 1.86 (app. quin., J=ca. 7 Hz, 4H), 1.53 (m, 4H), 1.48-1.19 (overlapping multiplets, 32H), 0.87 (t, J=ca. 6.5 Hz, 6H); $^{13}$C NMR (75 MHz, CD$_2$Cl$_2$) δ 151.3, 148.0, 147.8, 147.7, 139.6, 132.4, 129.6, 129.4, 128.3, 127.6, 127.0, 125.7, 124.7, 124.4, 123.7, 123.2, 122.2, 121.9, 110.5, 69.8, 32.3, 30.0 (several overlapping peaks), 29.9, 29.8, 29.7, 26.7, 23.1, 21.5, 14.3; High resolution LSIMS calcd. for $C_{72}H_{88}N_2O_2$ M+ 1012.6845. found 1012.6874. Anal. calcd for $C_{72}H_{88}N_2O_2$: C, 85.33; H, 8.75; N, 2.76. Found: C, 85.51; H, 8.69; N, 2.71.

EXAMPLE 57

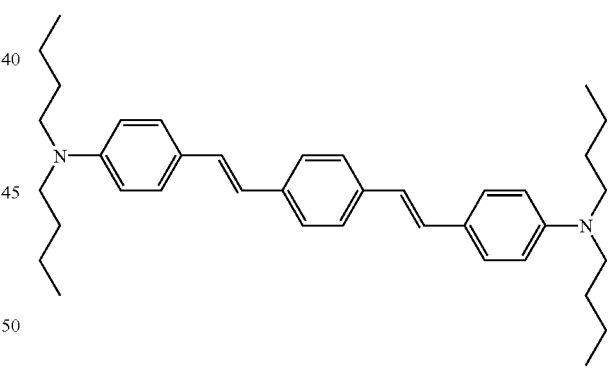

1,4-Bis(4-di-n-butylamino)styryl Benzene: prepared from the reaction of terephthalaldehyde (1.34 g, 0.01 mol) and 4-dibutylaminobenzyl phosphonium iodide (14.06 g, 0.023 mol) and lithium/ethanol (0.32 g, 0.053 mol/100 mL). Recrystallized from ethanol, Yield 40.7%; m.p.=130-132° C.; IR (KBr) v cm$^{-1}$: 2955, 2870, 1603, 1520, 1367, 1187, 962, 823; UV-Vis (acetone) λmax, nm: 402; $^1$H NMR (CDCl$_3$) δ 0.932 (t, J=7.2 Hz, 12H), 1.35 (m, 8H), 1.56 (m, 8H), 3.28 (t, J=7.5 Hz, 8H), 6.61, 7.36 (m 8H), 6.85 (d, J=16.2 Hz, 2H), 7.01 (d, J=16.21 Hz, 2H), 7.42 (s, 4H); MS (FAB, m-NBA matrix): m/z 536.5 (M+).

EXAMPLE 58

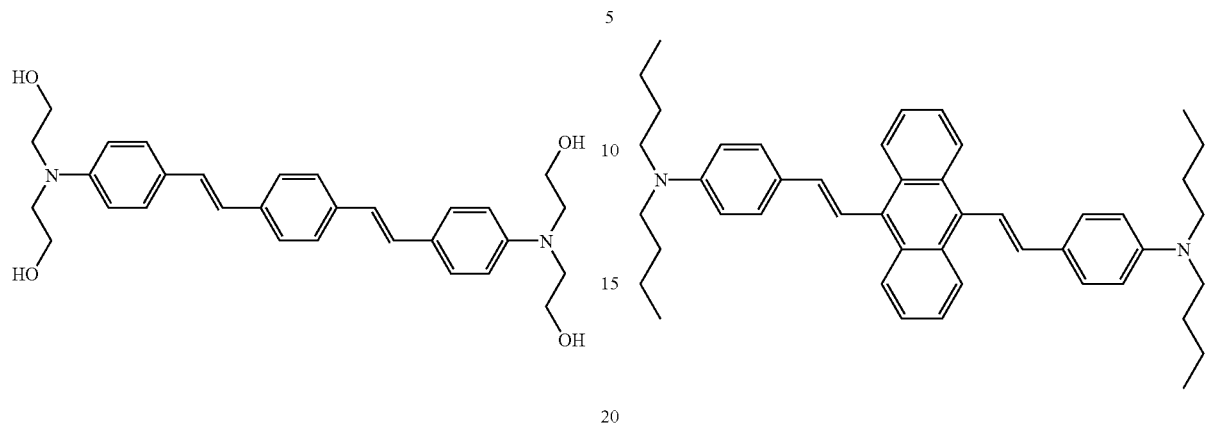

1,4-Bis(4-bis-2-ethanolamino)styryl Benzene: prepared from the reaction of terephthalaldehyde (1.34 g, 0.01 mol) and 4-di-(2-hydroxyethyl)aminobenzyl phosphonium iodide (12.58 g, 0.0216 mol) and lithium/ethanol (0.408g, 0.0677 mol/200 mL). Recrystallized twice from N,N-dimethylformamide, Yield 19.5%); Anal. Calcd. for $C_{30}H_{36}N_2O_4$: C, 73.74; H, 7.43; N, 5.73. found: C, 72.71; H, 7.51; N, 7.49. IR (KBr) ν cm$^{-1}$: 3209, 1601, 1518, 1354, 1185, 1068, 962, 823; UV-Vis (DMSO) $\lambda_{max}$, nm: 404; $^1$H NMR (d$_6$-DMSO) δ: 3.49 (bd, J=5.2 Hz, 8H), 3.60 (bd, J=5.3 Hz, 8H), 4.84 (bt, J=4.8 Hz, 4H), 6.75, 7.44 (Ar, J=8.29 Hz,8H), 6.97 (d, J=16.2 Hz, 2H), 7.16 (d, J=16.2 Hz, 2H,), 7.53 (s, 4H, Ar); S (EI): m/z 488.2 (M+).

EXAMPLE 59

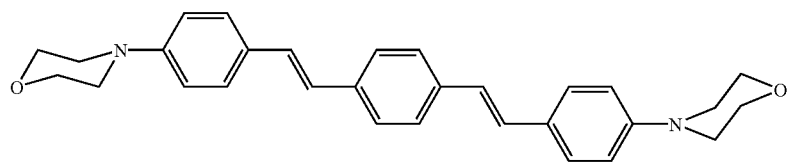

1,4-Bis(4-morpholino)styryl Benzene: prepared from the reaction of 4-morpholinobenzaldehyde (3.94 g, 0.02 mol) and 1,4-bis(methyltriphenylphosphonium chloride (8.42 g, 0.012 mol) and lithium/ethanol (0.296 g, 0.043 mol/150 mL). Recrystallized from ethanol to yield a mixture of isomeric products, Yield 8%; Recrystallized from acetone to yield one pure isomer, Yield 11.8%; m.p.=155° C.; IR (KBr) ν cm$^{-1}$: 1604, 1519, 1355, 1179, 962, 822; UV-Vis (acetone) $\lambda_{max}$, nm: 400; $^1$H NMR (CDCl$_3$, δ): 3.66 (t, J=6.9 Hz, 8H), 3.76 (t, J=6.9 Hz, 8H), 6.68, 7.42 (d, J=8.5 Hz, 4H), 7.03 (d, J=16.30 Hz, 2H), 6.96, (d, J=16.30 Hz, 2H), 7.42 (s, 4H); MS (FAB, m-NBA matrix): m/z 560.92 (M+); MS (EI): m/z 561.9, 512.9, 462.0, 436.0, 399.0, 336.0.

EXAMPLE 60

1,4-Bis(4-di-n-butylamino)styryl Anthracene: prepared from the reaction of 9,10-anthracenedicarboxaldehyde (1.17 g, 0.005 mol) and 4-dibutylaminobenzyl phosphonium iodide (7.563 g, 0.0125 mol) and lithium/ethanol (0.178 g, 0.0295 mol/70 mL). Recrystallized from N,N-dimethylformamide/water, Yield 62.4%; Anal. Calcd. for $C_{46}H_{56}N_2$: C, 86.73; H, 8.86; N, 4.39. found: C, 86.18; H, 8.59; N, 5.35. IR (KBr) ν cm$^{-1}$: 2948, 1607, 1518, 1365, 1186, 760; UV-Vis (acetone) $\lambda_{max}$, nm: 440, 320; $^1$H NMR (C$_6$D$_6$) δ: 0.870 (t, J=7.2 Hz, 12H), 1.18 (m, 8H), 1.48 (m, 8H), 3.08 (t, J=7.4 Hz, 8H), 6.71, 7.51 (Ar, J=8.5 Hz, 8H), 6.98 (d, J=16.4 Hz, 2H), 7.82 (d, J=16.4 Hz, 2H), 7.34, 8.66 (m, 8H, Ar); MS (FAB, m-NBA matrix): m/z 636.4 (M+).

EXAMPLE 61

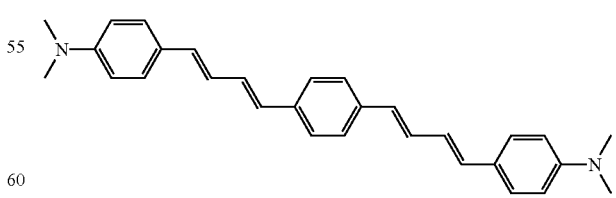

1,4-Bis(4-dimethylamino)cinnamyl benzene: prepared from the reaction of 4-dimethylaminocinnamaldehyde (3.50 g, 0.02 mol) and 1,4-bis(methyltriphenylphosphonium chloride (8.55 g, 0.0122 mol) and lithium/ethanol (0.295 g, 0.042 mol/100 mL). Unreacted aldehyde was found to be present even after 40 hrs. of stirring at rt and so refluxed for 3 hrs, worked up as described earlier and recrystallized from toluene, Yield 29.8%; m.p.=>300° C.; UV-Vis (pyridine $\lambda_{max}$, nm: 420; MS (FAB, m-NBA matrix): m/z 420.1 (M+).

EXAMPLE 62

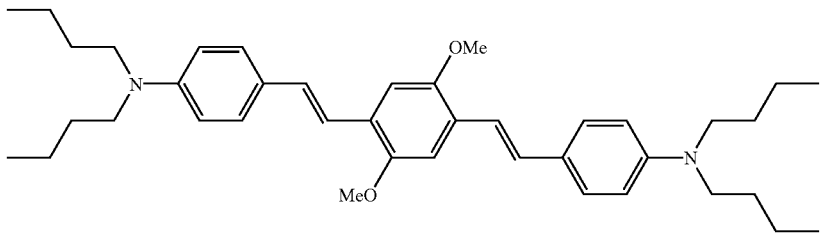

The general procedures for the double Wittig reaction and the cis to trans double bond isomerization were employed. (Overall yield: 22.4%) $^1$H NMR (d$_6$-acetone) δ 7.37 (d, J=8.73 Hz, 2H), 7.24 (d, J=16.4 Hz, 2H), 7.24 (s, 2H), 7.12 (d, J=16.5 Hz, 2H), 6.68 (d, J=8.79 Hz, 2H), 3.89 (s, 6H), 3.35 (t, J=7.56 Hz, 8H), 1.58 (p, J=7.40 Hz, 8H), 1.36 (sx, J=7.40 Hz, 8H), 0.95 (t, J=7.30 Hz, 12H); $^{13}$C NMR (125 MHz, acetone-d$_6$) δ 152.3, 148.9, 129.6, 128.6, 127.4, 126.3, 118.8, 112.8, 109.4, 56.7, 51.4, 30.2, 21.0, 14.4; UV (toluene) $\lambda_{max}$ ($\epsilon_{428}$ 67000) nm; High Resolution LSIMS calcd. for $C_{40}H_{56}N_2O_2$ M$^+$ 596.434. found 596.434.

EXAMPLE 63

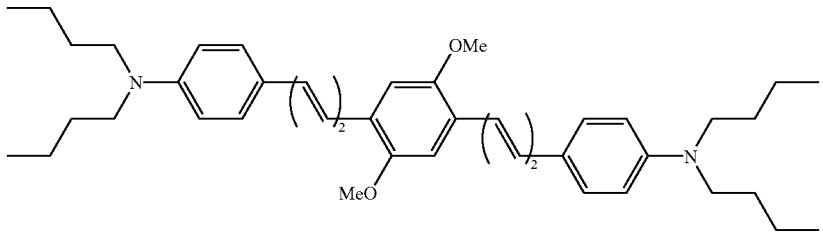

The general procedures for the double Wittig reaction using BuLi and the cis to trans double bond isomerization were employed. (Overall yield: 15.3%) $^1$H NMR (d$_6$-acetone) δ 7.31 (d, J=8.60 Hz, 4H), 7.18 (s, 2H), 6.60-6.55 (m, 2H), 6.64 (d, J=8.70 Hz, 4H), 7.13-6.79 (m, 6H), 3.89 (s, 6H), 3.34 (t, J=7.50 Hz, 8H), 1.57 (p, J=7.40 Hz, 8H), 1.36 (sx, 8H, J=7.40 Hz, 8H), 0.94 (t, J=7.29 Hz, 12H); $^{13}$C NMR (75 Mz, d$_6$-acetone) δ 152.0, 148.7, 133.9, 131.3, 128.5, 127.2, 126.0, 125.6, 125.0, 112.6, 109.1, 56.4, 51.2, 30.2, 20.8, 14.2; UV (toluene) $\lambda_{max}$ ($\epsilon_{456}$ 93000) mn; High Resolution LSIMS calcd. for $C_{44}H_{60}N_2O_2$ M$^+$ 648.465. found 648.465. Anal. calcd for $C_{44}H_{60}N_2O_2$: C, 81.42; H, 9.32; N, 4.32. Found: C, 81.26; H, 9.31; N, 4.26.

EXAMPLE 64

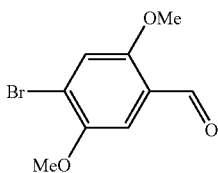

A THF (150 mL) solution of 1,4-dibromo-2,5-dimethoxybenzene (4.20 g, 14.2 mmol) was chilled to −78° C. and was then treated with n-BuLi (5.60 mL, 14.2 mmol). The mixture was allowed to react at −78° C. with stirring for 1 h, and then N,N-dimethylformamide (4.36 mL, 56.0 mmol) was added in one portion. The cooling bath was removed, and the reaction mixture was allowed to warn to ambient temperature over a period of 2 h . The mixture was diluted with water (200 mL) and extracted with diethyl ether (3×250 mL). The organic layers were combined and dried over K$_2$CO$_3$. The solvents were removed in vacuo, and the crude product was recrystallized twice from Hex/EtOAc (2:1) to afford pure product (2.26 g, 65%) as a light yellow microcrystalline solid. $^1$H NMR (d$_6$-acetone) δ 10.34 (s, 1H), 7.46 (s, 1H), 7.29 (s, 1H), 3.96 (s, 3H), 3.89 (s, 3H); High Resolution LSIMS calcd. for $C_9H_9O_3Br$ M$^+$ 243.974. found 243.974.

EXAMPLE 65

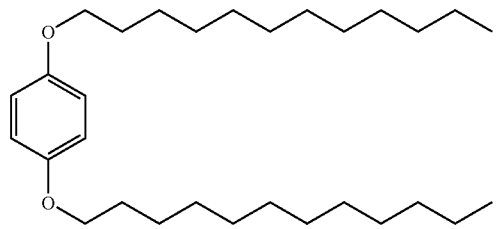

A suspension of 1,4-hydroquinone (15.3 g, 140 mmol), 1-bromododecane (100 mL, 416 mmol), K$_2$CO$_3$ (57.6 g, 416 mmol), and acetonitrile (300 mL) was heated to reflux for two days. The mixture was then allowed to cool before pouring into water (1 L). The precipitates were first collected by filtration and were then redissolved in hexanes. The solution was poured into stirred methanol (2 L) to precipitate the product. The crude product was collected by vacuum filtration, redissolved in hot hexanes, and poured into methanol once again to reprecipitate the product. After collecting the purified product by vacuum filtration, the remaining solvents were removed in vacuo to yield 34.5 g (56.0% yield) of white solid. $^1$H NMR (CD$_2$Cl$_2$) δ 6.79 (s, 4H), 3.87 (t, J=6.5 Hz, 4H), 1.73 (p, J=7.0 Hz, 4H), 1.43-0.85 (m, 42H); $^{13}$C NMR (75.5 MHz, $CD_2Cl_2$) δ 153.5, 115.5, 68.9, 32.3, 30.0 (overlapping m), 29.8 (overlapping m), 26.4, 23.1, 14.2; Low Resolution LSIMS calcd. for $C_{30}H_{54}O_2$ M+H+ 446. found 447.

EXAMPLE 66

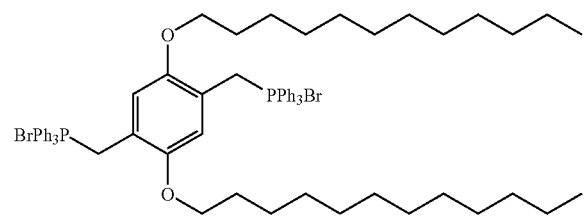

To a suspension of 1,4-bis(dodecyloxy)benzene (7.33 g, 16.4 mmol) and paraformaldehyde (1.00 g, 33.3 mmol) in acetic acid (120 mL) was added hydrobromic acid (12 mL) in one portion. The mixture was then heated to 65-70° C. with stirring for 3 h. During this time, the initial suspension changed to a clear solution first and then became a thick suspension. After cooling to ambient temperature, this suspension was poured into water (350 mL). The precipitate was filtered and was then dissolved in hot chloroform. Precipitation of the product was achieved by addition of the chloroform mixture to MeOH. Filtration of the precipitate yielded a purified product that consisted of a 3:1 mixture of 2,5-bis(bromomethyl)-1,4-bis(dodecyloxy)benzene/1,4-bis(dodecyloxy)benzene. This mixture was combined with >2 equivalents of triphenylphosphine and a minimal amount of toluene required to dissolve the triphenylphosphine. The reaction mixture was heated to reflux for 3 h and then cooled to ambient temperature. A cloudy suspension formed upon cooling. Addition of hexanes aided in the precipitation of the desired product. Purification by reprecipitation of the product (dichloromethane/hexanes) yielded pure compound. $^1$H NMR ($CD_2Cl_2$) δ 7.78-7.63 (m, 30 H), 6.69 (s, 2H), 5.26 (d, J=13.0 Hz, 4H), 3.03 (t, J=5.6 Hz, 4H), 1.28-0.86 (m, 42H).

EXAMPLE 67

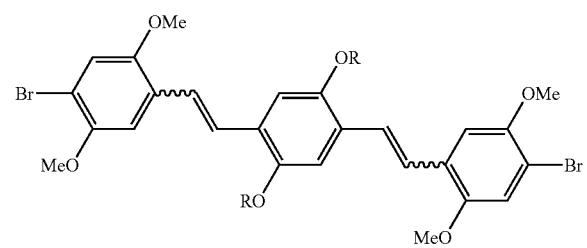

R = $(CH_2)_{11}CH_3$

The general procedure for the double Wittig reaction using NaOEt was followed. After 4 h of reflux, the reaction mixture was cooled and water was added. Upon addition of water, an oily product formed that became a solid mass after cooling overnight. The yellow solid was obtained in 94.9% yield as a mixture of isomers. (In the above structure, the "sawtooth" bond indicates that the structure includes both cis and trans isomers.)

EXAMPLE 68

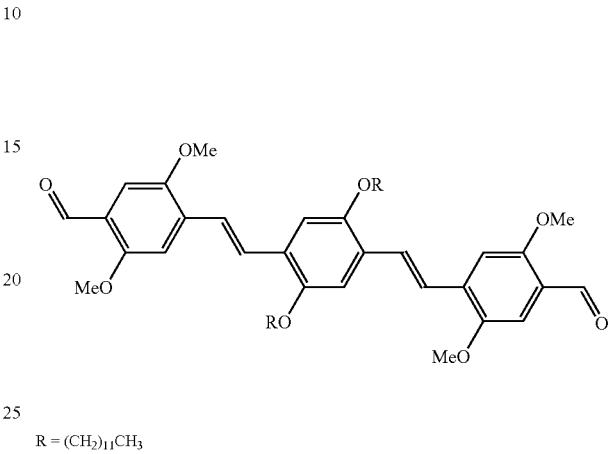

R = $(CH_2)_{11}CH_3$

A THF (35 mL) solution of the bis 1,4-[4-bromo,2,5-dimethoxystyryl]-2,5-di-n-dodecyloxybenzene, (1.40 g, 1.51 mmol) (synthesized as described above) was chilled to −78° C. and was then treated with n-BuLi (2.64 mL, 4.22 mmol). The mixture was allowed to react at −78° C. with stirring for 1 h, and then N,N-dimethylformamide (0.93 mL, 12.1 mmol) was added in one portion. Upon addition of N,N-dimethylformamide, a fluorescent viscous solution formed. The cooling bath was removed, and the reaction mixture was allowed to warm to ambient temperature over a period of 2 h. The mixture was diluted with water (200 mL) and stirred for 1 h. Upon the addition of water, a bright orange precipitate formed. The precipitate (pure trans isomer of the bisaldehyde) was collected by filtration and was rinsed with diethylether (200 mL). The organic layer (that contained the cis/trans isomeric mixture of the bisaldehyde) was collected and extracted with water (2×), extracted with brine (1×), and dried over $Na_2SO_4$. The solvents were removed in vacuo, and the crude product was purified by column chromatography on silica using hexanes/EtOAc (9:1) as the eluent. 0.193 g of the pure trans isomer was obtained, and 0.561 g of the purified isomeric mixture was obtained. 60.4% yield total. $^1$H NMR ($CD_2Cl_2$) δ 10.40 (s, 2H), 7.63 (d overlapping, J=14.54 Hz, 2H), 7.57 (d overlapping, J=14.42 Hz, 2H), 7.33 (s, 2H), 7.27 (s, 2H), 7.19 (s, 2H), 4.09 (t, J=6.04 Hz, 4H), 3.97 (s, 6H), 3.91 (s, 6H), 1.88 (p, J=6.80 Hz, 4H), 1.54-1.24 (m, 36H), 0.87 (t, J=6.02 Hz, 6H); $^{13}$C NMR (75 MHz, $CD_2Cl_2$) δ 188.8, 157.0, 151.8, 151.6, 134.9, 127.5, 124.3, 123.2, 111.1, 109.8, 109.3, 69.8, 56.4, 56.3, 32.3, 30.0-29.6 (overlapping m), 26.7, 23.0, 14.2; UV (toluene) $\lambda_{max}$ ($\epsilon_{445}$ 52000) nm. Anal. calcd for $C_{52}H_{74}O_8$: C, 75.49; H, 9.02. Found: C, 75.38; H, 9.12.

EXAMPLE 69

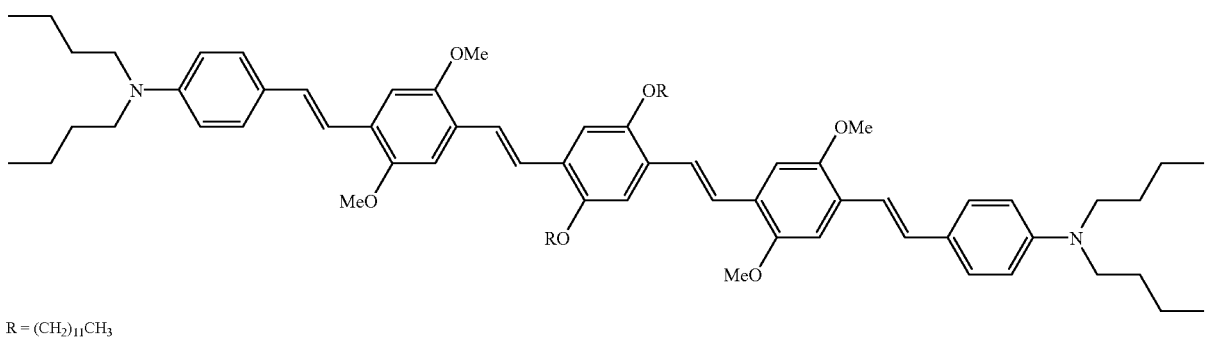

R = (CH₂)₁₁CH₃

The general procedures for the double Wittig reaction using NaOEt and the cis to trans double bond isomerization were employed. Recrystallization using $d_6$-acetone, EtOAc, and/or toluene with hexanes afforded orange crystals (m.p. 146-149° C.). $^1$H NMR ($d_6$-benzene) δ 8.14-7.86 (m, 8H), 7.61 (d, J=8.52 Hz, 4H), 7.50-7.38 (m, 8H), 7.26 (s, 2H), 6.65, (d, J=8.60 Hz, 4H), 3.77 (t, J=6.07 Hz, 4H), 3.58 (s, 6H), 3.50 (s, 6H), 3.04 (t, J=7.40 Hz, 8H), 1.74-1.69 (m, 4H), 1.47-0.81 (m, 70H); $^{13}$C NMR (75 MHz, $d_6$-benzene) δ 152.2, 151.8, 151.9, 148.1, 129.7 (overlapping m), 126.7, 123.8, 119.1, 112.4, 110.8, 109.2, 108.7, 69.2, 55.7 (overlapping m), 50.9, 32.3, 29.6 (overlapping m), 26.7, 23.1, 20.5. 14.4, 14.2; UV (toluene) $\lambda_{max}$ ($\epsilon_{468}$ 110000) nm; Low Resolution LSIMS calcd. for $C_{82}H_{120}N_2O_6$ M$^+$ 1228.9. found 1228.9.

EXAMPLE 70

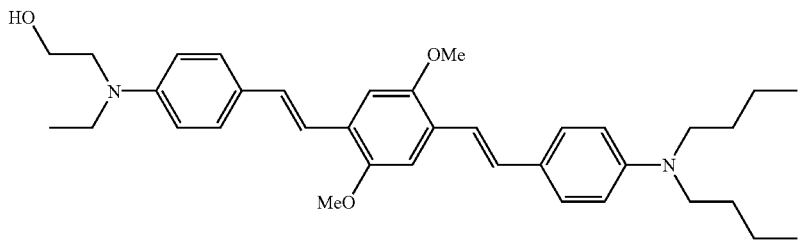

$^1$H NMR ($d_6$-acetone) δ 7.35 (d, J=8.6 Hz, 4H), 7.23 (d, J=16.3 Hz, 2H), 7.22 (s, 2H), 7.11 (d, J=16.5 Hz, 2H), 6.70 (d, J=8.8 Hz, 2H), 6.66 (d, J=8.9 Hz, 2H), 3.88 (s, 6H), 3.79 (t, J=5.0 Hz, 1H), 3.73-3.67 (m, 21), 3.49-3.43 (m, 4H), 3.33 (t, J=5.0 Hz, 4H), 1.57 (p, J=7.0 Hz, 4H), 1.35 (sx, J=7.4 Hz, 4H), 1.13 (t, J=6.9 Hz, 3H), 0.93 (t, J=7.3 Hz, 6H); $^{13}$C NMR (75.5 MHz, $d_6$-acetone) δ 152.0, 148.6, 148.5, 129.4, 129.3, 128.5, 127.2, 127.1, 126.3, 126.1, 118.6, 118.5, 112.6, 112.5, 109.1, 109.0, 60.1, 56.5, 53.3, 51.2, 45.9, 30.2, 20.8, 14.3, 12.4; IR (neat) 3423.1 (br), 2961.5, 2929.7, 2866.6, 1701.7, 1602.3, 1521.2, 1463.6, 1399.7, 1359.5, 1258.9, 1205.2, 1181.7, 1044.2 cm$^{-1}$; UV (acetone) $\lambda_{max}$ (428) nm.

EXAMPLE 71

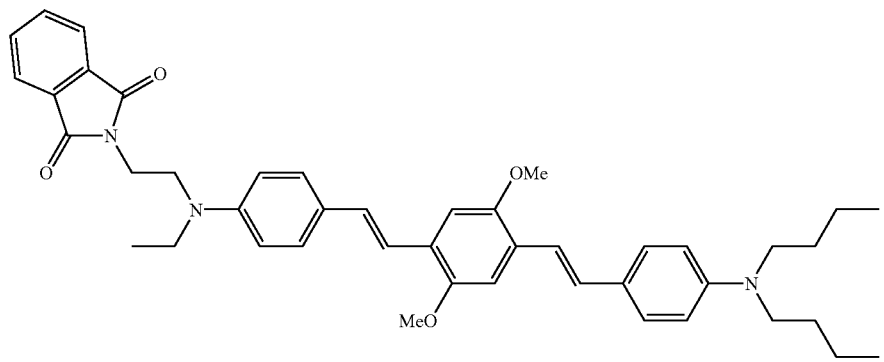

$^1$H NMR (300 MHz, d$_6$-acetone) δ 7.84-7.81 (m, 4H), 7.38-7.08 (m, 10H), 6.82 (d, J=8.70 Hz, 2H), 6.67 (d, J=8.71 Hz, 2H), 3.90-3.84 (m, 8H), 3.63 (t, J=7.08 Hz, 2H), 3.47 (q, J=7.01 Hz, 2H), 3.34 (t, J=7.51 Hz, 4H), 1.57 (p, J=7.59 Hz, 4H), 1.37 (sx, J=7.46 Hz, 4H), 1.17 (t, J=6.94 Hz, 3H), 0.95 (t, J=7.29 Hz, 6H); $^{13}$C NMR (75.5 MHz, d$_6$-acetone) δ 168.74, 152.03, 151.96, 148.62, 148.09, 134.88 (m), 133.06, 129.48, 129.19, 128.48, 127.27, 126.99, 127.01, 126.03, 123.69 (m), 119.16, 118.51, 112.81, 112.52, 109.15, 109.05, 56.69, 56.53, 56.47, 56.30, 51.20 (m), 45.49 (m), 30.21 (m), 20.84, 14.26, 12.68, 12.66.

Figure 10:
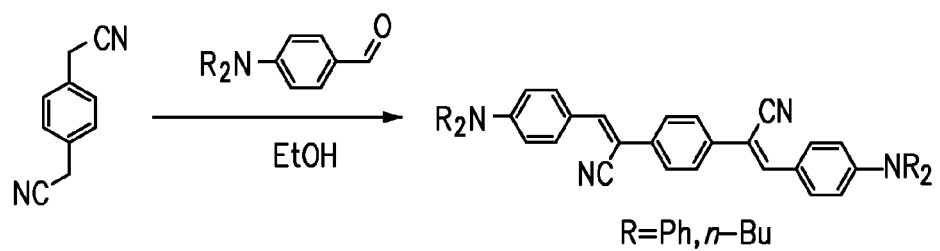
FIG. 10 illustrates the reaction of 1,4-bis(cyanomethyl) benzene with 4-diphenylaminobenzaldehyde and 4-di-n-butylaminobenzaldehyde to form 1,4-bis(β-cyano-4'-diphenylaminostyryl)benzene and 1,4-bis(β-cyano-4'-di-n-butylaminostyryl)benzene according to the invention.

FIG. 10 illustrates the reaction of 1,4-bis(cyanomethyl)benzene with 4-diphenylaminostilbene and 4-di-n-butylaminobenzaldehyde to yield 1,4-bis(β-cyano-4'diphenylaminostyryl)benzene and 1,4-bis(β-cyano-4'di-n-butylaminostyryl)benzene with donor side units and acceptors on the vinylene units (see examples 72 and 73).

EXAMPLE 72

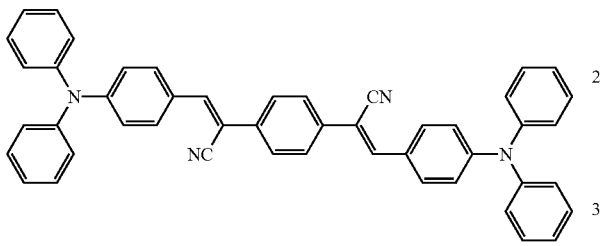

7,9-Dicyano-8,10-bis(diphenylamino)1,4-bis-styrylbenzene. Potassium t-butoxide (30 mg) was added to a solution of 1,4-bis(cyanomethyl)benzene (0.625 g, 4 mmol) and 4-diphenylaminobenzaldehyde (2.73 g, 10 mmol) in ethanol (300 mL), and the reaction mixture was refluxed for 2 h. Ethanol was removed on a rotary evaporator, and the residue was separated by column chromatography on silica gel. The fraction eluted with a 1:1 mixture of dichloromethane and petroleum ether was evaporated, the residue was crystallized and recrystallized from dichloromethane upon slow diffusion of petroleum ether. Yield (2.50 g, 71%). m.p. 247.5° C. $^1$H NMR (CD$_2$Cl$_2$) δ 8.03 (s, 2 H), 7.46 (m, 4 H), 7.30 (m, 6 H). $^{13}$C NMR(CD$_2$Cl$_2$) δ 150.60, 146.93, 142.18, 142.13, 135.52, 131.18, 129.99, 126.58, 126.43, 126.28, 124.95, 120.85, 118.85, 106.94. UV-vis λ(max)=443; ε=56000. Emission λ(max)=548 nm EIMS m/z 666 [M$^+$] (100), 586 (6), 333 (18), 258 (20), 218 (5), 131 (5), 69 (15).

EXAMPLE 73

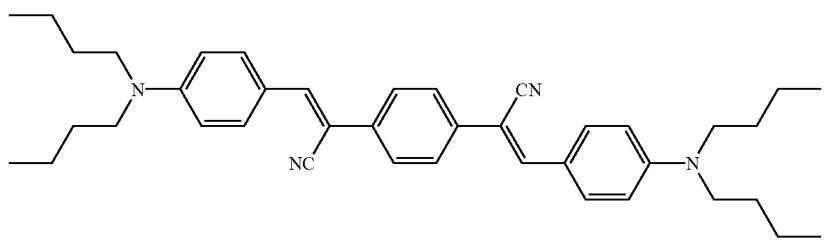

7,9-Dicyano-8,10-bis(di-n-butylamino)-1,4-bis-styrylbenzene was synthesized according to an analogous procedure. (Yield 26%.) $^1$H NMR (CD$_2$Cl$_2$) δ 7.85 (m, 4 H), 7.65 (s, 4 H), 7.41 (s, 2 H), 6.65 (m, 4 H), 3.34 (m, 8 H), 1.59 (m, 8 H), 1.37 (m, 8 H), 0.98 (t, J=7.5 Hz, 12 H). $^{13}$C NMR (CD$_2$Cl$_2$) δ 149.83 (s), 142.23 (d), 135.01 (s) 131.68 (d), 125.61 (d), 120.62 (s), 119.50 (s), 111.19 (d), 102.67 (s), 50.78 (t) 29.38 (t), 20.30 (t), 13.98 (q). UV-VIS λ$_{max}$=438 nm. Emission λ$_{max}$=527 nm. EIMS m/z 588, 544, 502, 250, 218.

Figure 11:
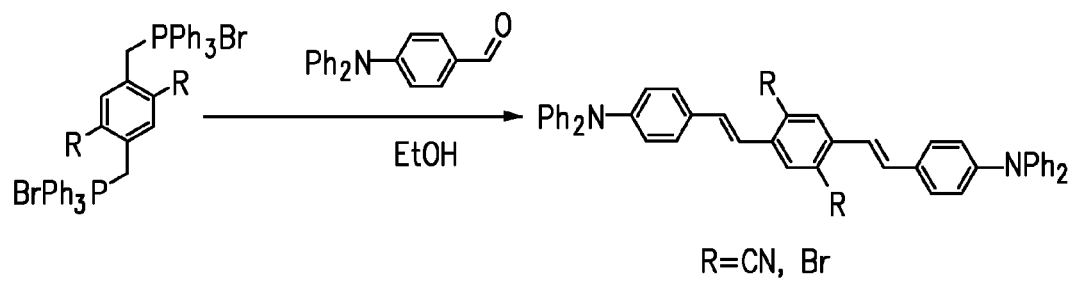
FIG. 11 illustrates the condensation of 1,4-dibromo-2,5-bis[methylene(triphenylphosphonium)]benzene dibromide, 1,4-dicyano-2,5-bis[methylene(triphenylphosphonium)] benzene dibromide and 4-diphenylaminobenzaldehyde to yield 1,4-dibromo- and 1,4-dicyano-2,5-bis(4'-diphenylaminostyryl)benzenes.

FIG. 11 illustrates the condensation of 1,4-dibromo-2,5-bis[methylene(triphenylphosphonium)]benzene dibromide, 1,4-dicyano-2,5-bis[methylene(triphenylphosphonium)]benzene dibromide and 4-diphenyl-aminobenzaldehyde to yield 1,4-dibromo- and 1,4-dicyano-2,5-bis(4'-diphenylaminostyryl)benzenes.

EXAMPLE 74

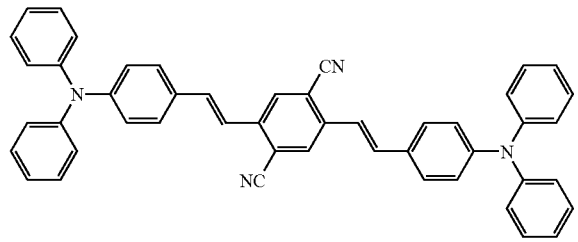

2,5-Dicyano-1,4-bis(4'-diphenylaminostyryl)benzene. Potassium t-butoxide (1.122 g, 10 mmol) was added over 15 min to a solution of 1,4-dicyano-2,5-bis[methylene(triphenylphosphonium)]benzene dibromide (3.354 g, 4 mmol) and 4-diphenylaminobenzaldehyde (2.733 g, 10 mmol) in ethanol (100 mL), and the mixture was refluxed for 1 h. A precipitate formed upon cooling of the solution to room temperature. It was filtered off and recrystallized from a dichloromethane solution upon slow diffusion of petroleum ether. Yield (1.354 g, 51%). m.p. 259.7° C. $^1$H NMR (CD$_2$Cl$_2$) δ 7.99 (s, 2 H), 7.43 (m, 4 H), 7.29 (m, 8 H), 7.23 (AB, J=16 Hz, 2H), 7.22 (AB, J=16 Hz, 2H), 7.14 (m, 8 H), 7.09 (m, 4 H), 7.05 (m, 4 H). $^{13}$C NMR (CD$_2$Cl$_2$) δ 149.04 (s), 147.01 (s), 138.70 (s), 134.26 (d), 129.43 (d), 129.35 (s), 128.88 (s), 128.35 (d), 125.13 (d), 123.77 (d), 122.29 (d), 119.50 (d), 116.79 (s), 114.57 (s). UV-VIS λ$_{max}$=470 nm; ε=62000. Emission λ$_{max}$=583 nm.

EXAMPLE 75

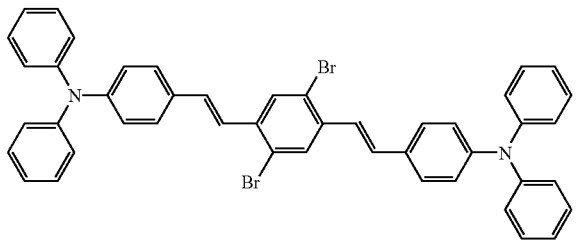

2,5-Bromo-1,4-bis(4'-diphenylaminostyryl)benzene was synthesized with the analogous procedure. A crude product (2.354 g) was isomerized into thermodynamically more stable tans-trans isomer. Toluene (10 mL) and iodine (20 mg) were added to the mixture of isomers, and the mixture was refluxed for 15 h in an illuminated hood. Toluene was removed on a vacuum line, and the residue was crystallized from a dichloromethane solution upon slow diffusion of petroleum ether. Yield was 86%. m.p. 286.5° C. $^1$H NMR (CD$_2$Cl$_2$) δ 7.84 (s, 2 H), 7.41 (m, 4 H), 7.28 (m, 6 H), 7.23 (d, J=16 Hz, 2 H), 7.12 (m, 4 H), 7.05 (m, 6 H), 7.00 (d, J=16 Hz, 2 H). $^{13}$C NMR (CD$_2$Cl$_2$) δ 148.09, 147.33, 137.22, 131.49, 130.49, 129.98, 129.34, 127.85, 124.76, 123.86, 123.33, 123.03, 122.86. UV-VIS $\lambda_{max}$=424 nm; ε=55000.

Figure 12:
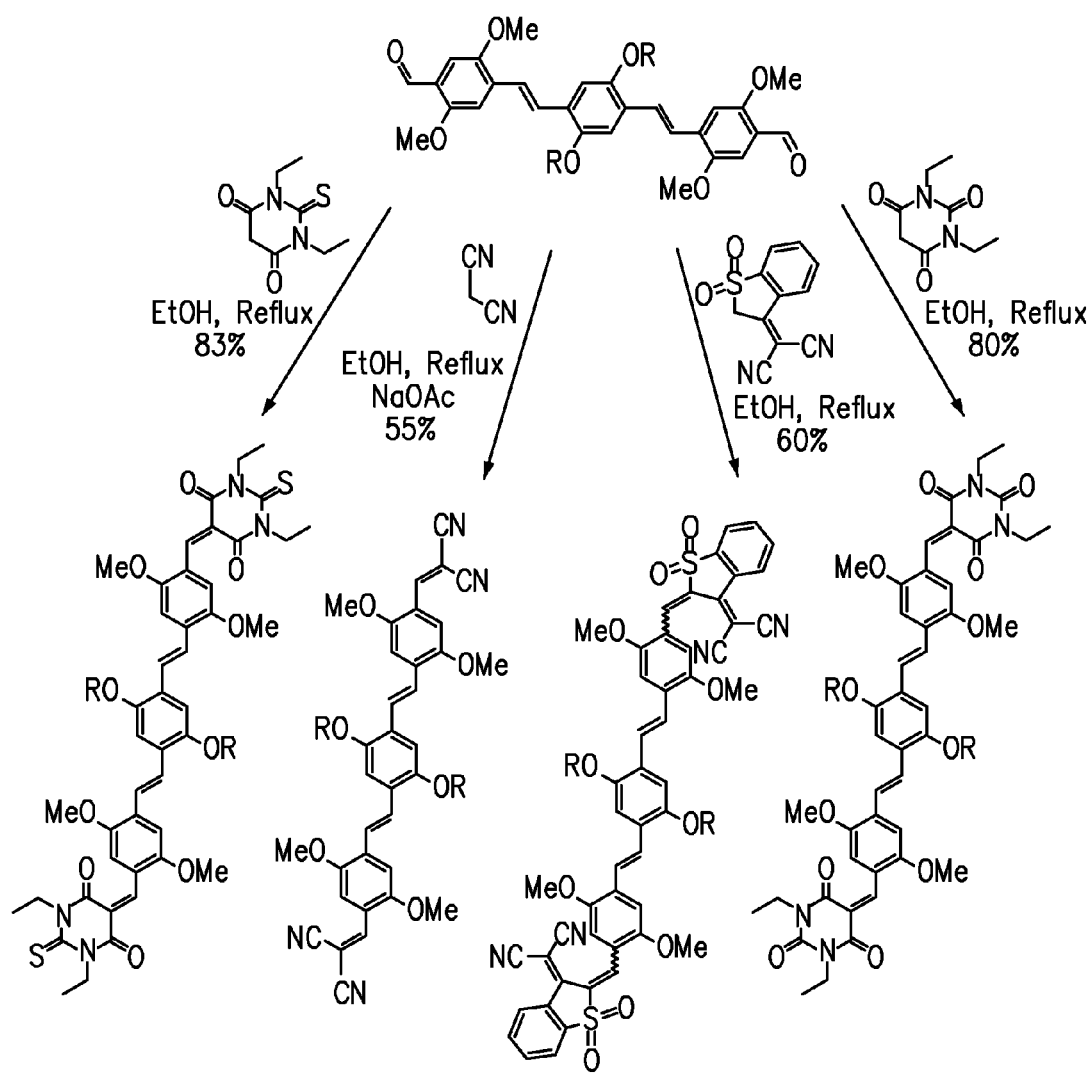
FIG. 12 illustrates a reaction scheme for the synthesis of molecules following the A-D-A motif.

FIG. 12 illustrates a reaction scheme for the synthesis of A-D-A molecules according to the invention as exemplified in Examples 76-79.

EXAMPLE 76

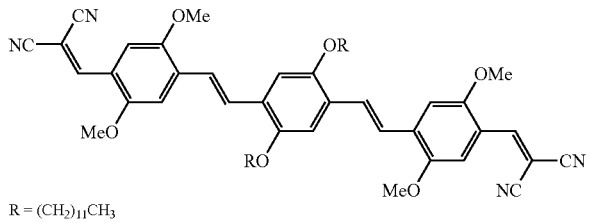

R = (CH$_2$)$_{11}$CH$_3$ 1,4-bis(dodecoxy)-2,5-bis(2,5-dimethoxy-4-formyl-styryl)benzene, (0.022 g, 0.027 mmol), excess malononitrile, and sodium acetate (0.010 g, 0.061 mmol) were combined in absolute ethanol. The reaction mixture was heated to reflux for 1.5 h and then cooled to ambient temperature. During the course of the reaction, the product was formed as a red precipitate that was collected by filtration.

Removal of the trace monodicyanovinyl/monoaldehyde intermediate was achieved by column chromatography on silica using methylene chloride as the eluent followed by recrystallization using methylene chloride/hexanes. The microcrystalline greenish solid was collected in 55% yield after purification. $^1$H NMR (CD$_2$Cl$_2$) δ 8.30 (s, 2H), 7.84 (s, 2H), 7.73-7.55 (m, 4H), 7.22 (s, 2H), 7.18 (s, 2H), 4.09 (t, J=6.24 Hz, 4H), 3.95 (s, 6H), 3.93 (s, 6H), 1.91-1.86 (m, 4H), 1.59-1.16 (m, 36H), 0.87 (t, J=6.62 Hz, 6H); UV (toluene) $\lambda_{max}$ (ε$_{513}$ 73000) nm; High Resolution LSIMS calcd. for C$_{58}$H$_{74}$N$_4$O$_6$ M$^+$ 922.561. found 922.560.

EXAMPLE 77

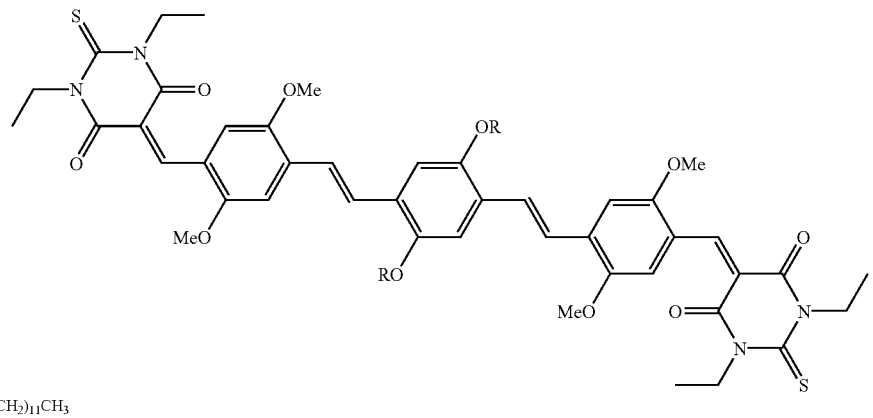

R = (CH$_2$)$_{11}$CH$_3$

A solution of 1,4-bis(dodecoxy)-2,5-bis(2,5-dimethoxy-4-formylstyryl)benzene, (0.30 g, 0.036 mmol) and 1,3-diethyl-2-thiobarbituric acid (0.017 g, 0.080 mmol) in absolute ethanol (25 mL) was heated to reflux for 1 h. After 1 h of reflux, the mixture was cooled to ambient temperature and allowed to stand for 3 h. During the course of the reaction, a purple precipitate that had a metallic luster formed. Upon filtration 0.036 g (83% yield) of the purple product was collected. $^1$H NMR ($d_6$-benzene) δ 9.38 (s, 2H), 8.67 (s, 2H), 8.13-6.88 (m, 8H), 4.48 (q, J=7.31 Hz, 8H), 3.77-3.72 (m, 10H), 3.30 (s, 6H), 1.73-1.20 (m, 52H), 0.918 (t, J=5.24 Hz, 6H); UV (toluene) $\lambda_{max}$ ($\epsilon_{558}$ 91000) nm; Low Resolution LSIMS calcd. for $C_{68}H_{94}N_4O_{10}S_2$ M$^+$ 1190.6. found 1190.7. Anal. calcd for $C_{68}H_{94}N_4O_{10}S_2$: C, 68.53; H, 7.96; N, 4.70. Found: C, 68.63; H, 7.99; N, 4.70.

2-oxobarbituric acid (0.017 g, 0.080 mmol) in absolute ethanol (25 mL) was heated to reflux for 3 h. After 3 h of reflux, the mixture was filtered while hot. During the course of the reaction, a purple precipitate that had a metallic luster formed. Upon filtration 0.034 g (80% yield) of the purple product was collected. 1H NMR (CD$_2$Cl$_2$) δ 8.88 (s, 2H), 8.11 (s, 2H), 7.72-7.56 (m, 4H), 7.20 (br s, 4H), 4.12-3.91 (m, 24H), 1.94-0.80 (m, 58H); UV (toluene) $\lambda_{max}$ ($\epsilon_{526}$ 80000) nm; Low Resolution LSIMS calcd. for $C_{68}H_{94}N_4O_{12}$ M$^+$ 1158.7. found 1158.5.

EXAMPLE 78

EXAMPLE 79

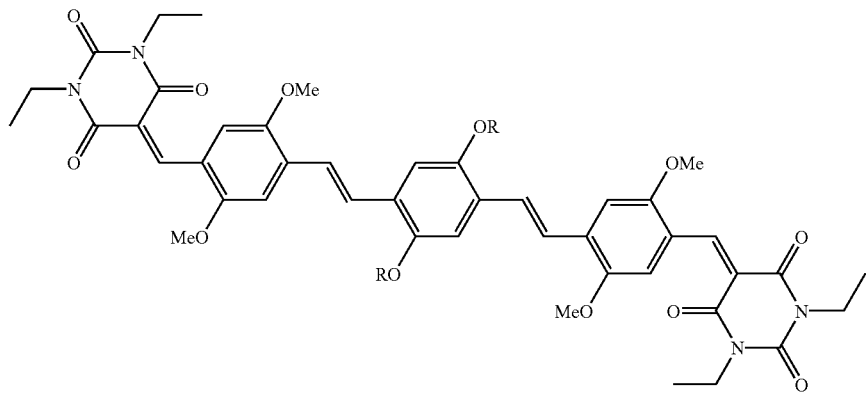

R = (CH$_2$)$_{11}$CH$_3$

A solution of 1,4-bis(dodecoxy)-2,5-bis(2,5-dimethoxy-4-formylstyryl)benzene, (0.30 g, 0.036 mmol) and 1,3-diethyl-

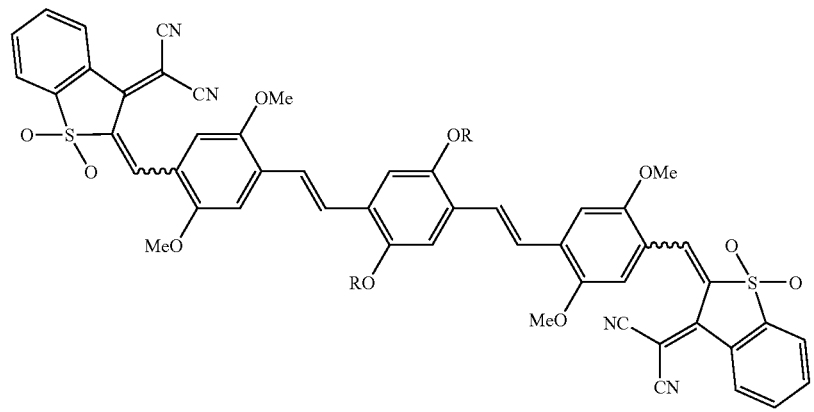

R = (CH$_2$)$_{11}$CH$_3$

A solution of 1,4-bis(dodecoxy)-2,5-bis(2,5-dimethoxy-4-formylstyryl)benzene, (0.31 g, 0.038 mmol) and 3-dicyanomethylene-2,3-dihydrobenzothiophene-1,1'-dioxide (0.035 g of 72.1% purity, 0.083 mmol) in absolute ethanol (25 mL) was heated to reflux for 1 h. After 1 h of reflux, the mixture was cooled to ambient temperature and allowed to stand for 12 h. During the course of the reaction, a blue precipitate that had a metallic luster formed. Upon filtration 0.028 g (60% yield) of the dark blue product was collected. $^1$H NMR (CD$_2$Cl$_2$) δ 8.99 (s, 2H), 8.83-8.80 (m, 2H), 8.04-7.27 (m, 16H), 4.17 (t, J=6.17 Hz ,4H), 4.05 (s, 6H), 4.04 (s, 6H), 1.98-1.31 (m, 40 H), 0.916 (t, J=6.14 Hz, 6H); UV (toluene) $\lambda_{max}$ ($\epsilon_{619}$ 60000) nm; Low Resolution LSIMS calcd. for C$_{74}$H$_{82}$N$_4$O$_{10}$S$_2$ M$^+$ 1250.5. found 1250.6. Anal. calcd for C$_{74}$H$_{82}$N$_4$O$_{10}$S$_2$; C, 71.01; H, 6.61; N, 4.48. Found: C, 70.73; H, 6.65; N, 4.38. As indicated previously, the "sawtooth" bond indicates that the molecule above represents both cis and trans isomers.

Single-photon and Multi-photon Absorptivities of Compounds According to the Invention Table 1 below presents one- and two-photon absorption data on a series of bis(dialkylamino)diphenylpolyenes with the following general structure:

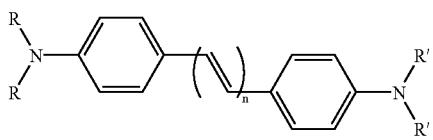

where R and R$^1$ are defined in the table. The parameters listed are: the wavelength of the lowest energy one-photon absorption maximum, $\lambda^{(1)}_{max}$, the wavelength of the lowest energy two-photon absorption maximum $\lambda^{(2)}_{max}$, the two-photon absorptivity δ, and the one-photon fluorescence quantum yield, $\Phi_{fl}$. The two-photon absorptivities listed in the table were measured by use of a comparative two-photon excited fluorescence method employing picosecond laser pulses (of 4 ps duration) and with Rhodaimne B, Fluorescein and bis(methylstyryl)benzene as standards [C. Xu and W. W. Webb, J. Opt. Soc. Am. B, 13,481 (1996)].

TABLE 1

One-photon and two-photon optical data for bis-donor diphenylpolyenes as measured in toluene solution.

| Molecule | | | $\lambda^{(1)}$max | $\lambda^{(2)}$max | δ (10$^{-50}$ cm$^4$ | |
|---|---|---|---|---|---|---|
| n | R | R' | nm | nm | s/photon) | $\Phi_{fl}$ |
| 1 | n-Bu | n-Bu | 374 | 605 | 240 | 0.90 |
| 2 | Me | n-Bu | 390 | 645 | 242 | 0.80 |
| 3 | Me | n-Bu | 412 | 693 | 272 | 0.89 |
| 4 | Me | n-Bu | 430 | 696 | 222 | 0.75 |
| 5 | Me | n-Bu | 449 | 730 | 172 | 0.02 |

For comparison, the two-photon absorptivity of trans-stilbene, which lacks bis-donor substitution, is 12×10$^{-50}$ cm$^4$ s/photon at 514 nm as determined by coherent anti-Stokes Raman spectroscopy [R. J. M. Anderson, G. R. Holtom, W. M. McClain, J. Chem. Phys., 70, 4310-4315 (1979)]. The data on the compounds in Table 1 demonstrate an order of magnitude enhancement of the magnitude of the two-photon absorptivity compared to unsubstituted stilbene and an ability to control the wavelength of the peak two-photon absorptivity by increasing the number of double bonds in the polyene fragment of the molecule.

Table 2 below lists the values of $\lambda^{(2)}_{max}$, δ, and $\Phi_{fl}$ for a series of bis-styryl benzene derivatives prepared in accord with the present invention. The two-photon absorptivity values were determined using a comparative nanosecond pulse two-photon excited fluorescence method with Fluorescein or Rhodamine B as standards for calibration.

TABLE 2

Two-photon optical data and fluorescence quantum yield data on bis-styrylbenzene derivatives as obtained in toluene solution.

| Molecule | $\lambda^{(2)}_{max}$ (nm) | δ (10$^{-50}$ cm$^4$ s/photon) | $\Phi_{fl}$ |
|---|---|---|---|
| 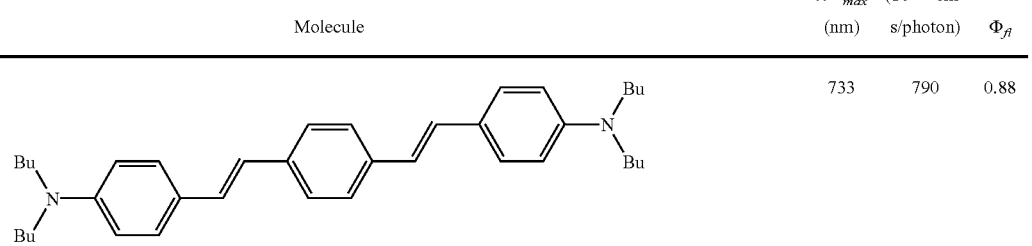 | 733 | 790 | 0.88 |
| 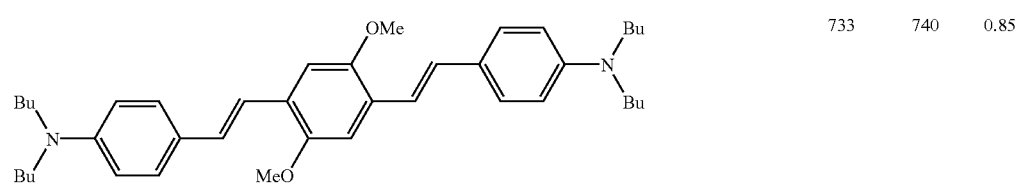 | 733 | 740 | 0.85 |

TABLE 2-continued

Two-photon optical data and fluorescence quantum yield data on bis-styrylbenzene derivatives as obtained in toluene solution.

| Molecule | $\lambda^{(2)}_{max}$ (nm) | $\delta$ ($10^{-50}$ cm$^4$ s/photon) | $\Phi_{fl}$ |
|---|---|---|---|
| [structure] | 770 | 800 | 0.15 |
| [structure] R = C$_{12}$H$_{25}$ | 745 | 720 | 0.91 |
| [structure] | 745 | 630 | 0.88 |
| [structure] R = C$_{12}$H$_{25}$ | 840 | 1080 | 0.68 |
| [structure] | 800 | 730 | 0.003 |

TABLE 2-continued

Two-photon optical data and fluorescence quantum yield data on bis-styrylbenzene derivatives as obtained in toluene solution.

| Molecule | $\lambda^{(2)}_{max}$ (nm) | $\delta$ ($10^{-50}$ cm$^4$ s/photon) | $\Phi_{fl}$ |
|---|---|---|---|
| (bis-triphenylamine bis-styrylbenzene with two CN groups on vinyl) | 830 | 1230 | 0.008 |
| (bis-triphenylamine bis-styrylbenzene with two CN groups on central ring) | 835 | 1560 | 0.85 |
| (structure with dicyanovinyl, OMe, OR (R = C₁₂H₂₅) groups) | 940 | 480 | 0.82 |
| (structure with dicyanovinyl and OR (R = C₁₂H₂₅) groups) | 825 | 810 | 0.79 |
| (bis-triphenylamine bis-styrylbenzene with two Br groups) | 800 | 390 | 0.38 |

For comparison with the data in Table 2, para-bis(ortho-methylstyryl)benzene, which lacks donor or acceptor substitution, exhibits a two-photon absorptivity of $55\times10^{-50}$ cm$^4$ s/photon at 568 nm [C. Xu arid W. W. Webb, J. Opt. Soc. Am. B, 13, 481 (1996) and S. M. Kennedy and F. E. Lytle, Anal. Chem. 58, 2643 (1986)]. In accord with the present invention compounds symmetrically substituted with a pair of terminal donors, [i.e., D-π-D] or symmetrically substituted to form molecules according to the donor-acceptor-donor (D-A-D) or acceptor-donor-acceptor (A-D-A) motifs exhibit substantially enhanced two-photon absorptivities compared to unsubstituted para-bis(ortho-methylstyryl)benzene.

Measurements of two-photon absorptivity by use of nonlinear optical transmission method in solutions of bis-donor-substituted diphenylpolyenes show a strong dependence on laser pulse duration, as indicated by the values in Table 3. These results provide evidence of nonlinear absorption that is higher-order than two-photon absorption. In particular, the results suggest that these molecules undergo two-photon induced excited state absorption, that is, two-photon absorption to an excited state and further absorption from this excited state or from a state formed rapidly on relaxation from the initial excited state. A greater excited state population is created with the longer pulses, leading to the enhanced nonlinear absorption coefficient. Additional measurements including transient photoinduced absorption measurements and picosecond time resolved pump and probe measurements confirm the presence of excited state absorption induced by two-photon absorption, which occurs at the two-photon excitation wavelength. The effective two-photon absorptivities of the series of bis-donor diphenylpolyenes is one to two orders of magnitude larger than that measured with picosecond pulses and, in accord with the present invention, these data demonstrate utility in optical limiting applications involving nanosecond laser pulses. Furthermore, the values of the effective two-photon absorptivity obtained for the bis donor diphenylpolyenes are an order of magnitude larger than that of Rhodamine B.

Table 3. Effective two-photon absorption data on a series of bis-donor diphenylpolyenes as measured with nanosecond (ns) and picosecond (ps) pulses and nonlinear optical transmission methods. The units of the two-photon absorptivity, δ, are $10^{-50}$ cm$^4$-s/photon.

TABLE 3

| Molecule | Wavelength (nm) | δ (5 ns pulses) | δ (4 ps pulses) |
|---|---|---|---|
| [bis(di-n-butylamino)stilbene structure] | 600 | 9,300 | 250 |
| [Me₂N-/-(CH=CH)₂-/-N(n-Bu)₂ structure] | 600 | 6060 | 200 |
| [Me₂N-/-(CH=CH)₄-/-N(n-Bu)₂ structure] | 700 | 6800 | 197 |
| [bis(diphenylamino)stilbene structure] | 700 | 13,000 | 106 |
| RhB Rh610 [Rhodamine B structure] | 700 | 1400 | 12 |

Figure 13:
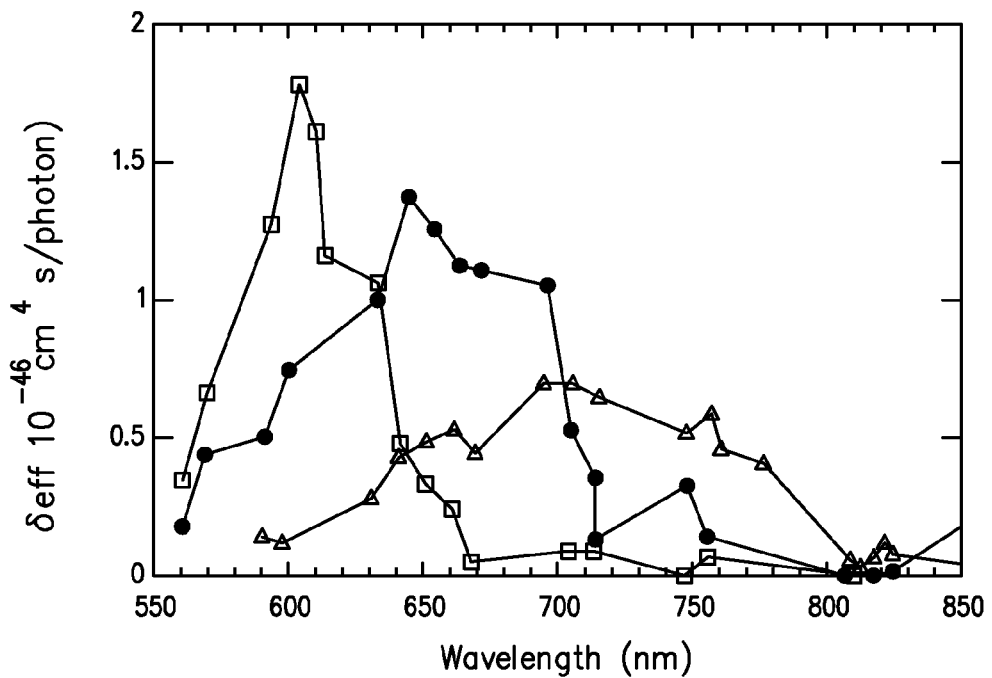
FIG. 13 illustrates nonlinear absorption spectra of 4,4'-bis (di-n-butylamino)stilbene (squares), 4-(di-n-butylamino)-4'-(dimethylamino)diphenyl-butadiene (circles) and 4-(di-n-butylamino)-4'-(dimethylamino)diphenyl hexatriene (triangles) in toluene solution.

The wavelength dependence of the higher-order nonlinear absorption of 4,4'-bis(di-n-butylamino)stilbene, 4(di-n-butylamino)-4'-(dimethylamino) diphenylbutadiene and 4-(di-n-butylamino)-4'-(dimethylamino)diphenyl-hexatriene is shown in FIG. 13. These spectra demonstrate an ability to control the spectral position of the higher-order nonlinear absorption band by increasing the number of double bonds in the π(pi)-conjugated bridge.

FIG. 13 illustrates nonlinear absorption spectra of 4,4'-bis (di-n-butylamino)stilbene (squares), 4-(di-n-butylamino)-4'-(dimethylamino)diphenylbutadiene (circles) and 4-(di-n-butylamino)-4'-(dimethylamino)diphenyl hexatriene (triangles) in toluene solution.

Figure 14:
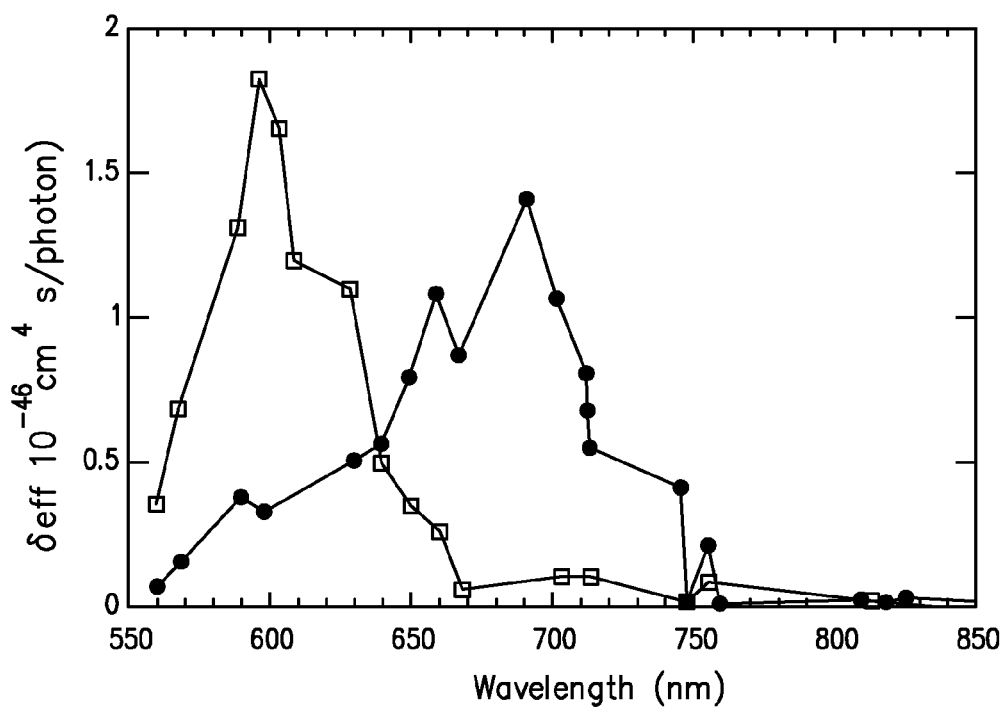
FIG. 14 illustrates nonlinear absorption spectra of 4,4'-bis (di-n-butylamino)stilbene (squares) and 4,4'-bis(diphenylamino)stilbene (circles)

The wavelength dependence of the higher-order nonlinear absorption of 4,4'-bis(di-n-butylamino)stilbene and 4,4'-bis (diphenylamino)stilbene is shown in FIG. 14. These spectra demonstrate the ability to control the spectral position of the higher-order nonlinear absorption band by replacing (dialkylamino) donor groups with (diphenylamino) donor groups. Furthermore, a mixture of these compounds provides broadband nonlinear absorption and high optical transmission from 560 to 730 nm, which is of special utility for optical limiting applications, as described herein.

FIG. 14 illustrates nonlinear absorption spectra of 4,4'-bis (di-n-butylamino)stilbene (squares) and 4,4'-bis(diphenylamino)stilbene (circles).

Table 4. Effective two- and three-photon absorptivities of bis-donor-substituted biphenyl derivatives as determined by use of nonlinear optical transmission measurements with 532-nm, 8-ns laser pulses. $\delta_{\mathit{eff}}$ is the effective two-photon absorptivity obtained by fitting the data at low incident intensity to a pure two-photon absorption model, $\gamma_{\mathit{eff}}$ is the effective three-photon absorptivity obtained by fitting the data to a pure three-photon absorption model, and $\gamma^*_{\mathit{eff}}$ is the effective three-photon absorptivity obtained by fitting the data to a model involving two- and three-photon absorption and fixing the two-photon absorptivity at the value listed as $\delta_{\mathit{eff}}$.

| Molecule | $\delta_{\mathit{eff}}$ ($\times 10^{-47}$ cm$^4$-s/ photon) | $\gamma_{\mathit{eff}}$ ($\times 10^{-73}$ cm$^6$-s$^2$/ photon$^2$) | $\gamma^*_{\mathit{eff}}$ ($\times 10^{-73}$ cm$^6$-s$^2$/ photon$^2$) |
|---|---|---|---|
| [structure 1] | 6.0 | 3.7 | 2.0 |
| [structure 2] | 5.6 | 4.0 | 2.2 |
| [structure 3] | 6.5 | 3.6 | 1.9 |

-continued

| Molecule | $\delta_{\mathit{eff}}$ ($\times 10^{-47}$ cm$^4$-s/ photon) | $\gamma_{\mathit{eff}}$ ($\times 10^{-73}$ cm$^6$-s$^2$/ photon$^2$) | $\gamma^*_{\mathit{eff}}$ ($\times 10^{-73}$ cm$^6$-s$^2$/ photon$^2$) |
|---|---|---|---|
| (3,5-difluorophenyl / 3-methylphenyl diamine on biphenyl) | 4.9 | 2.5 | 1.2 |
| (3-fluorophenyl / 3-methylphenyl diamine on biphenyl) | 7.3 | 2.3 | 1.0 |
| (3,4,5-trifluorophenyl / 3-methylphenyl diamine on biphenyl) | 4.5 | 1.9 | 0.72 |
| (3-CF$_3$-phenyl / 3-methylphenyl diamine on biphenyl) | 4.9 | 2.4 | 1.1 |
| (3-CN-phenyl / 3-methylphenyl diamine on biphenyl) | 3.3 | 2.3 | 1.1 |

-continued

| Molecule | $\delta_{\text{eff}}$ ($\times 10^{-47}$ cm$^4$-s/photon) | $\gamma_{\text{eff}}$ ($\times 10^{-73}$ cm$^6$-s$^2$/photon$^2$) | $\gamma^*_{\text{eff}}$ ($\times 10^{-73}$ cm$^6$-s$^2$/photon$^2$) |
|---|---|---|---|
| [structure: NC-C6H4-N(tolyl)-C6H4-C6H4-N(tolyl)-C6H4-CN] | 2.1 | 0.9 | 0.53 |

These data show the efficacy of compounds according to the present invention for optical limiting. $\gamma_{\text{eff}}$ and $\delta_{\text{eff}}$ values indicate the identified compounds are highly efficient two-photon (or higher-order) absorbers. For comparison, serotonin, which contains an indole chromophore, has been reported to have a three-photon absorptivity of $2\times10^{-84}$ cm$^6$s$^2$/photon$^2$. [S. Maiti, J. B. Shear, R. M. Williams, W. R. Zipfel, and W. W. Webb, *Science*, 275, 530(1997)].

Multi-Photon Absorbing Compounds as Polymerization Initiators According to the Invention Here we describe the utility of two-photon and multi-photon absorbing molecules as initiators of polymerization, specifically to the use of bis-donor-substituted π-conjugated molecules as two-photon initiators. Such two-photon excitable initiators have utility in two- and three-dimensional lithography applications, and in three-dimensional optical data storage with ultrahigh storage densities (10$^{12}$ bits/cm$^3$). When applied to a spinning disk (compact disk) type format, two-photon polymerizable materials can offer over a thousand-fold increase in storage capacity. There are two key advantages of two-photon induced polymerization relative to single-photon induced polymerization. Whereas single-photon absorption scales linearly with the intensity of the incident radiation, two-photon absorption scales quadratically. As a result, it is possible to perform two-photon polymerization with three-dimensional spatial resolution. In addition, because the phenomenon involves the simultaneous absorption of two-photons, the chromophore is excited with light of half the energy of the two-photon absorption peak. As a result, it is possible to excite molecules at a greater depth within a material than would not be possible via single-photon excitation. These two advantages also apply to for example in vivo photo-initiated polymerization. In lithography or stereolithography, the quadratic scaling of absorption with intensity can lead to the ability to write features below the diffraction limit of light and the ability to write features in three dimensions, which is also of interest for holography.

Bis-donor-substituted π-conjugated molecules according to this invention exhibit large two-photon absorption cross sections and also possess structural features that permit them to be effective as initiators of polymerization. As has been discussed earlier, these bis-donor-substituted π-conjugated molecules exhibit large two-photon absorptivities in the visible and the near infrared spectral regions. Another feature of these bisdonor-substituted diphenylpolyene molecules is that the donor groups also impart to them low oxidation potentials. Thus, two-photon or multi-photon excitation of bis-donor-substituted π-conjugated molecules enables them to function as powerful reducing agents and can reduce even molecules with low electron affinities, including various polymerizable groups such as acrylate monomers. Accordingly, bis-donor-substituted π-conjugated molecules of this invention are able to function as multi-photon excitable initiators of polymerization. Many amino-substituted phenyl-containing compounds such as aniline, are known to initiate polymerization of vinyl or acrylate monomers upon exposure to ultraviolet radiation through a charge transfer initiation. The charge transfer initiation process may proceed by way of a direct charge transfer that leads to formation of initiating and propagating radical species or by way of a hydrogen abstraction reaction between members of a charge transfer complex involving the aromatic amine and the monomer that also leads to the formation of initiating and propagating radicals.

A. Two-Photon Excited Polymerization Using Bis-Donor-substituted π-Conjugated Molecules The rate of two-photon initiated photopolymerization depends on the two-photon excitation rate and on the quantum yield for initiation. The standard expression for the rate of polymerization, $R_p$, assuming a radical mechanism, (G. Odian, *Principles of Polymerization, Second Edition*, John Wiley and Son, New York, 1981, page 181) is given by $$R_p = [M]k_p(R_i/2k_t)^{1/2}$$

where [M] is the monomer concentration, $k_p$ is the rate constant for polymerization, $R_i$ is the rate of initiation and $k_t$ is the rate constant of termination. The rate of initiation for a two-photon excited initiation can be obtained by adapting the standard rate for single-photon initiation and we obtain:

$$R_i = \Phi_i(1000/N_A)\delta I^2 N_i$$

where $\delta$ is the two-photon absorptivity (in units of cm$^4$ s photon$^{-1}$), I is the photon flux (photons cm$^{-2}$ s$^{-1}$), $N_A$ is Avogadro's number, $N_i$ is the number density of two-photon absorbing initiators and $\phi_i$ is the quantum yield of initiation. Combining these two equations gives the rate of two-photon excited polymerization as:

$$R_p = [M]k_p(\Phi_i(1000/N_A)\delta I^2 N_i/2k_t)^{1/2}$$

Thus, the rate of polymerization is dependent on the magnitude of the two-photon absorptivity of the initiator and the quantum yield of initiation, which depends both on the characteristics of the initiator and the monomer.

1) Two-Photon Polymerization of Liquid Phase Polyacrylate Monomers

We have demonstrated that bis-donor-substituted conjugated molecules according to the invention can initiate, following two-photon excitation, the polymerization of crosslinkable liquid polyacrylate monomers. Polymerization of crosslinkable monomers leads to the formation of insoluble polymeric material, such that two-photon initiated polymerization causes the deposition of an easily observable volume of solid polymer on the window of the optical cell. Solutions of alkoxylated trifunctional triacrylate ester (Sartomer 9008) that included polymerization inhibitor MEHQ and containing up to 1% of various bis-donor-substituted conjugated molecules were placed in an optical cell and irradiated with 8-ns pulses with a wavelength of 594 nm from a pulsed dye laser operating at a repetition rate of 20 pulses/s. Irradiations were performed with a collimated beam of cross sectional area of 0.002 $cm^2$ and various pulse energies. The time required for visually observable polymerization was roughly estimated for different irradiations and the results are summarized in Table 5. For cases where the molecules have large two-photon absorptivities at 594 nm, polymerization was observed. Polymerization was generally observed when 13 mJ pulses were used but the intensity was sufficiently high that higher-order nonlinear processes may have led to polymerization. Formation of polymer was demonstrated by the characteristic pattern of infrared bands as determined by IR spectroscopy. The diminution of the peaks assigned to monomer provided further evidence for formation of polymer.

TABLE 5

| | Compounds | Laser Energy at 594 nm | | | |
|---|---|---|---|---|---|
| | | 13 mJ | 3.5 mJ | 2 mJ | 1 mJ |
| 0 | Bu$_2$N-C$_6$H$_4$-CH=CH-C$_6$H$_4$-NBu$_2$ | Yes 5 sec | Yes 5 sec | Yes 5 sec | Yes 15 sec |
| 1 | Et$_2$N-C$_6$H$_4$-CH=CH-C$_6$H$_4$-NBu$_2$ | Yes 5 sec | Yes 5 sec | Yes 5–10 sec | Yes 25 sec |
| 2 | Et$_2$N-C$_6$H$_4$-CH=CH-C$_6$H$_4$-OBu | Yes 5 sec | Yes 10 sec | Yes 30 sec | No >1 min |
| 3 | BuO-C$_6$H$_4$-CH=CH-C$_6$H$_4$-OBu * | No >2 min | No >2 min | No >2 min | No >2 min |
| 4 | MeO-C$_6$H$_4$-(CH=CH)$_2$-C$_6$H$_4$-NBu$_2$ | Yes 5 sec | Yes 5 sec | Yes 10 sec | Yes 20–25 sec |
| 5 | Me$_2$N-C$_6$H$_4$-(CH=CH)$_2$-C$_6$H$_4$-NBu$_2$ | Yes 5 sec | Yes 10 sec | Yes 30 sec | Yes 40 sec |
| 6 | piperidinyl-thiophene-CH=CH-thiophene-piperidinyl | No *>2 min | No >2 min | No >2 min | No >2 min |
| 7 | Me$_2$N-C$_6$H$_4$-(CH=CH)$_n$-C$_6$H$_4$-NBu$_2$, n = 3 | Yes 5 sec | No >2 min | No >2 min | No >2 min |
| 8 | Me$_2$N-C$_6$H$_4$-(CH=CH)$_n$-C$_6$H$_4$-NBu$_2$, n = 4 | Yes 5 sec | No >2 min | No >2 min | No >2 min |

TABLE 5-continued

|  | | Laser Energy at 594 nm | | | |
|---|---|---|---|---|---|
| | Compounds | 13 mJ | 3.5 mJ | 2 mJ | 1 mJ |
| 9 | 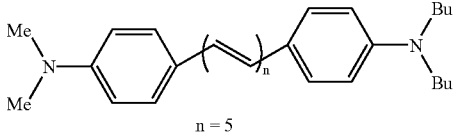 n = 5 | Yes 5 sec | No >2 min | No >2 min | No >2 min |

The upper Yes/No entry indicates whether polymerization was observable and the lower entry indicates the time of observation. Concentration of the two-photon absorber was 1% by weight except for the starred compounds where the concentration was less than 0.5%.

Figure 15:
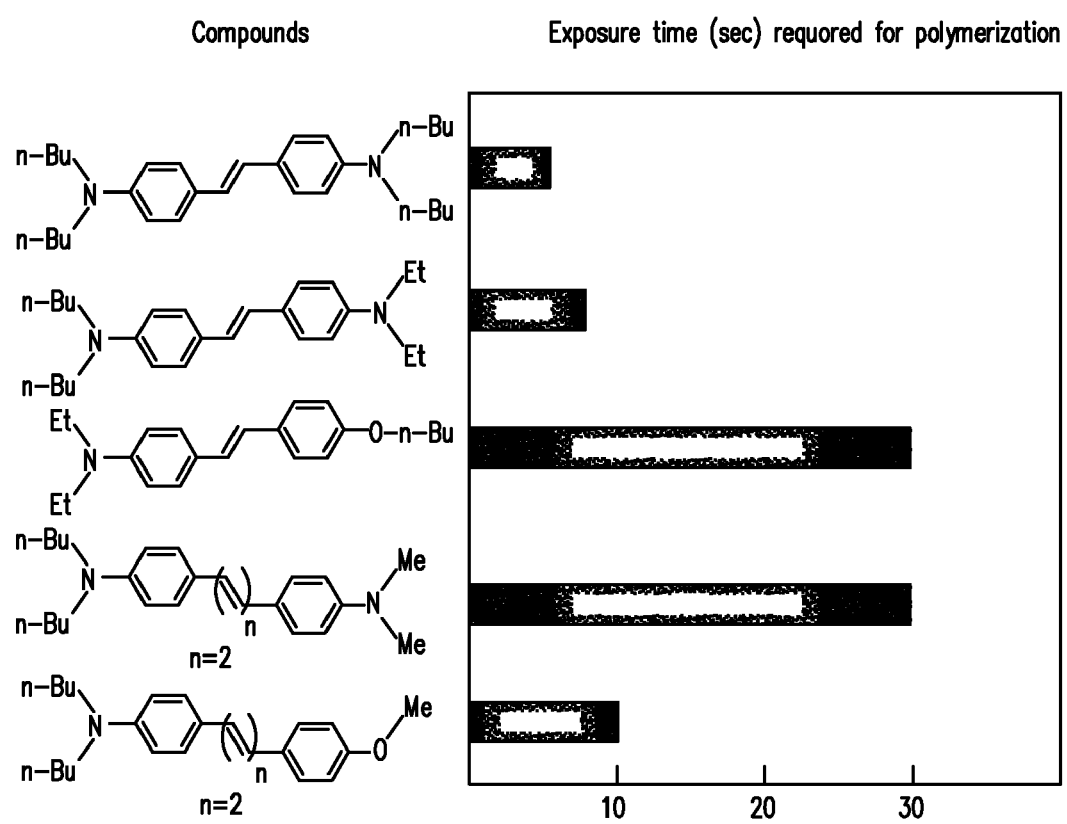
FIG. 15 illustrates induction times for two-photon polymerization of a triacrylate monomer (SR9008) with 2 mJ, 8 ns, 594 nm pulses.

The induction times for polymerization initiated by two-photon excitation of selected initiator molecules with a pulse energy of 2 mJ and a wavelength of 594 nm are shown in FIG. 15. The molecule 4,4'-bis(dibutylamino)stilbene has a maximum two-photon absorptivity at about 600 nm and has the shortest induction time. A simple alkyl substitution of ethyl for butyl on the amino group has little effect. 4-(dibutylamino)-4'-(n-butoxy)stilbene has a low two-photon absorptivity at 594 nm and has a relatively large induction time. The two-photon absorption of 4-(di-n-butylamino)-4'-(dimethylamino)diphenyl-buta-1,3-diene peaks at 650 nm, has a three-fold reduction in two-photon absorptivity at 594 nm compared to 4,4'-bis(dibutylamino)stilbene and has a longer induction time. The molecule, 4-(dibutylamino)-4'-(n-butoxy)diphenyl-buta-1,3-diene, which has a red shifted two-photon absorption, exhibits a reduced induction time compared to 4-(dibutylamino)-4'-(n-butoxy)stilbene.

2) Two-Photon Absorbing Photopolymer Systems

We have demonstrated the use of several two-photon absorbing molecules in two-photon crosslinkable photopolymer systems. These compositions involved the use of 1) a two-photon absorbing initiator, 2) a crosslinkable monomer, and 3) a polymer binder. Many other compositional variations including the use of plasticizers, chain transfer agents, polymer blend binders, and polymerizable monomers are possible, as known to those skilled in the art, see for example, G. Odian "Principles of Polymerization" [John Wiley & Sons, NY, 1981]. In the formulations here, the components were dissolved in a suitable solvent, that depends on the composition of the system, to form a viscous solution and films were prepared by spin coating or by casting via solvent evaporation.

Examples of compositions of two-photon absorbing photopolymer systems are described below.

I) Two-photon initiator: 4,4'-bis(dibutylamino)stilbene
 Crosslinkable monomer: Tris(2-hydroxy ethyl)isocyanurate triacrylate, (Sartomer SR368)
 Binder polymer: Poly(methylmethacrylate) (PMMA)
 Solvent for processing: Dioxane
This composition forms clear films by spin coating or casting.

II) Two-photon initiator: 4-(di-n-butylamino)-4'-(dimethylamino) diphenyl-octa-1,3,5,7-tetraene
 Crosslinkable monomer: Ethoxylated trimethylolpropanetriacrylate (Sartomer SR454)
 Binder polymer: Poly(vinylcarbazole) (PVK)
 Solvent for processing: Tetrahydrofuran (THF)
This composition forms translucent yellow/orange films by spin coating or casting.

Gel films and thick gel plates of composition II with 66% SR454, 33% PVK and 1% 4-(di-n-butylamino)-4'-(dimethylamino)diphenyl-octa-1,3,5,7-tetraene underwent two-photon initiation of cross-linking by excitation for 5 seconds with 2 mJ, 8 ns, 765 nm laser pulses at 20 pulses/s. A color change was observed in the irradiated spot and upon washing with THF solvent, a small insoluble hemispherical polymer plug was recovered, indicating that cross-linking had occurred.

3) Writing of filaments in liquid phase monomers

The ability to form polymer filaments that taper from an initial diameter ranging from millimeters to tens of microns down to final diameters of one to several microns can be of utility in providing low loss optical guided wave coupling of objects with disparate dimensions. For example, dimensional mismatch is often encountered in attempts to couple optical fibers, which can range between 10 μm to several hundred μm in diameter, to semiconductor laser diodes, which can have active areas with a cross sectional dimension of several microns or even less. One feature of the two-photon initiated polymerization disclosed here is that such tapered polymer filaments or arrays of such filaments can be formed.

Two-photon excitation of a variety of the disclosed diphenylpolyene derivatives in the presence of acrylate monomers leads to the formation of polymer. For example, with the two-photon absorbing molecule dissolved at 1% concentration in triacrylate monomer, excitation leads to formation of a visually observable cross-linked polymer spot on the wall of the vessel. It was observed that when irradiating a liquid cross-linkable triacrylate monomer containing a two-photon absorbing molecule (for example Sartomer 9008 with 1% 4,4'-bis(dibutylamino)stilbene) using a laser beam at a wavelength of 600 nm, an intensity of ~100 MW/cm$^2$ and a diameter of about 1 mm that the cross-linked polymer volume that formed was tapered to a point as the polymer advanced from the window into the bulk of the liquid. This tapering suggested that the two-photon polymerization of the monomer led to a focusing of the beam into the monomer as the polymerization proceeded. We have also observed that prolonged exposure of a particular spot at the window/monomer solution interface leads to the development of a fine filament of polymer that extends for several millimeters into the solution. This process is the two-photon analog of the photopolymerization induced optical self-focusing and trapping reported recently (A. S. Kewitsch and A. Yariv, Optics Lett., 21(1), 24 (1996).) This demonstration was performed using Sartomer 9008 with 1% 4,4'-bis(dibutylamino)stilbene and 8 ns, 532 nm laser pulses at a pulse rate of 10 pulses/s. Using a beam that was focused onto the window with lenses varying from f/4 to f/7 and pulse energies of 0.3 to 0.4 mJ, filaments 1 to 4 mm in length could be formed.

4) Three Dimensional Optical Memory by Writing Cross Linked Voxels in Photopolymer Systems.

Webb, et al. (e.g., J. H. Strickler and W. Webb, Optics Lett., 26, 1780-1782, (1991)) described two-photon initiated polymerization as a means for optical data recording utilizing a commercial photoresist prepared in a 170 μm thick film format where highly localized volumes in such a film were exposed with ultrashort laser pulses from a mode-locked titanium sapphire laser system. The exposed volumes exhibited a change in refractive index upon polymerization which served as a means of optical data storage. Retrieval of information was accomplished with differential contrast interference microscopy. Two-photon polymerized refractive index voxels of 0.3 μm diameter were written and sheets of voxel patterns spaced about 3 μm were created, with a sheet spacing limit of about 1 μm, leading to storage densities of ~$10^{12}$ bits/cm$^3$.

The multi-photon absorbing materials of the invention and photopolymer compositions based on them can be used to form recording media for two or three dimensional optical data storage. The advantages of using two-photon induced processes for three dimensional optical data storage are well known. Using a strongly focused optical beam it is possible to produce localized two-photon excitation in a volume of the order of 1 μm$^3$, thus resulting in data storage densities of $10^{12}$ bits/cm$^3$. Additionally, using crossed optical beams, spots or sheets of data can be stored or addressed in three dimensions, albeit at lower data densities. The disclosed compositions have utility in forming three dimensional optical data storage media with high recording sensitivity, due to the large two-photon absorptivities exhibited by these materials.

Experiments to record small volume spots of cross-linked polymer were performed using a picosecond pulsed dye laser as the excitation source. This system provided 4 ps pulses at a repetition rate of 3.7 MHz with an average power of 30 to 40 mW in the 600 to 650 nm range. The laser beam was expanded to fill a microscope objective (numerical aperture=0.25) so as to produce a 1.4 μm spot size at the focus. Exposures with different powers and durations were conducted. The two two-photon photopolymer compositions (I and II) described above were used as the recording media. Written spots were observed by optical microscopy and by washing the films with a solvent to strip away uncross-linked polymer and leave behind on the substrate spots of crosslinked material. The quality of the laser beam spatial profile, the exposure time, the power, the focusing and the material composition were found to be crucial in the ability to write spots and for the spot size.

It was demonstrated that 3 μm diameter spots could be written at different depths in ~200 μm thick films of composition II with 66% SR454, 33% PVK and 1% 4-(di-n-butylamino)-4'-(dimethylamino)diphenyl-octa-1,3,5,7-tetraene, using 600 or 650 nm picosecond pulses focused with the numerical aperture=0.25 microscope objective. With higher power objectives, smaller spots can be written. By writing spots of this material on the substrate/photopolymer interface, it was shown that these spots were left behind as insoluble polymer spots after washing with a solvent overnight.

Using spin coated thin films of composition I with varying percentages of 4,4'-bis(dibutylamino)stilbene, tris(2-hydroxyethyl)isocyanurate triacrylate, (Sartomer SR368) and poly(methylmethacrylate), it was shown that the power required to write the crosslinked polymer depended on the concentration of the two-photon absorber. Good optical quality films 200 μm thick were made with a composition of 1% 4,4'-bis(dibutylamino)stilbene, 40% Sartomer SR368 and the remainder PMMA.

Fluorescence of the multi-photon absorbing molecules of the present invention can be enhanced upon polymerization of the local monomer concentration relative to that of the absorber in the presence of unpolymerized monomer. Because of the charge-transfer interaction or other interactions between the two-photon excited molecule and the monomer, the fluorescence of the excited molecule is highly quenched. Upon polymerization of the monomer, the quenching ability of the monomer is eliminated and the excited-absorbers are able to emit with an unquenched efficiency. Thus, the two-photon initiated polymerization can lead to a "turning on" of the fluorescence efficiency of the polymerized spot. This feature can provide an advantage for the readout of stored bits of information because the two-photon excited fluorescence can be used to readout as opposed to other more complex, expensive and cumbersome methods such as differential interference microscopy.

Multi-photon absorbing molecules of the invention, the compositions described above and related compositions based on other monomers or crosslinkable monomers, other polymer binders and other additives such as chain transfer agents, can be employed as multi-photon absorbing recording media for holographic recording.

B. Single-Photon Excited Polymerization Using Bis-donor-substituted π-Conjugated Molecules According to the Invention Molecules according to the present invention that behave as two-photon initiators for polymerization of acrylates can also initiate polymerization when irradiated with wavelengths of light for which the molecules exhibit strong linear absorption. Thus these molecules represent a new class of near UV and visible initiators. Furthermore, from the parallel chemistry observed by single and two photon absorption, one can reasonably conclude that photon absorbing molecules that are single-photon initiators will also act as two-photon initiators, providing that the two-photon state is higher in energy than the one-photon state. This can be ascertained with some degree of certainty by observing whether the molecule is fluorescent. It is well known to those knowledgeable of the spectroscopy of π-conjugated molecules that when the two-photon state is substantially lower in energy than the one-photon state, the molecules are not fluorescent, whereas when the two-photon state is higher than the one-photon state, the molecules can be fluorescent.

Thus, thin films of poly(triacrylate) can be prepared by excitation with low power 360 nm radiation of molecules that behave as two-photon initiators. The films so prepared were identified as poly(triacrylates) by IR spectroscopy. The polymerization did not take place in the presence of benzoquinone, which is a typical inhibitor for radical polymerizations. During the polymerization, the solutions turned green and the UV spectrum has an absorption peak at 650 nm indicative of the stilbene radical-cation which was independently characterized by spectro-electrochemistry.

Methylacrylate was polymerized in bulk under the absence of air by irradiation with a 450 W medium pressure mercury lamp. The molecular weight of the polymer was above 400 000. The estimated molecular weight from comparison of the elution time to the polystyrene standard was Mw=697 000, Mn=429 000. Furthermore, the polymer, characterized by IR spectroscopy showed a spectrum identical with that in the literature. After washing the polymer several times with CHCl$_3$, the polymer exhibited fluorescence in the blue (~420 nm), indicating incorporated or bound initiator.

The bis-dibutylaminostilbene also polymerizes methylmethacrylate, yielding a soluble polymer in chloroform or CH$_2$Cl$_2$. Once again, the molecular weight is higher than 400 000.

Methylmethacrylate polymerizations were carried out in ethanol and toluene. Thus, 0.5 mL of the monomer were dissolved in 0.5 mL of the corresponding solvent in an ampoule. After adding 10 mg of bis-dibutylaminostilbene to each ampoule, nitrogen was bubbled through for 54 minutes and the ampoules were sealed. The samples were irradiated for 6 h with a 450 W medium pressure mercury lamp. In the ethanol-containing ampoule, poly(methylmethacrylate) was formed. In the toluene-containing ampoule, no polymerization was observed. It was further shown that the polymerization occurred in acetonitrile and acetone but not in benzene.

A critical issue related to in vivo photopolymerization addressed in this invention is limitations that may be introduced by the use of visible light; specifically, visible light does not penetrate tissues or other absorbing or scattering media at depth. To address this deficiency, we have developed photoinitiators which can be activated by two-photon absorption of near-infrared light, which has the greatest penetration depth through tissue.

Conventional photoinitiators for use in biomedical or materials processing, such as xanthine-based dyes, are activated by single-photon excitation of their absorption bands in the visible spectrum. These visible photoinitiators have been used for stereolithography and for in situ polymerization, but their utility for in vivo photopolymerization is limited in some applications (e.g., when fiber optics are impractical) by the small penetration depth in tissues at visible wavelengths. Photoinitiators that can be activated by two-photon absorption of near-IR photons can provide tremendous advantages over conventional photoinitiators. For photopolymerization through tissue, increased optical energy delivery and localization through tissue will result in shorter illumination times and better ability to localize the photopolymerization. Moreover, a new generation of inexpensive and highly reliable femtosecond Ti:sapphire lasers are being commercialized, making such treatment more accessible.

A complementary approach is based on the use of Forster energy transfer to create a bichromophoric photoinitiators wherein the two-photon absorber is covalently attached to a xanthine-based photoinitiator (e.g., rose bengal) such that energy transfer from the two-photon absorber to the xanthine photoinitiator initiates polymerization.

C. Photodeprotection and Photodecaging

A method for multi-photon deprotection or photodecaging of groups is described in which a multi-photon absorbing dye is attached to known photodeprotecting groups or photodecaging groups. In this method a dye can absorb two-photons or more of energy, and through an energy or charge transfer mechanism, serve to excite the attached photodeprotecting or photodecaging group, thereby inducing the deprotection of a functional group which could be a drug, neurotransmitter, metal ion or other chemical reagent.

Figure 16:
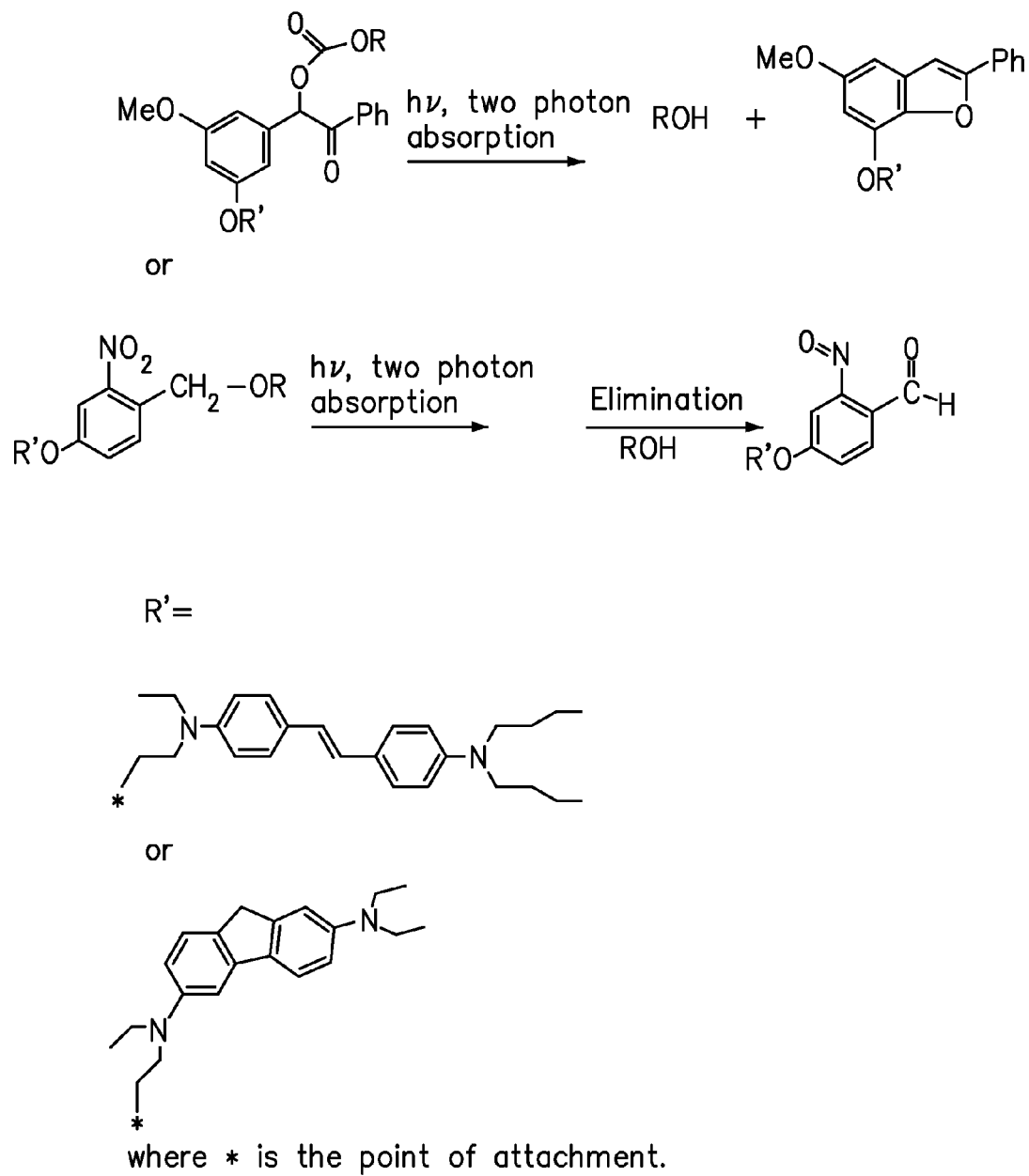
FIG. 16 illustrates two specific examples of photodeprotecting schemes according to the invention.

Two specific examples of photodeprotecting schemes involving attachment of known deprotecting groups to two-photon absorbing dyes are shown in FIG. 16.

Multi-photon Absorbing Compounds According to the Invention as Optical Limiting Materials A. Introduction Two-photon and higher-order absorbing compositions in accordance with the invention are useful in optical power or energy limiting devices. These devices can be used to protect eyes or sensors from intense optical pulses, to modify the shape of the optical output pulse from lasers, to perform a thresholding function on optical pulses for signal processing, or for optically controlled spatial light modulation.

Materials that exhibit nonlinear absorption can be used for optical limiting devices. Such materials, including excited-state absorbers, two-photon absorbers or higher-order absorbers are initially highly transparent over a certain spectral band and become more strongly absorbing in this band as the incident optical intensity or energy is increased.

One of the significant applications of optical limiting devices is in laser eye or sensor protection. The exposure of human eyes or sensors to intense optical pulses can lead to permanent damage or to impaired visual performance and thus presents a serious problem to those working in environments where lasers may be encountered. Frequency-doubled Q-switched Nd:yttrium/aluminum/garnet lasers are very common and for these lasers (which have pulse durations of 10 ns and a wavelength of 532 nm), the $ED_{50}$ level (the exposure energy for which there is a 50% probability of producing a retinal lesion) is about 3 µJ, whereas the ANSI standard maximum permissible exposure level is about 0.1 µJ. In the laboratory or field environments, laser pulse energies of 1 to 100 µJ may be present, sometimes in the form of an unanticipated surface reflection off an optical component. Thus, protection devices must provide nonlinear attenuation and a high linear optical transmittance, to allow high visibility under ambient working conditions. Although fixed wavelength or broadband absorptive filters can be used to block laser beams from eyes or sensors, as in current commercial goggles for laser eye protection, these types of filters often impair visibility or color vision and are ineffective when there are multiple wavelengths or tunable lasers present.

A wide variety of materials and mechanisms have been investigated for use in optical limiting, however most existing materials have significant drawbacks such as a limited range of linear transmission or insufficient blocking ability. Optical limiting by two-photon absorption in semiconductors is well known and involves both two-photon absorption and nonlinear refraction due to the two-photon excited free carriers. However, most semiconductor materials are of limited utility for high dynamic range optical limiting because of their relatively low optical damage thresholds. Organic molecules can also exhibit two-photon absorption, but generally the two-photon absorptivities of molecules examined to date, which are actually small in number and of limited range in structure, fall short of the levels needed for optical limiting by two or more orders of magnitude.

As a result, with the present invention one can provide optical limiting devices using molecular two-photon or higher-order absorbers with large peak two-photon or higher-order absorptivities, as exemplified by effective two-photon absorptivities of $>1,000 \times 10^{-50}$ cm$^4$ s photon$^{-1}$ and high linear transmission.

In addition, molecules according to the present invention can provide a broad bandwidth optical limiting material based on a mixture of molecular two-photon or higher-order absorbers.

Moreover, these molecules can provide optical limiting devices using a two-photon or higher-order absorbing material based on a mixture of molecular two-photon absorbers.

Two-photon or higher-order absorbers, of the type described in this disclosure, which have large two-photon or effective two-photon absorptivities are attractive materials for optical limiting since they can achieve large nonlinear attenuation and maintain very high linear transmittance.

B. Optical Limiting Materials in Accordance with the Present Invention

The present invention includes a class of molecules which exhibit very strong two-photon absorption in a spectral region where the linear transmission is very high. The present invention provides compositions of matter which have exceptionally large two-photon absorptivities.

In particular, we teach that bis-amino substitution of diphenylpolyenes and related conjugated structures leads to strong two-photon bands with excitation wavelengths in the transparent region of the molecules, below the one photon absorption edge. Also, di-aryl substitution of the amines leads to a significant red shift of the two-photon absorption band but a smaller shift of the lowest one-photon absorption band. This provides utility in formulating broadband limiting materials which preserve transparency. Furthermore, by combining two-photon absorber molecules which have two-photon absorption bands at different positions but which are each transparent over a targeted region of the spectrum, broadband optical limiting materials with high transparency can be obtained.

Large optical limiting effects have been observed with the new two-photon absorbers with large peak effective two-photon absorptivities (e.g., >1000×10$^{-50}$ cm$^4$s-photon$^{-1}$. These effects have been observed using only moderate intensity nanosecond pulses. In earlier materials, large optical limiting effects are observed only for very high intensity picosecond pulses.

Figure 17:
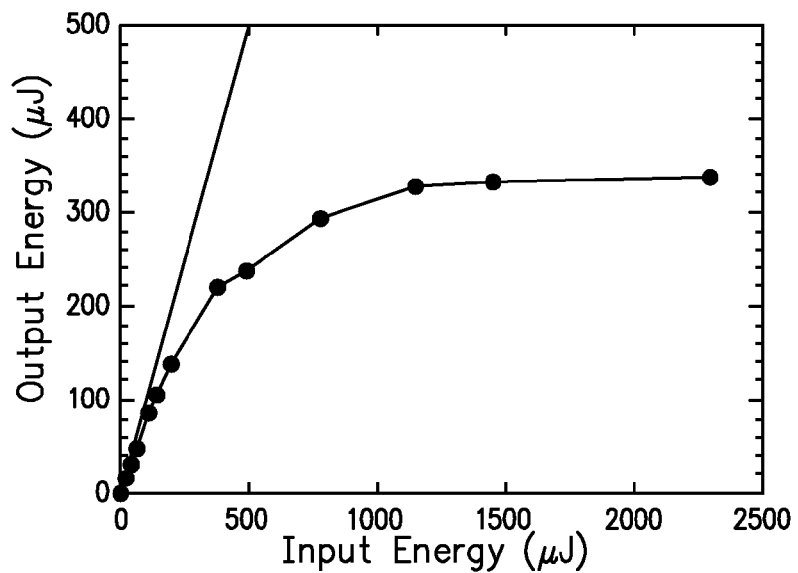
FIG. 17 illustrates two-photon optical limiting in 4-(dimethylamino)-4'-(dibutylamino)stilbene according to the invention.

The optical limiting by two-photon absorption in 4-dimethylamino-4'-dibutylaminostilbene (MBDAS) for 605-nm, 8-ns laser pulses in a collimated beam geometry is shown in FIG. 17. At low incident energy, the transmission is close to 1.0, i.e., the sample is nonabsorbing. For input energies above ~100 µJ (fluences above ~0.1 J/cm$^2$), the transmission decreases and at an input energy of ~2000 µJ (fluence of 2 J/cm$^2$), the transmission drops to 0.15. The collimated beam geometry utilized for this measurement was one used mainly for characterizing the nonlinear transmission and not to optimize the optical limiting response. A line corresponding to a transmission of 1.0 is shown for reference. The sample was a 0.33M MBDAS solution in acetone with a pathlength of 1 cm. The measurements were made with 605 nm, 8-ns laser pulses in a collimated beam geometry with a beam diameter of ~400 µm.

For such nonlinear transmission experiments, the spatial beam profile of the dye laser was adjusted to produce a roughly flat intensity distribution across a roughly 5-mm diameter beam. The beam was passed through an 8.5×beam reducing telescope. The position of the second lens in the telescope system was adjusted to produce a collimated beam over the length of the 1-cm sample cell holder. The sample solutions were placed in 1 cm pathlength quartz cells; the cell holder was about 50 mm from the second lens.

Typical maximum input energies into the samples were about 2.5 mJ. The energy delivered to the samples was controlled by a series of calibrated neutral density (ND) filters. A 4% beam splitter was inserted after the ND filter holder and this reference beam was sent to a 15 mm diameter silicon photodetector (equipped with appropriate ND filters to assure that the signal did not saturate the detector). A similar detector system was placed 75 mm after the optical limiting samples to collect the transmitted laser signal and to measure the total transmitted energy. This large area was chosen for performing total transmitted energy measurements, since nonlinear refractive effects caused defocusing effects in the transmitted beam. The detector outputs were integrated using a boxcar integrator and the integrator output was digitized and read by a PC computer. Measurements of the sample transmissions were repeated for a range of input laser energies (via the neutral density filters). The data were then analyzed by fitting them to the solution of the intensity propagation equation for two-photon absorption and optical limiting. For samples with no linear absorption, plots of 1/T versus intensity were fit to the equation:

$$\frac{1}{T} = 1 + \beta L I_o$$

where T is the transmission, β is the effective two-photon absorption coefficient and is directly proportional to the molecular two-photon absorptivity, L is the pathlength and $I_o$ is the incident intensity.

The two-photon absorptivity of MBDAS was 13,500× 10$^{-50}$ cm$^4$ s/photon. For comparison, a value of 850×10$^{-50}$ cm$^4$ s was recently reported [G. S. He, G. C. Xu, P. N. Prasad, B. A. Reinhardt, J. C. Bhatt, and A. G. Dillard, Optics Letters, 20 435 (1995)]. For a bis(benzthiazole)dialkoxythiophene compound in solution and was reported to be two orders of magnitude higher than a reference dye (Rhodamine 6G). Clearly, the effective two-photon absorptivity for MBDAS is very large. Much stronger optical limiting response is expected for MBDAS solutions in focusing optical systems. However, even in this unoptimized geometry, the response for the MBDAS solution is better than that of the best phthalocyanine excited-state absorber (chloroindium tetra-(tert-butyl)phthalocyanine) solution with a transmission of 0.95).

The new multi-photon absorbers according to the present invention afford several interesting advantages for optical limiting. Firstly, these molecules exhibit effective two-photon absorptivities that are about one or more orders of magnitude higher for current state of the art materials. With such high two-photon absorptivities, these molecules are effective in limiting nanosecond duration pulses. Secondly, these molecules can have very high broadband linear transmission, since the two-photon absorption bands occur for photon energies well below the linear absorption edge. This could be a huge advantage, since low linear transmission and impairment of normal color vision are major concerns for potential users of laser protective devices. Thirdly, broadband two-photon absorbing molecules have been prepared from mixtures of compounds, all of which are essentially transparent over much of the visible spectrum, each with different two-photon resonances that span a wide band. Finally, these two-photon absorbing molecules perform very well at high intensities such that good short pulse performance is assured.

We have demonstrated optical limiting based on the new molecular two-photon and multi-photon absorbers described herein in different optical geometries and with combinations of materials as described below. The optical limiting compositions according to the present invention may exist as crystals, mesoscopic phases, polymers, glasses, liquids or gases. The compositions may be used alone or in combination with other crystals, mesoscopic phases, polymers, glasses, liquids or gases. By "mesoscopic phases," we refer to materials with structural order on a length scale between that of individual molecules, i.e., above about 10 Angstroms, and the microscopic length scale, i.e., above about one micrometer. These materials include small molecule and polymeric liquid crystals, colloidal, micellar and liposomal suspensions, self assembled nanoparticle arrays, and the like.

Depending upon the particular application the multi-photon absorber may be incorporated, in the form of a concentration gradient profile, into a material, to form a concentration gradient optical limiting material. Such gradients have been demonstrated for excited state absorption-type optical limiting materials. Concentration gradient materials can be made by solvent-assisted in-diffusion of molecules into porous solids or gels, by sequential deposition of layered thin film materials wherein the concentration of the dye in each layer is varied appropriately. This may be accomplished by forming a laminate structure comprised of thin films of free standing polymer containing the multi-photon absorber. Alternatively, gradient materials can be produced by codeposition of the dye with an inert binder material, with the relative rates of deposition of each material being varied with time to as to form a concentration gradient.

Figure 18:
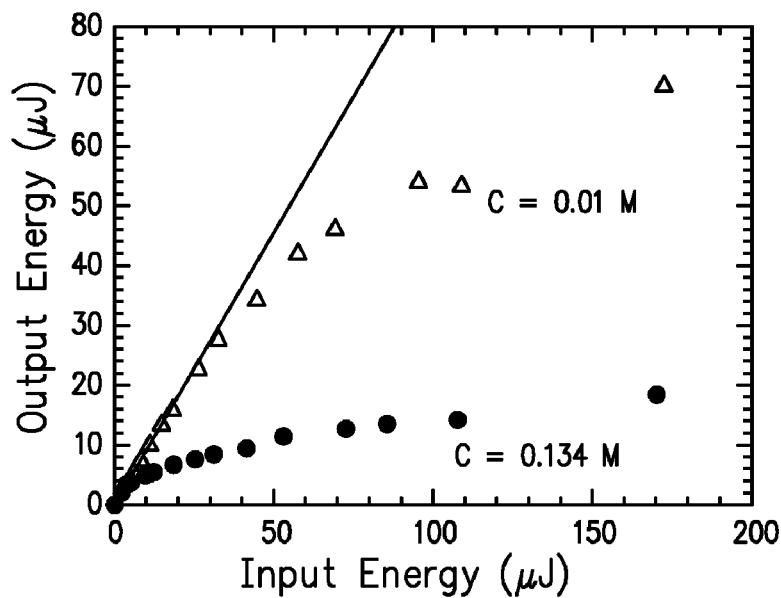
FIG. 18 illustrates two-photon optical limiting responses of 0.01 and 0.134 M solutions of 4,4'-bis(dibutylamino)stilbene for ~5 ns, 600 nm pulses.

We have performed optical limiting experiments using our multi-photon absorbers in a focusing optical system. In one example, solutions of 4,4'-bis(dibutylamino)stilbene (BDAS) in acetone were placed in a 1 cm pathlength cell positioned into the focus of an f/5 focusing lens. The transmitted optical energy was collected with a matched f/5 lens and relayed onto a silicon photodiode detector. Optical limiting responses for solutions with two different concentrations (0.01 and 0.134 moles/liter) of the BDAS were obtained and are shown in FIG. 18. At the concentration of 0.134 moles/liter, the sample linear transmission at 605 nm was 96%. The transmission of the sample at an input energy of 170 µJ dropped to about 0.10. Although the sample pathlength was 1 cm, the effective interaction length was much smaller, <100 µm, due to the fact that the intensity falls off as $z^{-2}$ from the focus and the rate of attenuation due to two-photon absorption depends on the square of the intensity. Thus, the rate of attenuation due to two-photon absorption falls off from the focus as $z^{-4}$. As a result, at one confocal length from the focus, the attenuation rate is reduced by a factor of 4 relative to that at the focus.

FIG. 18 illustrates two-photon optical limiting responses of 0.01 and 0.134 M solutions of 4,4'-bis(dibutylamino)stilbene for ~5-ns, 600 nm pulses. The straight line corresponds to the linear transmission (96%) of the 0.134 M solution. A 1 cm cell was centered on the focus of an ~f/5 optical system (effective interaction length <100 µm) and the total transmitted energy was detected.

Solutions or materials containing the multi-photon absorbing molecules according to the invention such as 4,4'-bis (dibutylamino)stilbene, exhibit strong nonlinear optical beam spreading such that the transmitted energy emanating from the absorber is defocused and spread over a larger area for strong inputs compared to weaker ones. As a result, greater protection from optical damage is obtained for a detector or sensor placed at the final focal plane of the system. Yet further enhancements in the protection afforded by these multi-photon absorbers can be obtained by placement of a suitable aperture stop at an intermediary focal plane, so as to entirely eliminate the transmitted energy that falls outside the pupil of the stop, as a result of nonlinear beam spreading.

Figure 19:
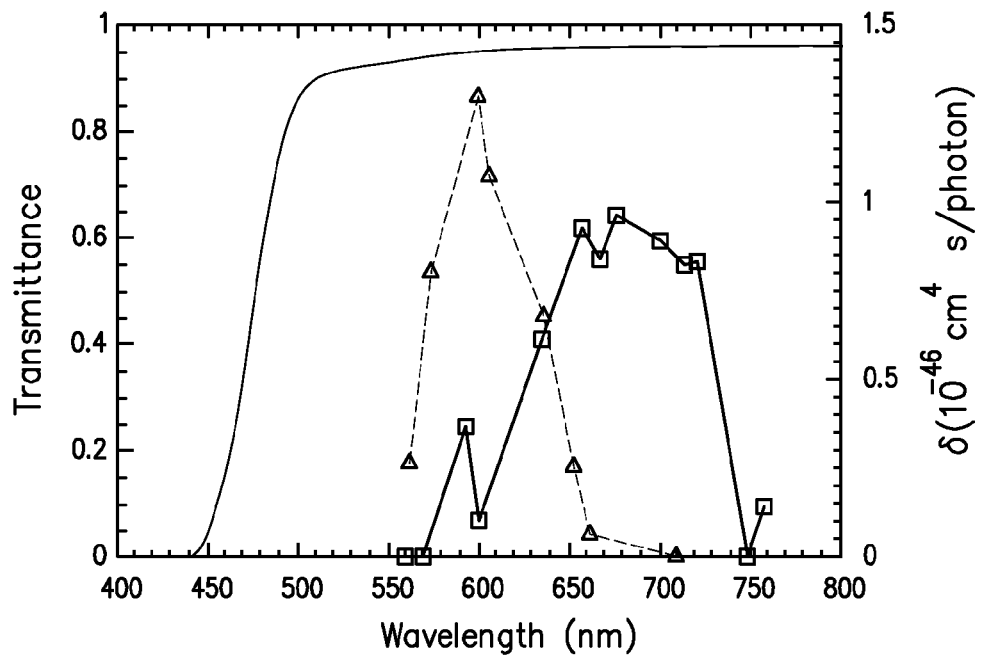
FIG. 19 shows the nonlinear absorption peaks for 4,4'-bis-(di-n-butylamino)stilbene and 4,4'-bisdiphenylamino)stilbene and the linear transmission of a mixture of these compounds at a total concentration of 0.1 M.

FIG. 19 shows the nonlinear absorption peaks for 4,4'-bis-(di-n-butylamino)stilbene and 4,4'-bis-(diphenylamino)stilbene and the linear transmission of a mixture of these compounds at a total concentration of 0.1 M. The absorption edge for 4,4'-bis-(di-n-butylamino)stilbene has an onset at 500 nm, so that the material is transparent from 500 nm to longer wavelengths throughout the visible spectral range. Thus, the two-photon absorption band occurs in a region of high transparency. The two-photon peak at 600 nm is fairly sharp, but we have shown that simple diphenyl substitution on the amines gives rise to a broader two-photon peak that is shifted to ~690 nm, even though the one photon peak is red shifted by only 20 nm. A mixture of these materials would cover well the range from 560 to 730 nm, as demonstrated in FIG. 18. Experiments show that such a mixture of 4,4'-bis(dibutylamino)stilbene and 4,4'-bis(diphenylamino)stilbene shows a net two-photon absorptivity that is equal to the sum of the two-photon absorptivities of the two individual molecules. For example, measurements at 650 nm, corresponding to the wavelength where the two-photon spectra of the two molecules cross, show that the net two-photon absorptivity is additive in the contribution from each compound.

FIG. 19 illustrates linear transmission spectrum (solid line) of a mixture of 4,4'-bis(dibutylamino)stilbene and 4,4'-bis (diphenylamino)stilbene for a total concentration of 0.1M. Also shown are the wavelength dependent two-photon absorptivities for each compound: triangles are for the dibutyl derivative and squares are for the diphenyl derivative.

Thus, we teach that a combination of chromophores with alkyl and aryl substituents on the amino groups of diaminostilbenes produces materials with broadband two-photon absorption and high transparency. Additional shorter wavelength two-photon absorbers could be added with no compromise of the linear transmission in order to further extend the two-photon absorption to cover the whole visible spectrum. For example, a 4,4'-bis(diphenylamino) biphenyl or a 4,4'-bis(diphenylamino) fluorene would add a two-photon absorption band at approximately 500 to 550 nm, but would not reduce the linear transmission.

A mechanism to enhance the two-photon absorptivity at a given wavelength is to synthesize molecules with extended conjugation such that the single-photon absorption edge approaches the fundamental frequency of the laser, without leading to substantially decreasing linear loss. For example, simply extending the number of bridging double bonds in the stilbene derivatives from one to five double bonds enhances the effective two-photon absorptivity by a factor of five. The enhanced two-photon absorption is evidenced in FIG. 19 where the nonlinear transmission of 4,4'-bis-(di-n-butylamino)stilbene is compared with 1-(di-4-n-butylaminophenyl)-10-(4-dimethylaminophenyl) deca-1, 3, 5, 7, 9-pentane.

Figure 20:
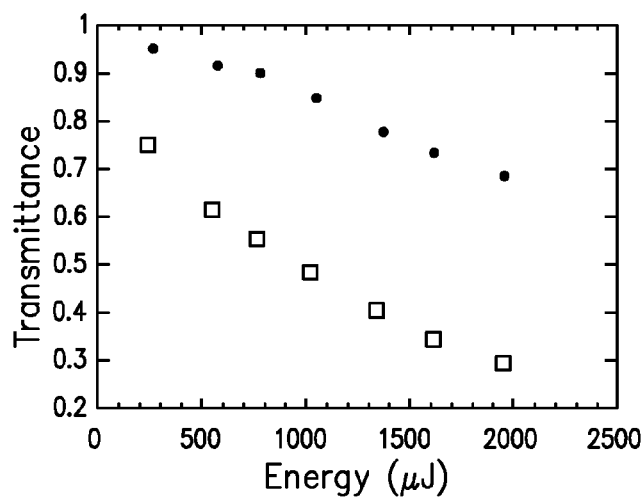
FIG. 20 illustrates nonlinear transmission data showing enhanced two-photon absorption in a 1-(4-dimethylaminophenyl)-10-(4-dibutylaminophenyl)-deca-1,3,5,7,9-pentane (squares) as compared to the 4,4'-bis-(di-n-butylamino) stilbene (circles).

FIG. 20 illustrates nonlinear transmission data showing enhanced two-photon absorption in a 1-(4-dimethylaminophenyl)-10-(4-dibutylaminophenyl)-deca-1,3,5,7,9-pentane (squares) as compared to the 4,4'-bis-(di-n-butylamino) stilbene (circles). Measurements were performed at 598 nm using 0.01M solutions.

Another feature of this invention is the ability to systematically control the position of the lowest two-photon absorption band of bis donor-substituted π-conjugated molecules by increasing the π-conjugation length of the molecule by, for example, controlling the number of conjugated double bonds between the two donor-substituted aromatic or heteroaromatic end groups. Thus, increasing the number of double bonds, leads to a considerable shift of the two-photon absorption band to longer wavelengths. Incorporation of phenylenevinylene groups between the end groups has a similar effect.

The invention claimed is:

1. A method for preparing a compound in an electronically excited state, comprising the steps of:
    a) exposing a compound having the formula $D_1$-Π-$D_2$ to radiation of a wavelength within a multiphoton absorption peak of said compound, wherein $D_1$ and $D_2$ are electron donor groups; and Π comprises a bridge of π-conjugated bonds connecting $D_1$ and $D_2$; and
    b) converting said compound to a multi-photon electronically excited state upon simultaneous absorption of at least two photons of said radiation by said compound, wherein the sum of the energies of all of said absorbed photons is greater than or equal to the transition energy from a ground state of said compound to said multi-photon excited state and wherein the energy of each absorbed photon is less than the transition energy between said ground state and the lowest single-photon excited state of said compound and is less than the transition energy between said multi-photon excited state and said ground state, wherein said compound is further defined by a formula

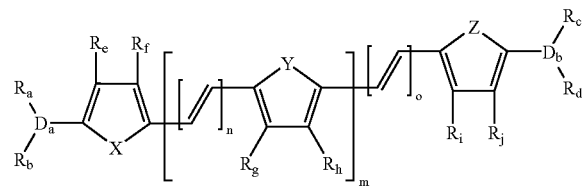

where $D_a$ is selected from the group consisting of N, O, S, and P;
where $D_b$ is selected from the group consisting of N, O, S, and P;
m, n, o are integers such that $1 \leq m \leq 10$, $0 \leq n \leq 10$, and $0 \leq o \leq 10$; and where:
X, Y, Z are independently selected from the group consisting of $CR_k=CR_l$, O, S, and $N-R_m$;
wherein when Da or Db is selected from N, S and P, the attached $R_a$, $R_b$, $R_c$, $R_d$ are independently selected from the group consisting of H, a linear or branched alkyl group with up to 25 carbons, $-(CH_2CH_2O)_\alpha-(CH_2)_\beta OR_{a1}$, $-(CH_2CH_2O)_\alpha-(CH_2)_\beta NR_{a2}R_{a3}$, $-(CH_2CH_2O)_\alpha-(CH_2)_\beta CONR_{a2}R_{a3}$, $-(CH_2CH_2O)_\alpha-(CH_2)_\beta CN$, $-(CH_2CH_2O)_\alpha-(CH_2)_\beta Cl$, $-(CH_2CH_2O)_\alpha-(CH_2)_\beta Br$, $-(CH_2CH_2O)_\alpha-(CH_2)_\beta I$, $-(CH_2CH_2O)_\alpha-(CH_2)_\beta$-Phenyl, a group of aromatic rings having up to 20 carbons in the aromatic ring framework, fused aromatic rings, vinyl, allyl, 4-styryl, acroyl, methacroyl, acrylonitrile, isocyanate, isothiocyanate, epoxides, strained ring olefins, $(-CH_2)_\delta SiCl_3$, $(-CH_2)_\delta Si(OCH_2CH_3)_3$, and $(-CH_2)_\delta Si(OCH_3)_3$, where $0<\delta<25$;
wherein when Da or Db is O, the attached Ra, Rb, Rc, Rd are independently selected from the group consisting of H, $-(CH_2CH_2O)_\alpha-(CH_2)_\beta OR_{a1}$, $-(CH_2CH_2O)_\alpha-(CH_2)_\beta NRa_2Ra_3$, $-(CH_2CH_2O)_\alpha-(CH_2)_\beta CONRa_2Ra_3$, $-(CH_2CH_2O)_\alpha-(CH_2)_\beta CN$, $-(CH_2CH_2O)_\alpha-(CH_2)_\beta Cl$, $-(CH_2CH_2O)_\alpha-(CH_2)_\beta Br$, $-(CH_2CH_2O)_\alpha-(CH_2)_\beta I$, $-(CH_2CH_2O)_\alpha-(CH_2)_\beta$-Phenyl, a group of aromatic rings having up to 20 carbons in the aromatic ring framework, fused aromatic rings, vinyl, allyl, 4-styryl, acroyl, methacroyl, acrylonitrile, isocyanate, isothiocyanate, epoxides, strained ring olefins, $(-CH_2)_\delta SiCl_3$, $(-CH_2)_\delta Si(OCH_2CH_3)_3$, and $(-CH_2)_\delta Si(OCH_3)_3$, where $0<\delta<25$;
wherein one of Ra and Rb is not present when Da is O or S, and wherein one of Rc and Rd is not present when Db is O or S;
$R_e$, $R_f$, $R_g$, $R_h$, $R_i$, $R_j$, $R_k$, and $R_l$ are independently selected from the group consisting of H, a linear or branched alkyl group with up to 25 carbons, $-(CH_2CH_2O)_\alpha-(CH_2)_\beta OR_{b1}$, $-(CH_2CH_2O)_\alpha-(CH_2)_\beta NR_{b2}R_{b3}$, $-(CH_2CH_2O)_\alpha-(CH_2)_\beta CONR_{b2}R_{b3}$, $-(CH_2CH_2O)_\alpha-(CH_2)_\beta CN$, $-(CH_2CH_2O)_\alpha-(CH_2)_\beta Cl$, $-(CH_2CH_2)_\alpha-(CH_2)_\beta Br$, $-(CH_2CH_2O)_\alpha-(CH_2)_\beta I$, $-(CH_2CH_2O)_\alpha-(CH_2)_\beta$-Phenyl, a group of aromatic rings having up to 20 carbons in the aromatic framework, fused aromatic rings, CHO, CN, $NO_2$, Br, Cl, I, phenyl, an acceptor group having more than two carbon atoms, a functional group obtained by reaction with an amino acid, $NR_{e1}R_{e2}$, and $OR_{e3}$;
$R_m$ is selected from the group consisting of H, a linear or branched alkyl group with up to 25 carbons, $-(CH_2CH_2O)_\alpha-(CH_2)_\beta OR_{b1}$, $-(CH_2CH_2O)_\alpha-(CH_2)_\beta NR_{b2}R_{b3}$, $-(CH_2CH_2O)_\alpha-(CH_2)_\beta CONR_{b2}R_{b3}$, $-(CH_2CH_2O)_\alpha-(CH_2)_\beta CN$, $-(CH_2CH_2O)_\alpha-(CH_2)_\beta Cl$, $-(CH_2CH_2O)_\alpha-(CH_2)_\beta Br$, $-(CH_2CH_2O)_\alpha-(CH_2)_\beta I$, $-(CH_2CH_2O)_\alpha-(CH_2)_\beta$-Phenyl, a group of aromatic rings having up to 20 carbons in the aromatic framework, fused aromatic rings, phenyl, an acceptor group having more than two carbon atoms, and a functional group obtained by reaction with an amino acid;
where $0<\alpha<10$ and $1<\beta<25$;
$R_{a1}$, $R_{a2}$, and $R_{a3}$ are independently selected from the group consisting of H, a linear or branched alkyl group with up to 25 carbons, and a functional group obtained by reaction with:
an amino acid, a polypeptide, adenine, guanine, tyrosine, cytosine, uracil, biotin, ferrocene, ruthenocene, cyanuric chloride, or methacryloyl chloride;
$R_{b1}$, $R_{b2}$, and $R_{b3}$ are each independently a functional group obtained by reaction with:
an amino acid, a polypeptide, adenine, guanine, tyrosine, cytosine, uracil, biotin, ferrocene, ruthenocene, cyanuric chloride, or methacryloyl chloride;
$R_{e1}$, $R_{e2}$, $R_{e3}$ are independently selected from the group consisting of H, a linear or branched alkyl group with up to 25 carbons, $-(CH_2CH_2O)_\alpha-(CH_2)_\beta OR_{g1}$, $-(CH_2CH_2O)_\alpha-(CH_2)_\beta NR_{g2}R_{g3}$, $-(CH_2CH_2O)_\alpha-(CH_2)_\beta CONR_{g2}R_{g3}$, $-(CH_2CH_2O)_\alpha-(CH_2)_\beta CN$, $-(CH_2CH_2O)_\alpha-(CH_2)_\beta Cl$, $-(CH_2CH_2O)_\alpha-(CH_2)_\beta Br$, $-(CH_2CH_2O)_\alpha-(CH_2)_\beta I$, $-(CH_2CH_2O)_\alpha-(CH_2)_\beta$-Phenyl, aryl groups, fused aromatic rings, vinyl, allyl, 4-styryl, acroyl, methacroyl, acrylonitrile, isocyanate, isothiocyanate, epoxides, strained ring olefins, $(-CH_2)_\delta SiCl_3$, $(-CH_2)_\delta Si(OCH_2CH_3)_3$, and $(-CH_2)_\delta Si(OCH_3)_3$, where $0<\delta<25$;
$R_{g1}$, $R_{g2}$, and $R_{g3}$ are independently selected from the group consisting of H, a linear or branched alkyl group with up to 25 carbons, and a functional group obtained by reaction with:
an amino acid, a polypeptide, adenine, guanine, tyrosine, cytosine, uracil, biotin ferrocene, ruthenocene, cyanuric chloride, or methacryloyl chloride.
2. The method of claim 1, wherein X and Z are $CR_k=CR_l$.
3. The method of claim 1, wherein Da is N.
4. The method of claim 1, wherein Da is O.
5. The method of claim 1, wherein Da is S.
6. The method of claim 1, wherein Da is P.
7. A method for preparing a compound in an electronically excited state, comprising the steps of:
a) exposing a compound having the formula $D_1$-Π-$D_2$ to radiation of a wavelength within a multiphoton absorption peak of said compound, wherein $D_1$ and $D_2$ are electron donor groups; and Π comprises a bridge of π-conjugated bonds connecting $D_1$ and $D_2$; and
b) converting said compound to a multi-photon electronically excited state upon simultaneous absorption of at least two photons of said radiation by said compound, wherein the sum of the energies of all of said absorbed photons is greater than or equal to the transition energy from a ground state of said compound to said multi-photon excited state and wherein the energy of each absorbed photon is less than the transition energy between said ground state and the lowest single-photon excited state of said compound and is less than the transition energy between said multi-photon excited state and said ground state, wherein said compound is further defined by a formula

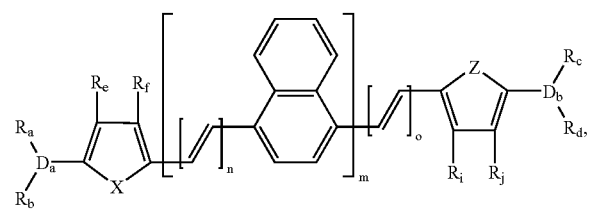

where $D_a$ is selected from the group consisting of N, O, S, and P;
where $D_b$ is selected from the group consisting of N, O, S, and P;
m, n, o are integers such that $1 \leq m \leq 10$, $0 \leq n \leq 10$, and $0 \leq o \leq 10$; and where:
X and Z are independently selected from the group consisting of $CR_k$=$CR_l$, O, S, and N—$R_m$;
$R_a$, $R_b$, $R_c$, $R_d$ are independently selected from the group consisting of H, a linear or branched alkyl group with up to 25 carbons, —(CH$_2$CH$_2$O)$_\alpha$—(CH$_2$)$_\beta$OR$_{a1}$, —(CH$_2$CH$_2$O)$_\alpha$—(CH$_2$)$_\beta$NR$_{a2}$R$_{a3}$, —(CH$_2$CH$_2$O)$_\alpha$—(CH$_2$)$_\beta$CONR$_{a2}$R$_{a3}$, —(CH$_2$CH$_2$O)$_\alpha$—(CH$_2$)$_\beta$CN, —(CH$_2$CH$_2$O)$_\alpha$—(CH$_2$)$_\beta$Cl, —(CH$_2$CH$_2$O)$_\alpha$—(CH$_2$)$_\beta$Br, —(CH$_2$CH$_2$O)$_\alpha$—(CH$_2$)$_\beta$I, —(CH$_2$CH$_2$O)$_\alpha$—(CH$_2$)$_\beta$-Phenyl, a group of aromatic rings having up to 20 carbons in the aromatic ring framework, fused aromatic rings, vinyl, allyl, 4-styryl, acroyl, methacroyl, acrylonitrile, isocyanate, isothiocyanate, epoxides, strained ring olefins, (—CH$_2$)$_\delta$SiCl$_3$, (—CH$_2$)$_\delta$Si(OCH$_2$CH$_3$)$_3$, and (—CH$_2$)$_\delta$Si(OCH$_3$)$_3$, where $0<\delta<25$;
wherein one of Ra and Rb is not present when Da is O or S, and wherein one of Rc and Rd is not present when Db is O or S;
$R_e$, $R_f$, $R_i$, $R_j$, $R_k$, and $R_l$ are independently selected from the group consisting of H, a linear or branched alkyl group with up to 25 carbons, —(CH$_2$CH$_2$O)$_\alpha$—(CH$_2$)$_\beta$OR$_{b1}$, —(CH$_2$CH$_2$O)$_\alpha$—(CH$_2$)$_\beta$NR$_{b2}$R$_{b3}$, —(CH$_2$CH$_2$O)$_\alpha$—(CH$_2$)$_\beta$CONR$_{b2}$R$_{b3}$, —(CH$_2$CH$_2$O)$_\alpha$—(CH$_2$)$_\beta$CN, —(CH$_2$CH$_2$O)$_\alpha$—(CH$_2$)$_\beta$Cl, —(CH$_2$CH$_2$O)$_\alpha$—(CH$_2$)$_\beta$Br, —(CH$_2$CH$_2$O)$_\alpha$—(CH$_2$)$_\beta$I, —(CH$_2$CH$_2$O)$_\alpha$—(CH$_2$)$_\beta$-Phenyl, a group of aromatic rings having up to 20 carbons in the aromatic framework, fused aromatic rings, CHO, CN, NO$_2$, Br, Cl, I, phenyl, an acceptor group having more than two carbon atoms, a functional group obtained by reaction with an amino acid, NR$_{e1}$R$_{e2}$, and OR$_{e3}$;
$R_m$ is selected from the group consisting of H, a linear or branched alkyl group with up to 25 carbons, —(CH$_2$CH$_2$O)$_\alpha$—(CH$_2$)$_\beta$OR$_{b1}$, —(CH$_2$CH$_2$O)$_\alpha$—(CH$_2$)$_\beta$NR$_{b2}$R$_{b3}$, —(CH$_2$CH$_2$O)$_\alpha$—(CH$_2$)$_\beta$CONR$_{b2}$R$_{b3}$, —(CH$_2$CH$_2$O)$_\alpha$—(CH$_2$)$_\beta$CN, —(CH$_2$CH$_2$O)$_\alpha$—(CH$_2$)$_\beta$Cl, —(CH$_2$CH$_2$O)$_\alpha$—(CH$_2$)$_\beta$Br, —(CH$_2$CH$_2$O)$_\alpha$—(CH$_2$)$_\beta$I, —(CH$_2$CH$_2$O)$_\alpha$—(CH$_2$)$_\beta$-Phenyl, a group of aromatic rings having up to 20 carbons in the aromatic framework, fused aromatic rings, phenyl, an acceptor group having more than two carbon atoms, and a functional group obtained by reaction with an amino acid;
where $0<\alpha<10$ and $1<\beta<25$;
$R_{a1}$, $R_{a2}$, and $R_{a3}$ are independently selected from the group consisting of H, a linear or branched alkyl group with up to 25 carbons, and a functional group obtained by reaction with:
an amino acid, a polypeptide, adenine, guanine, tyrosine, cytosine, uracil, biotin, ferrocene, ruthenocene, cyanuric chloride, or methacryloyl chloride;
$R_{b1}$, $R_{b2}$, and $R_{b3}$ are each independently a functional group obtained by reaction with:
an amino acid, a polypeptide, adenine, guanine, tyrosine, cytosine, uracil, biotin, ferrocene, ruthenocene, cyanuric chloride, or methacryloyl chloride;
$R_{e1}$, $R_{e2}$, $R_{e3}$ are independently selected from the group consisting of H, a linear or branched alkyl group with up to 25 carbons, —(CH$_2$CH$_2$O)$_\alpha$—(CH$_2$)$_\beta$OR$_{g1}$, —(CH$_2$CH$_2$O)$_\alpha$—(CH$_2$)$_\beta$NR$_{g2}$R$_{g3}$, —(CH$_2$CH$_2$O)$_\alpha$—(CH$_2$)$_\beta$CONR$_{g2}$R$_{g3}$, —(CH$_2$CH$_2$O)$_\alpha$—(CH$_2$)$_\beta$CN, —(CH$_2$CH$_2$O)$_\alpha$—(CH$_2$)$_\beta$Cl, —(CH$_2$CH$_2$O)$_\alpha$—(CH$_2$)$_\beta$Br, —(CH$_2$CH$_2$O)$_\alpha$—(CH$_2$)$_\beta$I, —(CH$_2$CH$_2$O)$_\alpha$—(CH$_2$)$_\beta$-Phenyl, aryl groups, fused aromatic rings, vinyl, allyl, 4-styryl, acroyl, methacroyl, acrylonitrile, isocyanate, isothiocyanate, epoxides, strained ring olefins, (—CH$_2$)$_\delta$SiCl$_3$, (—CH$_2$)$_\delta$Si(OCH$_2$CH$_3$)$_3$, and (—CH$_2$)$_\delta$Si(OCH$_3$)$_3$, where $0<\delta<25$;
$R_{g1}$, $R_{g2}$, and $R_{g3}$ are independently selected from the group consisting of H, a linear or branched alkyl group with up to 25 carbons, and a functional group obtained by reaction with:
an amino acid, a polypeptide, adenine, guanine, tyrosine, cytosine, uracil, biotin, ferrocene, ruthenocene, cyanuric chloride, or methacryloyl chloride.

8. The method of claim 7, wherein X and Z are $CR_k$=$CR_l$.
9. The method of claim 7, wherein Da is N.
10. The method of claim 7, wherein Da is O.
11. The method of claim 7, wherein Da is S.
12. The method of claim 7, wherein Da is P.
13. A method for preparing a compound in an electronically excited state, comprising the steps of:
a) exposing a compound having the formula $D_1$-Π-$D_2$ to radiation of a wavelength within a multiphoton absorption peak of said compound, wherein $D_1$ and $D_2$ are electron donor groups; and Π comprises a bridge of π-conjugated bonds connecting $D_1$ and $D_2$; and
b) converting said compound to a multi-photon electronically excited state upon simultaneous absorption of at least two photons of said radiation by said compound, wherein the sum of the energies of all of said absorbed photons is greater than or equal to the transition energy from a ground state of said compound to said multi-photon excited state and wherein the energy of each absorbed photon is less than the transition energy between said ground state and the lowest single-photon excited state of said compound and is less than the transition energy between said multi-photon excited state and said ground state, wherein said compound is further defined by a formula where $D_a$ is selected from the group consisting of N, O, S, and P;
where $D_b$ is selected from the group consisting of N, O, S, and P;
m, n, o are integers such that $1 \leq m \leq 10$, $0 \leq n \leq 10$, and $0 \leq o \leq 10$; and
where:
X and Z are independently selected from the group consisting of $CR_k$=$CR_l$, O, S, and N—$R_m$;
$R_a$, $R_b$, $R_c$, $R_d$ are independently selected from the group consisting of H, a linear or branched alkyl group with up to 25 carbons, —(CH$_2$CH$_2$O)$_\alpha$—(CH$_2$)$_\beta$OR$_{a1}$, —(CH$_2$CH$_2$O)$_\alpha$—(CH$_2$)$_\beta$NR$_{a2}$R$_{a3}$, —(CH$_2$CH$_2$O)$_\alpha$—(CH$_2$)$_\beta$CONR$_{a2}$R$_{a3}$, —(CH$_2$CH$_2$O)$_\alpha$—(CH$_2$)$_\beta$CN, —(CH$_2$CH$_2$O)$_\alpha$—(CH$_2$)$_\beta$Cl, —(CH$_2$CH$_2$O)$_\alpha$—(CH$_2$)$_\beta$Br, —(CH$_2$CH$_2$O)$_\alpha$—(CH$_2$)$_\beta$I, —(CH$_2$CH$_2$O)$_\alpha$—(CH$_2$)$_\beta$-Phenyl, a group of aromatic rings having up to 20 carbons in the aromatic ring framework, fused aromatic rings, vinyl, allyl, 4-styryl, acroyl, methacroyl, acrylonitrile, isocyanate, isothiocyanate, epoxides, strained ring olefins, (—CH$_2$)$_\delta$SiCl$_3$, (—CH$_2$)$_\delta$Si(OCH$_2$CH$_3$)$_3$, and (—CH$_2$)$_\delta$Si(OCH$_3$)$_3$, where $0<\delta<25$;
wherein one of Ra and Rb is not present when Da is O or S, and wherein one of Rc and Rd is not present when Db is O or S;

R$_e$, R$_f$, R$_i$, R$_j$, R$_k$, R$_l$ and R$_m$ are independently selected from the group consisting of, H, a linear or branched alkyl group with up to 25 carbons, —(CH$_2$CH$_2$O)$_\alpha$—(CH$_2$)$_\beta$OR$_{b1}$, —(CH$_2$CH$_2$O)$_\alpha$—(CH$_2$)$_\beta$NR$_{b2}$R$_{b3}$, —(CH$_2$CH$_2$O)$_\alpha$—(CH$_2$)$_\beta$CONR$_{b2}$R$_{b3}$, —(CH$_2$CH$_2$O)$_\alpha$—(CH$_2$)$_\beta$CN, —(CH$_2$CH$_2$O)$_\alpha$—(CH$_2$)$_\beta$Cl, —(CH$_2$CH$_2$O)$_\alpha$—(CH$_2$)$_\beta$Br, —(CH$_2$CH$_2$O)$_\alpha$—(CH$_2$)$_\beta$I, —(CH$_2$CH$_2$O)$_\alpha$—(CH$_2$)$_\beta$-Phenyl, a group of aromatic rings having up to 20 carbons in the aromatic framework, fused aromatic rings, CHO, CN, NO$_2$, Br, Cl, I, phenyl, an acceptor group containing more than two carbon atoms, a functional group obtained by reaction with an amino acid, NR$_{e1}$R$_{e2}$, and OR$_{e3}$;
where $0<\alpha<10$ and $1<\beta<25$;

R$_{a1}$, R$_{a2}$, and R$_{a3}$ are independently selected from the group consisting of H, a linear or branched alkyl group with up to 25 carbons, and a functional group obtained by reaction with:
an amino acid, a polypeptide, adenine, guanine, tyrosine, cytosine, uracil, biotin, ferrocene, ruthenocene, cyanuric chloride, or methacryloyl chloride;

R$_{b1}$, R$_{b2}$, and R$_{b3}$ are each independently a functional group obtained by reaction with:
an amino acid, a polypeptide, adenine, guanine, tyrosine, cytosine, uracil, biotin, ferrocene, ruthenocene, cyanuric chloride, or methacryloyl chloride;

R$_{e1}$, R$_{e2}$, R$_{e3}$ are independently selected from the group consisting of H, a linear or branched alkyl group with up to 25 carbons, —(CH$_2$CH$_2$O)$_\alpha$—(CH$_2$)$_\beta$OR$_{g1}$, —(CH$_2$CH$_2$O)$_\alpha$—(CH$_2$)$_\beta$NR$_{g2}$R$_{g3}$, —(CH$_2$CH$_2$O)$_\alpha$—(CH$_2$)$_\beta$CONR$_{g2}$R$_{g3}$, —(CH$_2$CH$_2$O)$_\alpha$—(CH$_2$)$_\beta$CN, —(CH$_2$CH$_2$O)$_\alpha$—(CH$_2$)$_\beta$Cl, —(CH$_2$CH$_2$O)$_\alpha$—(CH$_2$)$_\beta$Br, —(CH$_2$CH$_2$O)$_\alpha$—(CH$_2$)$_\beta$I, —(CH$_2$CH$_2$O)$_\alpha$—(CH$_2$)$_\beta$-Phenyl, aryl groups, fused aromatic rings, vinyl, allyl, 4-styryl, acroyl, methacroyl, acrylonitrile, isocyanate, isothiocyanate, epoxides, strained ring olefins, (—CH$_2$)$_\delta$SiCl$_3$, (—CH$_2$)$_\delta$Si(OCH$_2$CH$_3$)$_3$, and (—CH$_2$)$_\delta$Si(OCH$_3$)$_3$, where $0<\delta<25$;

R$_{g1}$, R$_{g2}$, and R$_{g3}$ are independently selected from the group consisting of H, a linear or branched alkyl group with up to 25 carbons, and a functional group obtained by reaction with:
an amino acid, a polypeptide, adenine, guanine, tyrosine, cytosine, uracil, biotin, ferrocene, ruthenocene, cyanuric chloride, or methacryloyl chloride.

14. The method of claim 13, wherein X and Z are CR$_k$=CR$_l$.
15. The method of claim 13, wherein Da is N.
16. The method of claim 13, wherein Da is O.
17. The method of claim 13, wherein Da is S.
18. The method of claim 13, wherein Da is P.
19. A method for preparing a compound in an electronically excited state, comprising the steps of:
a) exposing a compound having the formula D$_1$-Π-D$_2$ to radiation, wherein D$_1$ and D$_2$ are electron donor groups; and Π comprises a bridge of π-conjugated bonds connecting D$_1$ and D$_2$; and
b) converting said compound to a multi-photon electronically excited state upon simultaneous absorption of at least two photons of said radiation by said compound, wherein the sum of the energies of all of said absorbed photons is greater than or equal to the transition energy from a ground state of said compound to said multi-photon excited state and wherein the energy of each absorbed photon is less than the transition energy between said ground state and the lowest single-photon excited state of said compound and is less than the transition energy between said multi-photon excited state and said ground state, wherein said compound is selected from the group consisting of

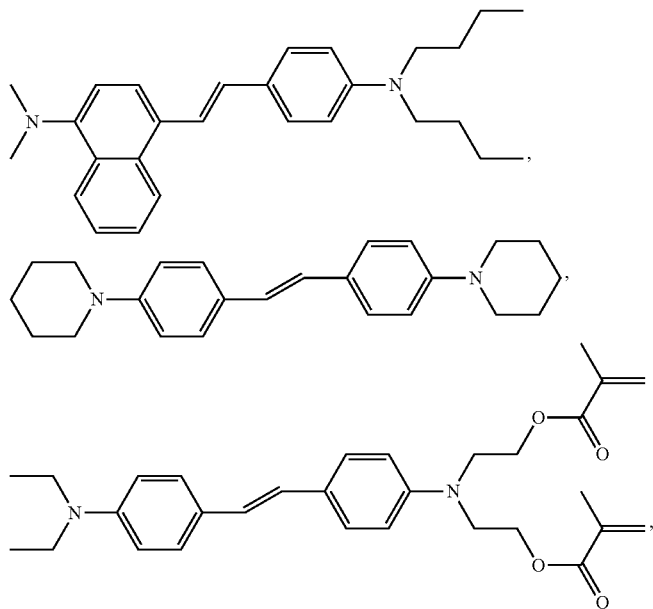

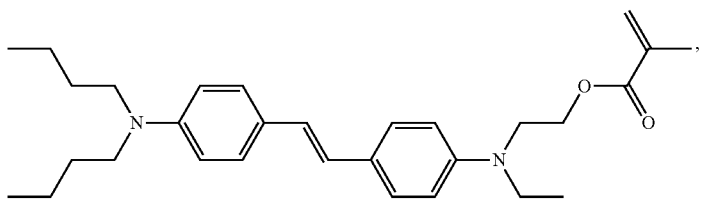
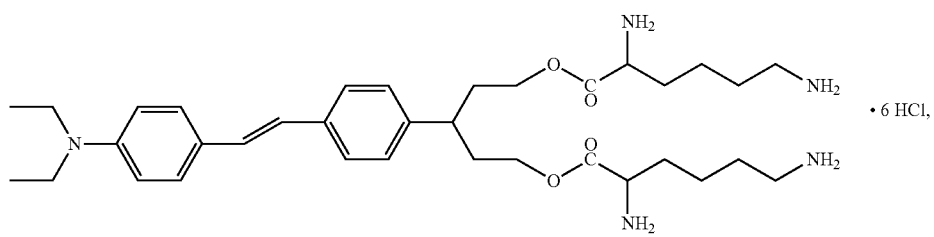
· 6 HCl,
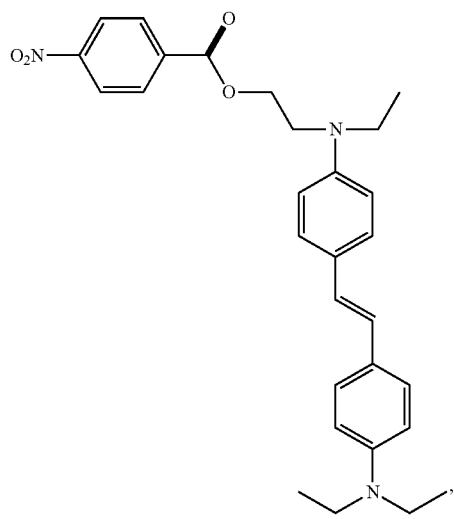
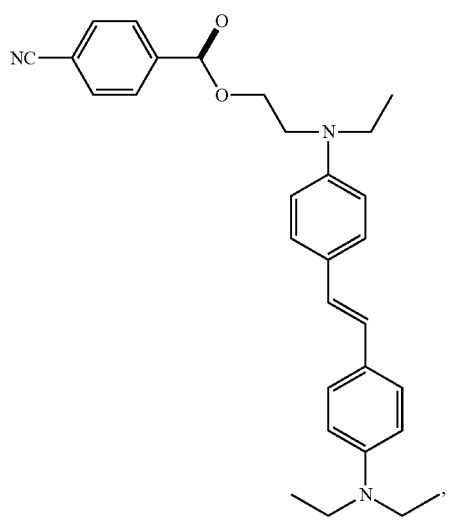

-continued
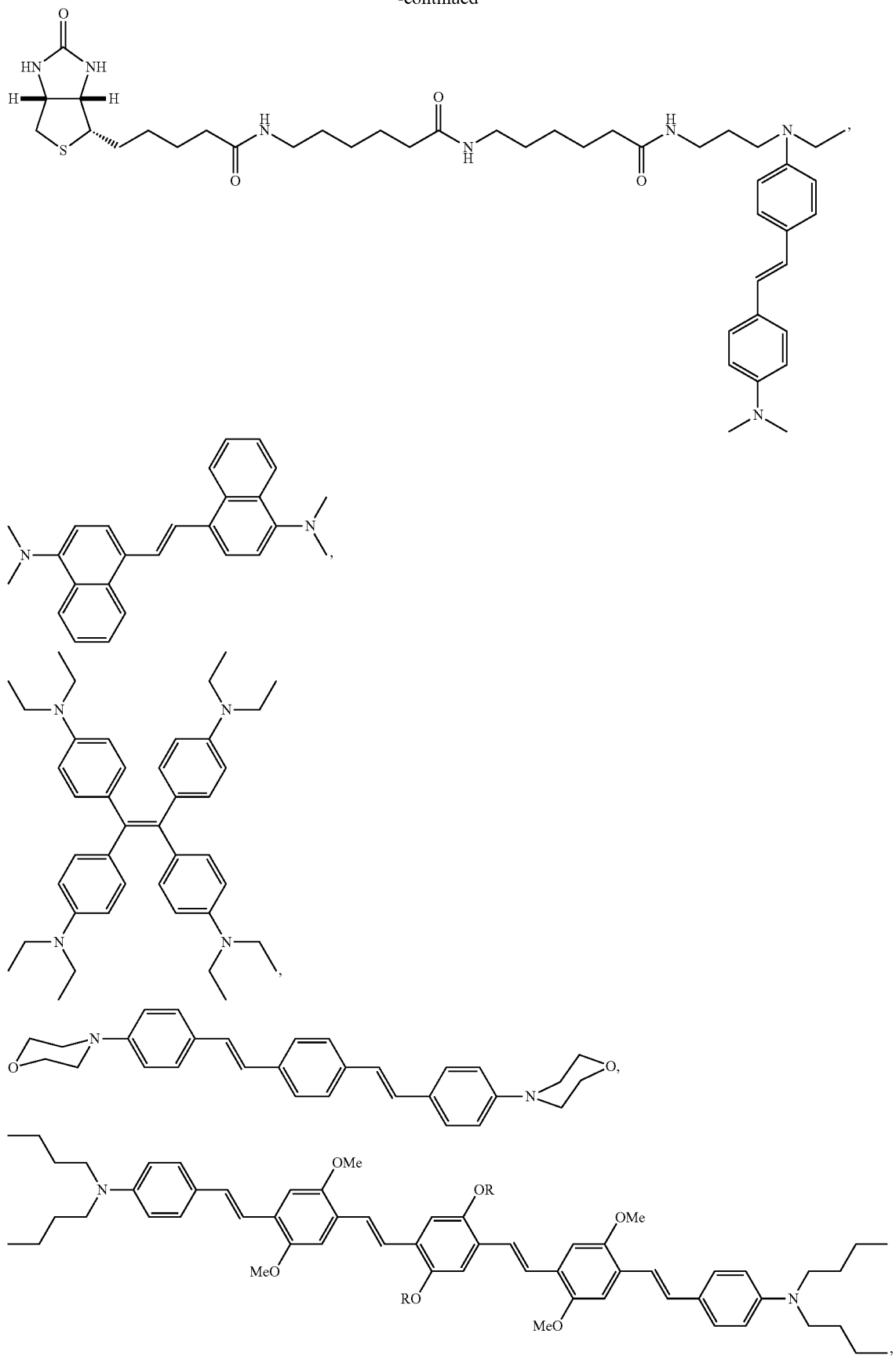

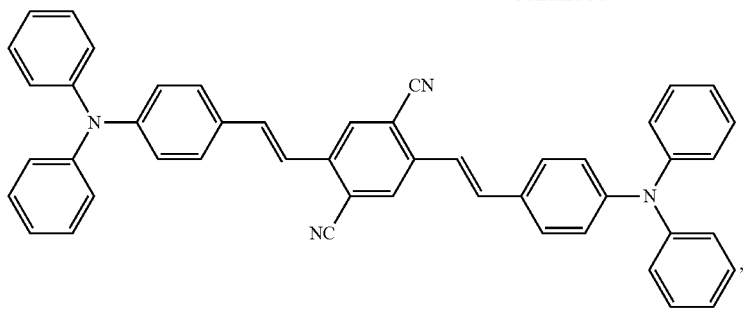
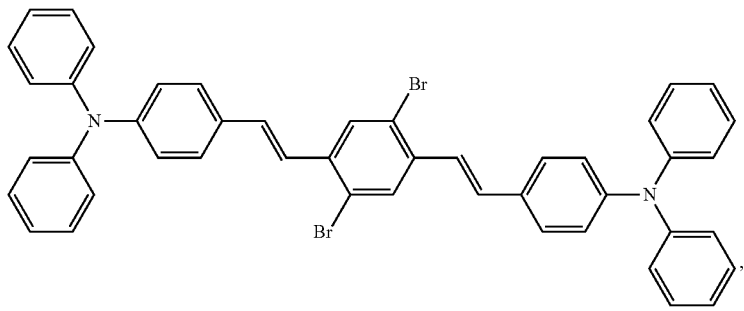
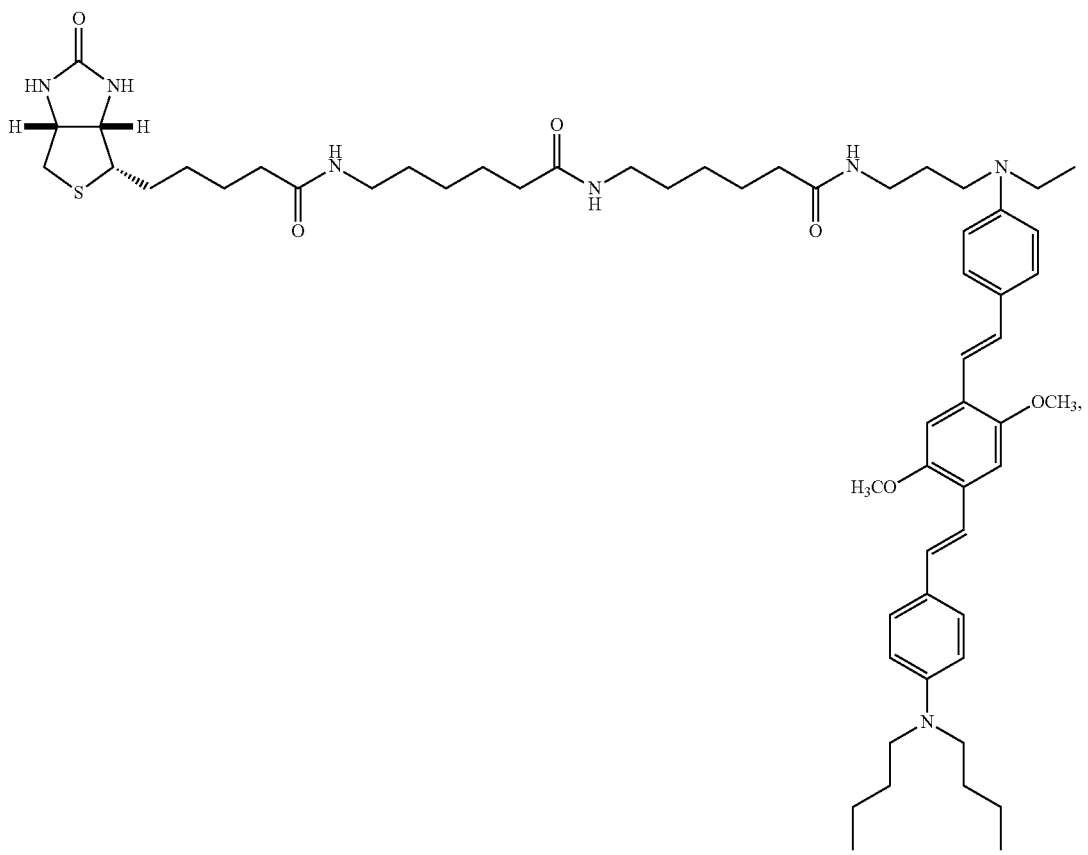
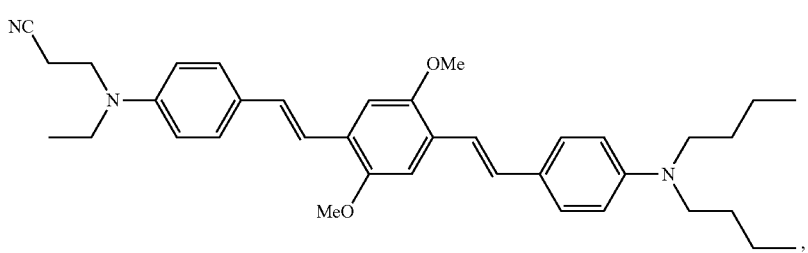

-continued
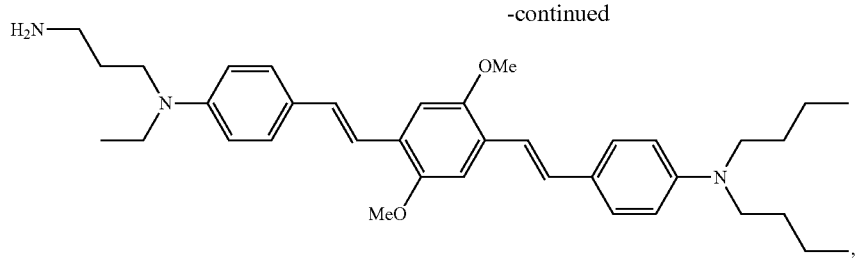
and mixtures thereof, where R=$(CH_2)_{11}CH_3$.
* * * * *